US012699639B2

(12) United States Patent (10) Patent No.: US 12,699,639 B2

Berg et al. (45) Date of Patent: Aug. 4, 2026

(54) HEALTH METRICS ASSOCIATED WITH CLOUD SERVICES

(71) Applicant: Oracle International Corporation, Redwood Shores, CA (US)

(72) Inventors: Daniel Berg, Seattle, WA (US); Eric Peterson, Seattle, WA (US); Kenneth Richard Fox, Redwood City, CA (US); William Nickolas Moran, Austin, TX (US); Wai Ho Leung, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/647,735

(22) Filed: Apr. 26, 2024

(65) Prior Publication Data

US 2024/0362130 A1 Oct. 31, 2024

Related U.S. Application Data

(60) Provisional application No. 63/503,143, filed on May 18, 2023, provisional application No. 63/462,875, filed on Apr. 28, 2023.

(51) Int. Cl.
G06F 11/32 (2006.01)
G06F 11/20 (2006.01)
G06F 11/30 (2006.01)

(52) U.S. Cl.
CPC ........ G06F 11/327 (2013.01); G06F 11/2028 (2013.01); G06F 11/3055 (2013.01); G06F 2201/81 (2013.01); G06F 2201/815 (2013.01)

(58) Field of Classification Search
CPC ............. G06F 11/0751; G06F 11/0766; G06F 11/0778; G06F 11/327; G06F 11/3055; G06F 11/2028; G06F 11/2094
See application file for complete search history.

(56) References Cited

U.S. PATENT DOCUMENTS 8,113,959 B2 2/2012 De Judicibus
8,161,173 B1 4/2012 Mishra et al.
(Continued)

FOREIGN PATENT DOCUMENTS

CA 2804864 C 11/2018
CA 3159014 A1 6/2021
(Continued)

OTHER PUBLICATIONS

"IBM SmartCloud: Becoming a Cloud Service Provider", IBM, Dec. 13, 2012, <https://www.redbooks.ibm.com/abstracts/redp4912. html> (Year: 2012).*
(Continued)

*Primary Examiner* — Marc Duncan
*Assistant Examiner* — Albert Li
(74) *Attorney, Agent, or Firm* — Invoke

(57) ABSTRACT

Techniques for monitoring the health of services of a system are disclosed. A system determines that a detected alarm is associated with a service feature, and the service feature is associated with a service of a cloud environment. The system computes a health metric for the service based at least on the detected alarm that is associated with the service feature. Additionally, the system generates a visual representation that includes the health metric for display on a service health interface.

24 Claims, 26 Drawing Sheets

(56) References Cited

U.S. PATENT DOCUMENTS

| | | | |
|---|---|---|---|
| 8,214,398 B1 | 7/2012 | Cowan et al. | |
| 8,898,763 B1 | 11/2014 | Mannepalli et al. | |
| 9,092,502 B1 | 7/2015 | Cannaliato et al. | |
| 9,100,424 B1 | 8/2015 | Thomas | |
| 9,137,093 B1 | 9/2015 | Abraham et al. | |
| 9,160,749 B2 | 10/2015 | Subramanian et al. | |
| 9,164,864 B1* | 10/2015 | Novick | G06F 11/3055 |
| 9,306,814 B1 | 4/2016 | Roth et al. | |
| 9,438,599 B1 | 9/2016 | Yuhan et al. | |
| 9,553,787 B1 | 1/2017 | Stickle et al. | |
| 9,569,630 B2 | 2/2017 | Cabrera et al. | |
| 9,571,516 B1 | 2/2017 | Curcic et al. | |
| 9,722,895 B1 | 8/2017 | Sarukkai et al. | |
| 9,824,390 B2 | 11/2017 | Adapalli et al. | |
| 9,876,703 B1 | 1/2018 | Arllen et al. | |
| 9,985,947 B1 | 5/2018 | Elhard | |
| 10,021,084 B2 | 7/2018 | Matthews et al. | |
| 10,061,932 B1 | 8/2018 | Combs et al. | |
| 10,089,476 B1 | 10/2018 | Roth et al. | |
| 10,122,717 B1 | 11/2018 | Reddy et al. | |
| 10,237,149 B1 | 3/2019 | Guo et al. | |
| 10,261,782 B2 | 4/2019 | Suarez et al. | |
| 10,270,759 B1 | 4/2019 | Bordelon et al. | |
| 10,318,265 B1 | 6/2019 | To et al. | |
| 10,394,638 B1* | 8/2019 | Lay | G06F 11/3409 |
| 10,411,975 B2 | 9/2019 | Martinez et al. | |
| 10,496,306 B1 | 12/2019 | Srivastava et al. | |
| 10,503,917 B2 | 12/2019 | Roth et al. | |
| 10,511,675 B1 | 12/2019 | Chud | |
| 10,528,995 B2 | 1/2020 | Maes | |
| 10,554,418 B2 | 2/2020 | Kshirsagar et al. | |
| 10,567,360 B2 | 2/2020 | Nirwal et al. | |
| 10,757,574 B1 | 8/2020 | Rule et al. | |
| 10,834,100 B2 | 11/2020 | Hoy et al. | |
| 10,878,483 B1 | 12/2020 | Felbinger et al. | |
| 10,956,600 B2 | 3/2021 | Ye et al. | |
| 10,972,445 B2 | 4/2021 | Tucker et al. | |
| 10,974,516 B2 | 4/2021 | Moriya | |
| 10,977,377 B2 | 4/2021 | Roth et al. | |
| 11,070,492 B2 | 7/2021 | Kostov et al. | |
| 11,121,985 B2 | 9/2021 | Cidon et al. | |
| 11,240,110 B1 | 2/2022 | Narula et al. | |
| 11,252,157 B1 | 2/2022 | Khanna et al. | |
| 11,321,137 B2 | 5/2022 | Barsalou et al. | |
| 11,323,477 B1 | 5/2022 | Kumar et al. | |
| 11,360,821 B1 | 6/2022 | Dey et al. | |
| 11,379,353 B1 | 7/2022 | Marchetti et al. | |
| 11,444,925 B1 | 9/2022 | Patimer et al. | |
| 11,537,627 B1 | 12/2022 | Baskaran et al. | |
| 11,537,745 B2 | 12/2022 | Yang et al. | |
| 11,552,953 B1 | 1/2023 | Avadhanam | |
| 11,574,151 B2 | 2/2023 | Wang et al. | |
| 11,575,508 B2 | 2/2023 | Anand et al. | |
| 11,587,458 B2 | 2/2023 | Lowensohn | |
| 11,593,251 B2 | 2/2023 | Chirkin et al. | |
| 11,604,672 B2 | 3/2023 | Subramanian et al. | |
| 11,611,558 B2 | 3/2023 | Lee et al. | |
| 11,652,616 B2 | 5/2023 | Zee et al. | |
| 11,689,475 B2 | 6/2023 | Goyal | |
| 11,720,536 B1 | 8/2023 | Kisser et al. | |
| 11,727,464 B2 | 8/2023 | Eisenstein et al. | |
| 11,765,244 B1 | 9/2023 | Barclay et al. | |
| 11,853,753 B1 | 12/2023 | Chawda et al. | |
| 11,936,678 B2 | 3/2024 | Pieczul et al. | |
| 11,943,385 B1 | 3/2024 | Kumar et al. | |
| 11,954,238 B1 | 4/2024 | Tan et al. | |
| 12,021,888 B1 | 6/2024 | Reed et al. | |
| 12,028,274 B1 | 7/2024 | Krishnaiah et al. | |
| 12,067,493 B2 | 8/2024 | Zhang et al. | |
| 12,143,917 B2 | 11/2024 | Raffa et al. | |
| 12,164,652 B1 | 12/2024 | Li et al. | |
| 12,363,148 B1 | 7/2025 | Anil et al. | |
| 12,373,252 B1 | 7/2025 | Faust et al. | |
| 12,412,103 B1 | 9/2025 | Chen et al. | |
| 12,445,419 B2 | 10/2025 | Adogla et al. | |
| 12,457,204 B2 | 10/2025 | Adogla et al. | |
| 12,475,015 B2 | 11/2025 | Peterson et al. | |
| 12,487,833 B2 | 12/2025 | Peterson et al. | |
| 12,493,901 B2 | 12/2025 | Gallagher et al. | |
| 2002/0026592 A1 | 2/2002 | Gavrila et al. | |
| 2002/0198973 A1 | 12/2002 | Besaw | |
| 2003/0135593 A1 | 7/2003 | Lee et al. | |
| 2003/0154407 A1 | 8/2003 | Kato et al. | |
| 2005/0198331 A1 | 9/2005 | Okajima et al. | |
| 2006/0236381 A1 | 10/2006 | Weeden et al. | |
| 2006/0259833 A1 | 11/2006 | Swoboda et al. | |
| 2007/0124374 A1 | 5/2007 | Arun et al. | |
| 2007/0168531 A1 | 7/2007 | Sitaraman et al. | |
| 2008/0295095 A1* | 11/2008 | Watanabe | G06F 11/0712 |
| | | | 718/1 |
| 2009/0164499 A1 | 6/2009 | Samudrala et al. | |
| 2009/0165078 A1 | 6/2009 | Samudrala et al. | |
| 2009/0205018 A1 | 8/2009 | Ferraiolo et al. | |
| 2010/0106678 A1 | 4/2010 | Pietrek et al. | |
| 2010/0131624 A1 | 5/2010 | Ferris | |
| 2010/0153865 A1 | 6/2010 | Barnes et al. | |
| 2010/0212004 A1 | 8/2010 | Fu | |
| 2011/0153671 A1 | 6/2011 | Taniguchi | |
| 2011/0167435 A1 | 7/2011 | Fang | |
| 2011/0277017 A1 | 11/2011 | Ivanov et al. | |
| 2011/0295727 A1 | 12/2011 | Ferris et al. | |
| 2011/0296000 A1 | 12/2011 | Ferris et al. | |
| 2012/0117462 A1 | 5/2012 | Jacobson et al. | |
| 2012/0124211 A1 | 5/2012 | Kampas et al. | |
| 2012/0131162 A1 | 5/2012 | Brandt et al. | |
| 2012/0137001 A1 | 5/2012 | Ferris et al. | |
| 2013/0054426 A1 | 2/2013 | Rowland et al. | |
| 2013/0111027 A1 | 5/2013 | Milojicic et al. | |
| 2013/0111609 A1 | 5/2013 | Resch et al. | |
| 2013/0124720 A1 | 5/2013 | Wood et al. | |
| 2013/0226699 A1 | 8/2013 | Long | |
| 2013/0232463 A1 | 9/2013 | Nagaraja et al. | |
| 2013/0232480 A1 | 9/2013 | Winterfeldt et al. | |
| 2013/0276142 A1 | 10/2013 | Peddada | |
| 2013/0282540 A1 | 10/2013 | Bliesner | |
| 2013/0282798 A1 | 10/2013 | Mccarthy et al. | |
| 2013/0297711 A1 | 11/2013 | Nhu | |
| 2013/0297802 A1* | 11/2013 | Laribi | H04L 12/6418 |
| | | | 709/226 |
| 2013/0304925 A1 | 11/2013 | Ferris et al. | |
| 2013/0339515 A1 | 12/2013 | Radhakrishnan | |
| 2014/0007041 A1 | 1/2014 | Schmeling et al. | |
| 2014/0074793 A1 | 3/2014 | Doering et al. | |
| 2014/0075034 A1 | 3/2014 | Vasudevan et al. | |
| 2014/0075565 A1 | 3/2014 | Srinivasan et al. | |
| 2014/0089393 A1 | 3/2014 | Druet et al. | |
| 2014/0095546 A1 | 4/2014 | Kruglikov et al. | |
| 2014/0122707 A1 | 5/2014 | De et al. | |
| 2014/0188938 A1 | 7/2014 | Banks et al. | |
| 2014/0215590 A1 | 7/2014 | Brand | |
| 2014/0236745 A1 | 8/2014 | Vautour | |
| 2014/0280595 A1 | 9/2014 | Mani et al. | |
| 2014/0280948 A1 | 9/2014 | Schmidt et al. | |
| 2015/0089066 A1 | 3/2015 | Meswani et al. | |
| 2015/0089575 A1 | 3/2015 | Vepa et al. | |
| 2015/0106736 A1 | 4/2015 | Torman et al. | |
| 2015/0134485 A1 | 5/2015 | Kim et al. | |
| 2015/0180734 A1 | 6/2015 | Maes et al. | |
| 2015/0200824 A1* | 7/2015 | Sadovsky | H04L 41/5009 |
| | | | 709/224 |
| 2015/0200966 A1 | 7/2015 | Kasturirangan et al. | |
| 2015/0242262 A1 | 8/2015 | Ranganathan et al. | |
| 2015/0312268 A1 | 10/2015 | Ray | |
| 2015/0358161 A1 | 12/2015 | Kancharla et al. | |
| 2015/0363852 A1 | 12/2015 | Vautour | |
| 2015/0365291 A1 | 12/2015 | Burton et al. | |
| 2015/0372938 A1 | 12/2015 | Patel et al. | |
| 2015/0381526 A1 | 12/2015 | Beaty et al. | |
| 2016/0028833 A1 | 1/2016 | Georgieva | |
| 2016/0043909 A1 | 2/2016 | Pogrebinsky et al. | |
| 2016/0110553 A1 | 4/2016 | Factor et al. | |
| 2016/0125489 A1 | 5/2016 | Gupte et al. | |
| 2016/0127418 A1 | 5/2016 | Maes et al. | |
| 2016/0132806 A1 | 5/2016 | To et al. | |

(56)                References Cited

U.S. PATENT DOCUMENTS

| | | |
|---|---|---|
| 2016/0139737 A1 | 5/2016 | Conn et al. |
| 2016/0142211 A1 | 5/2016 | Metke et al. |
| 2016/0142323 A1 | 5/2016 | Lehmann et al. |
| 2016/0203533 A1* | 7/2016 | Cheng .................. H04L 63/083 |
| | | 705/26.1 |
| 2016/0203544 A1 | 7/2016 | Smits et al. |
| 2016/0253722 A1 | 9/2016 | Johnson et al. |
| 2016/0277411 A1 | 9/2016 | Dani et al. |
| 2016/0294881 A1 | 10/2016 | Hua et al. |
| 2016/0323183 A1 | 11/2016 | Jeuk et al. |
| 2016/0337365 A1 | 11/2016 | Beiter |
| 2017/0006119 A1 | 1/2017 | Pogrebinsky et al. |
| 2017/0069011 A1 | 3/2017 | Akkiraju et al. |
| 2017/0111331 A1 | 4/2017 | Auradkar et al. |
| 2017/0111446 A1 | 4/2017 | Rivera et al. |
| 2017/0116334 A1 | 4/2017 | Kruglikov et al. |
| 2017/0149564 A1 | 5/2017 | Mccallum |
| 2017/0201525 A1 | 7/2017 | Biller et al. |
| 2017/0214632 A1 | 7/2017 | Ravi |
| 2017/0230229 A1 | 8/2017 | Sasturkar et al. |
| 2017/0272336 A1 | 9/2017 | Johnstone et al. |
| 2017/0323112 A1 | 11/2017 | Tran et al. |
| 2017/0373860 A1 | 12/2017 | Kshirsagar et al. |
| 2018/0025399 A1 | 1/2018 | Nedeltchev et al. |
| 2018/0025403 A1 | 1/2018 | Mckay et al. |
| 2018/0052861 A1 | 2/2018 | Seetharaman et al. |
| 2018/0124105 A1 | 5/2018 | Rodrigues |
| 2018/0137261 A1 | 5/2018 | Lattin et al. |
| 2018/0176023 A1 | 6/2018 | Prickett et al. |
| 2018/0191718 A1 | 7/2018 | Kuzkin et al. |
| 2018/0197161 A1 | 7/2018 | Kuzkin et al. |
| 2018/0211236 A1 | 7/2018 | Rutherford et al. |
| 2018/0212778 A1 | 7/2018 | Novak |
| 2018/0219784 A1 | 8/2018 | Jiang et al. |
| 2018/0232786 A1 | 8/2018 | Kuzkin et al. |
| 2018/0234256 A1 | 8/2018 | Bowen |
| 2018/0287914 A1 | 10/2018 | Gupta |
| 2018/0288057 A1 | 10/2018 | Varadamma et al. |
| 2018/0288135 A1 | 10/2018 | Narayan et al. |
| 2018/0356964 A1 | 12/2018 | Morris |
| 2018/0373521 A1 | 12/2018 | Huang et al. |
| 2019/0020659 A1 | 1/2019 | Loni et al. |
| 2019/0036797 A1* | 1/2019 | Margalit .................. H04L 41/22 |
| 2019/0068495 A1 | 2/2019 | Jeuk et al. |
| 2019/0068622 A1 | 2/2019 | Lin et al. |
| 2019/0075111 A1 | 3/2019 | Mutha et al. |
| 2019/0087835 A1 | 3/2019 | Schwed et al. |
| 2019/0104035 A1 | 4/2019 | Cidon et al. |
| 2019/0114335 A1 | 4/2019 | Koenig et al. |
| 2019/0132299 A1 | 5/2019 | Tucker et al. |
| 2019/0149417 A1 | 5/2019 | Augusto et al. |
| 2019/0156000 A1 | 5/2019 | Hoffmann et al. |
| 2019/0166007 A1 | 5/2019 | Sundaram et al. |
| 2019/0182153 A1 | 6/2019 | Gundavelli et al. |
| 2019/0190917 A1 | 6/2019 | Joe |
| 2019/0205045 A1 | 7/2019 | Hugot et al. |
| 2019/0273796 A1 | 9/2019 | Allgeier et al. |
| 2019/0332789 A1 | 10/2019 | Vandenbrouck et al. |
| 2019/0334917 A1 | 10/2019 | Demmler et al. |
| 2019/0354692 A1 | 11/2019 | Thoram et al. |
| 2019/0362087 A1 | 11/2019 | Ferrans et al. |
| 2020/0004569 A1 | 1/2020 | Gupta et al. |
| 2020/0014659 A1 | 1/2020 | Chasman et al. |
| 2020/0042675 A1 | 2/2020 | Asanghanwa et al. |
| 2020/0084216 A1 | 3/2020 | North et al. |
| 2020/0097315 A1 | 3/2020 | Faynberg et al. |
| 2020/0112497 A1* | 4/2020 | Yenumulapalli ........ H04L 43/10 |
| 2020/0117757 A1 | 4/2020 | Yanamandra et al. |
| 2020/0127823 A1 | 4/2020 | Vats et al. |
| 2020/0204357 A1 | 6/2020 | Seyfried et al. |
| 2020/0244527 A1 | 7/2020 | Sharma et al. |
| 2020/0244549 A1 | 7/2020 | Finch et al. |
| 2020/0250661 A1 | 8/2020 | Padmanabhan et al. |
| 2020/0274900 A1 | 8/2020 | Vaishnavi |
| 2020/0358756 A1 | 11/2020 | Rose et al. |
| 2020/0366716 A1 | 11/2020 | Singh et al. |
| 2020/0389463 A1 | 12/2020 | Chen |
| 2021/0036851 A1 | 2/2021 | Villapakkam et al. |
| 2021/0064431 A1 | 3/2021 | Smith et al. |
| 2021/0067372 A1 | 3/2021 | Cidon et al. |
| 2021/0067468 A1 | 3/2021 | Cidon et al. |
| 2021/0075870 A1 | 3/2021 | Kempf et al. |
| 2021/0081404 A1 | 3/2021 | Kempf et al. |
| 2021/0084048 A1 | 3/2021 | Kannan et al. |
| 2021/0142276 A1 | 5/2021 | Gupte |
| 2021/0182940 A1 | 6/2021 | Gupta et al. |
| 2021/0216190 A1 | 7/2021 | Vakil et al. |
| 2021/0218722 A1 | 7/2021 | Gaylor et al. |
| 2021/0224076 A1 | 7/2021 | Dockter et al. |
| 2021/0224132 A1 | 7/2021 | Barsalou |
| 2021/0224409 A1 | 7/2021 | Avanes et al. |
| 2021/0226956 A1 | 7/2021 | Wei et al. |
| 2021/0234864 A1 | 7/2021 | Dube et al. |
| 2021/0279109 A1 | 9/2021 | Ji et al. |
| 2021/0334345 A1 | 10/2021 | Sim et al. |
| 2021/0368514 A1 | 11/2021 | Xing |
| 2021/0377272 A1 | 12/2021 | Dasari et al. |
| 2021/0377276 A1 | 12/2021 | Dasari et al. |
| 2021/0377735 A1 | 12/2021 | Latour et al. |
| 2021/0382725 A1 | 12/2021 | Vemula et al. |
| 2021/0383325 A1 | 12/2021 | Loupos et al. |
| 2021/0392048 A1 | 12/2021 | Olden et al. |
| 2021/0392142 A1 | 12/2021 | Stephens et al. |
| 2021/0409403 A1 | 12/2021 | Lewin et al. |
| 2022/0029803 A1 | 1/2022 | Vijayanarayanan |
| 2022/0038449 A1 | 2/2022 | Tripp et al. |
| 2022/0091947 A1 | 3/2022 | Kothari et al. |
| 2022/0103566 A1 | 3/2022 | Faulkner |
| 2022/0103618 A1 | 3/2022 | Pinheiro et al. |
| 2022/0116285 A1 | 4/2022 | Abdollahi et al. |
| 2022/0116286 A1 | 4/2022 | Doshi et al. |
| 2022/0122097 A1 | 4/2022 | Maugans, III |
| 2022/0129575 A1 | 4/2022 | Goel et al. |
| 2022/0150124 A1 | 5/2022 | Cooley et al. |
| 2022/0150133 A1 | 5/2022 | Dhruvakumar et al. |
| 2022/0159010 A1 | 5/2022 | Bandarupalli et al. |
| 2022/0191192 A1 | 6/2022 | Drr et al. |
| 2022/0210018 A1 | 6/2022 | Narula et al. |
| 2022/0244949 A1 | 8/2022 | Iqbal et al. |
| 2022/0255902 A1 | 8/2022 | Woodson |
| 2022/0258066 A1 | 8/2022 | Choi et al. |
| 2022/0263793 A1 | 8/2022 | Baker et al. |
| 2022/0263835 A1 | 8/2022 | Pieczul et al. |
| 2022/0271929 A1 | 8/2022 | Villapakkam et al. |
| 2022/0283926 A1 | 9/2022 | Chirkin et al. |
| 2022/0294818 A1 | 9/2022 | Parekh et al. |
| 2022/0300486 A1 | 9/2022 | Venkateshaiah et al. |
| 2022/0327095 A1 | 10/2022 | Kim et al. |
| 2022/0335340 A1 | 10/2022 | Moustafa et al. |
| 2022/0337578 A1 | 10/2022 | Mankekar et al. |
| 2022/0350675 A1 | 11/2022 | Navali et al. |
| 2022/0353133 A1 | 11/2022 | Shrestha et al. |
| 2022/0353266 A1 | 11/2022 | Ramamurthi et al. |
| 2022/0353267 A1 | 11/2022 | Kundu et al. |
| 2022/0365835 A1 | 11/2022 | Kandasamy et al. |
| 2022/0368813 A1 | 11/2022 | Rossignol et al. |
| 2022/0374271 A1 | 11/2022 | Pogrebinsky et al. |
| 2022/0377111 A1 | 11/2022 | Liao et al. |
| 2022/0382590 A1 | 12/2022 | Hashimoto et al. |
| 2022/0398078 A1 | 12/2022 | Segler |
| 2022/0405152 A1 | 12/2022 | Edamadaka et al. |
| 2022/0413956 A1 | 12/2022 | Mathew et al. |
| 2023/0006889 A1 | 1/2023 | Thyagaturu et al. |
| 2023/0011628 A1 | 1/2023 | Hurley et al. |
| 2023/0068221 A1 | 3/2023 | Magowan et al. |
| 2023/0086475 A1 | 3/2023 | Mosko |
| 2023/0104368 A1 | 4/2023 | Miriyala et al. |
| 2023/0105901 A1 | 4/2023 | Adogla et al. |
| 2023/0107133 A1 | 4/2023 | Ali et al. |
| 2023/0108661 A1 | 4/2023 | Adogla et al. |
| 2023/0109926 A1 | 4/2023 | Nair et al. |
| 2023/0110527 A1 | 4/2023 | Bhat et al. |
| 2023/0116463 A1 | 4/2023 | Rath et al. |
| 2023/0123734 A1 | 4/2023 | Oxman et al. |

(56) References Cited

U.S. PATENT DOCUMENTS

| | | | |
|---|---|---|---|
| 2023/0126757 A1* | 4/2023 | Roy | G06F 11/302 |
| | | | 714/25 |
| 2023/0132478 A1 | 5/2023 | Robinson et al. | |
| 2023/0195926 A1 | 6/2023 | Mehta et al. | |
| 2023/0222550 A1 | 7/2023 | Huang et al. | |
| 2023/0224304 A1 | 7/2023 | Lukanov et al. | |
| 2023/0229543 A1 | 7/2023 | Mohanty et al. | |
| 2023/0244505 A1 | 8/2023 | Hernandez et al. | |
| 2023/0275833 A1 | 8/2023 | Hyun et al. | |
| 2023/0297962 A1 | 9/2023 | Alabdrabalnabi et al. | |
| 2023/0315726 A1 | 10/2023 | Ponjavic et al. | |
| 2023/0316348 A1 | 10/2023 | Dageville et al. | |
| 2023/0328003 A1 | 10/2023 | Agarwal et al. | |
| 2023/0342179 A1 | 10/2023 | Suttle et al. | |
| 2023/0362161 A1 | 11/2023 | Spector et al. | |
| 2023/0367654 A1 | 11/2023 | Kurian et al. | |
| 2023/0370461 A1 | 11/2023 | Kalley et al. | |
| 2023/0385286 A1 | 11/2023 | Glickman et al. | |
| 2023/0393829 A1 | 12/2023 | Panikkar et al. | |
| 2023/0409590 A1 | 12/2023 | Shah et al. | |
| 2024/0015164 A1 | 1/2024 | Guy et al. | |
| 2024/0015165 A1 | 1/2024 | Guy et al. | |
| 2024/0031373 A1 | 1/2024 | Gupta | |
| 2024/0053973 A1 | 2/2024 | Ranganathan et al. | |
| 2024/0054063 A1 | 2/2024 | Wichelman et al. | |
| 2024/0061714 A1 | 2/2024 | Pandit et al. | |
| 2024/0069884 A1 | 2/2024 | Majumdar et al. | |
| 2024/0070735 A1 | 2/2024 | Gallagher et al. | |
| 2024/0089722 A1 | 3/2024 | Samanta et al. | |
| 2024/0095056 A1 | 3/2024 | Adogla et al. | |
| 2024/0095390 A1 | 3/2024 | Chao et al. | |
| 2024/0095739 A1 | 3/2024 | Adogla et al. | |
| 2024/0095809 A1 | 3/2024 | Adogla et al. | |
| 2024/0095865 A1 | 3/2024 | Adogla et al. | |
| 2024/0098088 A1 | 3/2024 | Adogla et al. | |
| 2024/0098089 A1 | 3/2024 | Adogla et al. | |
| 2024/0103818 A1 | 3/2024 | Gallagher et al. | |
| 2024/0106832 A1 | 3/2024 | Adogla et al. | |
| 2024/0137339 A1 | 4/2024 | Vemulpali | |
| 2024/0143351 A1 | 5/2024 | Davis | |
| 2024/0152401 A1 | 5/2024 | Naseem | |
| 2024/0154992 A1 | 5/2024 | Martin et al. | |
| 2024/0160517 A1* | 5/2024 | Fischer | G06F 11/0769 |
| 2024/0171586 A1 | 5/2024 | Jain et al. | |
| 2024/0179146 A1 | 5/2024 | Pinski et al. | |
| 2024/0184465 A1 | 6/2024 | Zwiegincew et al. | |
| 2024/0205235 A1 | 6/2024 | Batni | |
| 2024/0232408 A1 | 7/2024 | Pan et al. | |
| 2024/0235945 A1 | 7/2024 | Togare | |
| 2024/0244053 A1 | 7/2024 | Tian et al. | |
| 2024/0275853 A1 | 8/2024 | Singh et al. | |
| 2024/0291729 A1 | 8/2024 | Khan et al. | |
| 2024/0305622 A1 | 9/2024 | Vijayan et al. | |
| 2024/0320240 A1 | 9/2024 | Podder | |
| 2024/0330069 A1 | 10/2024 | Atur et al. | |
| 2024/0330072 A1 | 10/2024 | Kantamneni et al. | |
| 2024/0364509 A1 | 10/2024 | Potlapally et al. | |
| 2024/0364638 A1 | 10/2024 | Peterson et al. | |
| 2024/0364690 A1 | 10/2024 | Doherty et al. | |
| 2024/0378307 A1 | 11/2024 | Dcosta | |
| 2024/0378518 A1 | 11/2024 | Sparrow et al. | |
| 2024/0388512 A1 | 11/2024 | Tesfatsion et al. | |
| 2024/0414169 A1 | 12/2024 | Fang et al. | |
| 2024/0414518 A1 | 12/2024 | Joseph et al. | |
| 2025/0023844 A1 | 1/2025 | Juneja et al. | |
| 2025/0077214 A1 | 3/2025 | Banaal | |
| 2025/0085978 A1 | 3/2025 | R C et al. | |
| 2025/0097215 A1 | 3/2025 | Vangpat et al. | |
| 2025/0097223 A1 | 3/2025 | Brown et al. | |
| 2025/0106221 A1 | 3/2025 | Wang et al. | |
| 2025/0322077 A1 | 10/2025 | Panwar et al. | |
| 2025/0379830 A1 | 12/2025 | Deowanshi et al. | |

FOREIGN PATENT DOCUMENTS

| | | | |
|---|---|---|---|
| CN | 102656589 A | 9/2012 |
| CN | 104106276 A | 10/2014 |
| CN | 108197493 A | 6/2018 |
| CN | 108696496 A | 10/2018 |
| CN | 114091725 A | 2/2022 |
| CN | 118312629 A | 7/2024 |
| DE | 112021005656 T5 | 8/2023 |
| EP | 2893685 B1 | 7/2017 |
| EP | 3429156 A1 | 1/2019 |
| EP | 3271857 B1 | 4/2020 |
| WO | 2010/088081 A1 | 8/2010 |
| WO | 2012/006638 A1 | 1/2012 |
| WO | 2014/039921 A1 | 3/2014 |
| WO | 2018/010791 A1 | 1/2018 |
| WO | 2019/212773 A1 | 11/2019 |
| WO | 2020/252088 A1 | 12/2020 |
| WO | 2021/030220 A1 | 2/2021 |
| WO | 2021/051933 A1 | 3/2021 |
| WO | 2021/145894 A1 | 7/2021 |
| WO | 2021/150306 A1 | 7/2021 |
| WO | 2021/150307 A1 | 7/2021 |
| WO | 2021/150366 A1 | 7/2021 |
| WO | 2021/150435 A1 | 7/2021 |
| WO | 2021/174104 A1 | 9/2021 |
| WO | 2022/005992 A1 | 1/2022 |
| WO | 2022/104395 A1 | 5/2022 |
| WO | 2022/104396 A1 | 5/2022 |

OTHER PUBLICATIONS

"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.

"General Variables for All Requests", Jun. 28, 2023, pp. 6.

"Overview of Access Approval", Retrieved from https://cloud.google.com/assured-workloads/access-approval/docs/overview, Jun. 6, 2024, pp. 5.

"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.

"Policy Syntax", Jan. 4, 2023, pp. 7.

"Reinstate admin privileges for a customer's Azure CSP subscriptions", Retrieved from https://learn.microsoft.com/en-us/partner-center/reinstate-csp, Aug. 1, 2023, pp. 7.

"Tenant administrator settings", Retrieved from https://backstage.forgerock.com/docs/idcloud/latest/tenants/tenant-administrator-settings.html, Jun. 7, 2023, p. 12.

"Verbs", Jun. 5, 2023, pp. 2.

Anonymbus: "Tokenization—(data security)", Wikipedia, Feb. 12, 2023, pp. 1-12.

Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.

Ducharme et al., "Seamlessly Protect Your IBM Cloud Application Infrastructure with Privileged Access Gateway", Oct. 3, 2022, pp. 13.

George et al., "Data anonymization and integrity checking in cloud computing", 2013 Fourth International Conference on Computing, Communications and Networking Technologies (ICCCNT), Jul. 2013, pp. 5.

Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.

Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.

(56) References Cited

OTHER PUBLICATIONS

Anonymous: "Oracle Cloud Infrastructure Documentation—Security Guide for Exadata Database Service on Cloud@Customer Systems", Apr. 1, 2023, XP093181902.
Anonymous: "Oracle Cloud Infrastructure Documentation—Overview of IAM", Feb. 8, 2023, XP093184083.
Anonymous: "Oracle Cloud Infrastructure Documentation—Renaming a Cloud Account", May 14, 2021, XP093185071.
Anonymous: "Oracle Cloud Infrastructure Documentation—Site-to-Site VPN Overview", Feb. 8, 2023, XP093184733.
Anonymous: "Oracle Cloud Infrastructure Documentation—Billing and cost management overview", Dec. 20, 2022, XP093183514.
Anonymous: "Oracle Cloud Infrastructure Documentation—Cloud Guard concepts", Jan. 18, 2022, XP093183028.
Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973.
Anonymous: "Oracle Operator Access Control Configuration and Administration Guide", Nov. 18, 2022, XP093181896.
Anonymous: "Oracle Public Sector Licensing and Permitting", 2022, XP093184298.
Anonymous: "Oracle Sovereign Cloud", Feb. 15, 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).
"Cloud External Key Manager," Retrieved from https://cloud.google.com/kms/docs/ekm, Mar. 4, 2024, pp. 5.
"CNAME Record", Wikipedia, Available Online at: https://en.wikipedia.org/w/index.php?title=CNAME_record&oldld=1105641340, Accessed from Internet on Jan. 24, 2024, 4 pages.
"Dedicated Region Cloud@Customer", Available Online at: https://web.archive.org/web/20220705140320if_/https://www.oracle.com/a/ocom/docs/cloud/dedicated-region-cloud-customer-product-brief.pdf, Jul. 5, 2022, 4 pages.
"Developing System Services in Oracle Solaris 11.3", Oracle, Available Online at: https://docs.oracle.com/cd/E53394_01/pdf/E60814.pdf, Sep. 1, 2018, 76 pages.
"External Key Management for AWS by T-Systems, AWS Premier Consulting and Security Competency Partner," Retrieved from https://www.t-systems.com/resource/blob/565764/35be2fbd609320ec590eea9c5fbdf592/DL-Flyer-External-Key-Managment-for-AWS-T-Systems-EN-08-2023.pdf, Retrieved on Jul. 30, 2024, pp. 2.
"External key stores," Retrieved from https://docs.aws.amazon.com/kms/latest/developerguide/keystore-external.html, Mar. 4, 2024, pp. 16.

"Generating and using SSH keys for remote host authentication," Retrieved from https://cloud.ibm.com/docs/ssh-keys?topic=ssh-keys-generating-and-using-ssh-keys-for-remote-host-authentication, Apr. 27, 2023, pp. 5.
"Integrating Skyhigh CASB On-Prem Proxy with aKey Management Server," Retrieved from https://success.skyhighsecurity.com/Skyhigh_CASB/Skyhigh_CASB_Settings/On-Prem_Proxy/zIntegrating_MVISION_Cloud_On-Prem_Proxy_with_a_Key_Management_Server, Sep. 3, 2021, pp. 3.
"Key Management Interoperability Protocol (KMIP)," Retrieved from https://www.encryptionconsulting.com/education-center/kmip/#:~:text=KMIP%20is%20an%20extensible%20communication,by%20simplifying%20encryption%20key%20management., Retrieved on Jul. 30, 2024, pp. 5.
"Multicloud Architecture Partitioned, Cloud Burst and DR", NetApp, Apr. 9, 2020, 7 pages.
"New: Using Amazon EC2 Instance Connect for SSH access to your EC2 Instances," Retrieved from https://aws.amazon.com/blogs/compute/new-using-amazon-ec2-instance-connect-for-ssh-access-to-your-ec2-instances/, Retrieved on Aug. 5, 2024, pp. 12.
"Sepior's Cloud Encryption Technology Now Supports Key Management Interoperability Protocol (KMIP)," Sepior, Nov. 10, 2017, pp. 4.
"SSH Certificates Management Automation Made Easy Introducing Certonid," Retrieved from https://mailtrap.io/blog/certonid/, Retrieved on Aug. 5, 2024, pp. 19.
"StorMagic-SvKMS-Data-Sheet," Retrieved from https://stormagic.com/pdf/data-sheet/StorMagic-SvKMS-Data-Sheet.pdf, 2023, pp. 4.
10 Reasons to Become an AwesomeCloud Channel Partner, Available online at: https://www.awesomecloud.com/about/why-awesomecloud/, 2023, 3 pages.
Aldossary, "A Review of Dynamic Resource Management in Cloud Computing Environments", Computer Systems Science and Engineering, vol. 36, No. 3, 2021, pp. 461-476.
Anonymous: "AWS Identity and Access Management user guide—first 400 pages", Mar. 15, 2024, https://web.archive.org/web/20240315183106if_/https://docs.aws.amazon.com/pdfs/IAM/latest/UserGuide/iam-ug.pdf, pp. 4215.
Anonymous: "IAM Roles Anywhere with an external certificate authority : AWS Security Blog", Oct. 20, 2023, Retrieved from https://aws.amazon.com/blogs/security/ iam-roles-anywhere-with-an-external-certificate-authority/, pp. 1-18.
Anonymous: "OCI Documentation—Managing Key Pairs on Linux Instances", Mar. 6, 2024, https://web.archive.org/web/20240306214752/https://docs.oracle.com/en-us/iaas/Content/Compute/Tasks/managingkeypairs.htm.
Anonymous: "OCI Documentation—Security Credentials", Dec. 11, 2023, https://web.archive.org/web/20231211222908/https://docs.oracle.com/en-us/iaas/Content/General/Concepts/credentials.htm.
Anonymous: "Set up AWS Private Certificate Authority to issue certificates for use with IAM Roles Anywhere : AWS Security Blog", Retrieved from https://aws.amazon.com/blogs/security/set-up-aws-private-certificate-authority-to-issue-certificates-for-use-with-iam-roles-anywhere/, Nov. 8, 2023, pp. 1-14.
U.S. Appl. No. 18/368,884, Final Office Action, Mailed on Nov. 10, 2025, 58 pages.
U.S. Appl. No. 18/468,024, Notice of Allowance, Mailed on Jun. 23, 2025, 8 pages.
U.S. Appl. No. 18/468,238 , Notice of Allowance, Mailed on Jul. 3, 2025, 9 pages.
AwesomeCloud Services, Available online at: https://www.awesomecloud.com/about/, Accessed from internet on Jan. 18, 2023, 2 pages.
Azure Marketplace Service Providers Guide, Available online at: https://docs.azure.cn/en-us/articles/azure-marketplace/publishguide, Mar. 9, 2021, 9 pages.
Bridgwater, "Location, Location, Partition How to Beat Latency as Cloud Grows", Forbes, Dec. 3, 2020, 5 pages.
Cloud Reseller Program Overview, Available online at: https://www.awesomecloud.com/cloud-reseller-program/, 2023, 3 pages.

(56)        References Cited

OTHER PUBLICATIONS

Create a Private Marketplace, Available online at: https://cloud.google.com/marketplace/docs/governance/private-marketplace, Accessed from internet on Jan. 18, 2023, 2 pages.
Direct as-a-Service Sales Platform, Available online at: https://www.appxite.com/cloud-saas-sellers, 2022, 3 pages.
Drive Revenue by Selling in AWS Marketplace, Available online at: https://aws.amazon.com/marketplace/partners/management-tour, Accessed from internet on Jan. 18, 2023, 7 pages.
Enable Google Private Marketplace, Available online at: https://cloud.google.com/marketplace/docs/governance/enable-private-marketplace, Accessed from internet on Jan. 18, 2023, 2 pages.
Ferry, "Kubernetes Namespaces Isolation—What It is, What It Isn't, Life, Universe and Everything", SynActiv, 2021, 13 pages.
Gholipour et al., "Recent Advances in Energy-Efficient Resource Management Techniques in Cloud Computing Environments", New Frontiers in Cloud Computing and Internet of Things, 2021, pp. 31-68.
Girola et al., "IBM Data Center Networking; Planning for Virtualization and Cloud Computing", Redbooks, May 9, 2011, 258 pages.
Google Cloud Platform Services Summary, Available online at: https://cloud.google.com/terms/services, Accessed from internet on Jan. 18, 2023, 25 pages.
Huey Patricia et al., "Oracle Database Security Guide", Nov. 2023, https://web.archive.org/web/20231121145008if_/https://docs.oracle.com/en/database/oracle/oracle-database/23/dbseg/database-security-guide.pdf, pp. 1327.
International Application No. PCT/US2023/074323, International Search Report and the Written Opinion, mailed on Nov. 22, 2023, 15 pages.
International Application No. PCT/US2023/074322, International Preliminary Report on Patentability mailed on Mar. 27, 2025, 9 pages.
International Application No. PCT/US2023/074322, International Search Report and Written Opinion, mailed on Nov. 22, 2023, 12 pages.
International Application No. PCT/US2023/074323, International Preliminary Report on Patentability mailed on Mar. 27, 2025, 10 pages.
International Application No. PCT/US2023/074325, International Preliminary Report on Patentability mailed on Mar. 27, 2025, 10 pages.
International Application No. PCT/US2023/074325, International Search Report and the Written Opinion, mailed on Nov. 22, 2023, 13 pages.
International Application No. PCT/US2023/074330, International Preliminary Report on Patentability mailed on Mar. 27, 2025, 10 pages.
International Application No. PCT/US2023/074330, International Search Report and the Written Opinion, mailed on Dec. 19, 2023, 14 pages.
International Application No. PCT/US2023/074341, International Preliminary Report on Patentability mailed on Mar. 27, 2025, 11 pages.
International Application No. PCT/US2023/074341, International Search Report and Written Opinion, mailed on Dec. 8, 2023, 15 pages.
International Application No. PCT/US2023/074342, International Preliminary Report on Patentability mailed on Mar. 27, 2025, 10 pages.
International Application No. PCT/US2023/074342, International Search Report and Written Opinion, mailed on Dec. 8, 2023, 13 pages.
International Application No. PCT/US2023/074343, International Preliminary Report on Patentability mailed on Mar. 27, 2025, 9 pages.
International Application No. PCT/US2023/074343, International Search Report and Written Opinion, mailed on Jan. 29, 2024, 13 pages.

International Application No. PCT/US2023/074344, International Preliminary Report on Patentability mailed on Mar. 27, 2025, 10 pages.
International Application No. PCT/US2023/074344, International Search Report and Written Opinion, mailed on Dec. 19, 2023, 13 pages.
International Application No. PCT/US2024/028744, International Search Report and Written Opinion mailed on Jul. 23, 2024, 16 pages.
International Application No. PCT/US2024/028767, "International Search Report and Written Opinion", mailed Sep. 10, 2024, 13 pages.
International Application No. PCT/US2024/028788, International Search Report and Written Opinion mailed on Jul. 23, 2024, 16 pages.
International Application No. PCT/US2024/029210, "International Search Report and Written Opinion", mailed Sep. 16, 2024, 12 pages.
International Application No. PCT/US2024/029417, "International Search Report and Written Opinion", mailed Sep. 16, 2024, 12 pages.
International Application No. PCT/US2024/030201, "International Search Report and Written Opinion", mailed Sep. 16, 2024, 12 pages.
International Application No. PCT/US2024/030208, "International Search Report and Written Opinion", mailed Sep. 16, 2024, 13 pages.
International Application No. PCT/US2024/030212, "International Search Report and Written Opinion", mailed Sep. 16, 2024, 12 pages.
Krichen et al., "Towards Optimizing the Placement of Security Testing Components for Internet of Things Architectures", 2019 Institute of Electrical and Electronics Engineers/ACS 16th International Conference on Computer Systems and Applications (AICCSA), 2019, 2 pages.
Machine translation of CN 102656589 A, published on Sep. 5, 2012, 228 pages.
Machine translation of CN 104106276 A, published on Oct. 15, 2014, 347 pages.
Machine translation of CN 108197493 A, published on Jun. 22, 2018, 43 pages.
Mampage et al., "A Holistic View on Resource Management in Serverless Computing Environments Taxonomy and Future Directions", Research Gate, ACM Computing Surveys, 2022, 34 pages.
Marketplace Management, Available online at: https://www.appxite.com/platform/manage-marketplace?hsLang=en, 2022, 4 pages.
Marketplace Setup, Available online at: https://www.appxite.com/platform/launch-marketplace?hsLang=en, 2022, 3 pages.
Microsoft Learn, "Azure Key Vault REST API reference", Apr. 19, 2023, Available online at <https://learn.microsoft.com/en-us/rest/api/keyvault/>, 12 pages.
Microsoft Learn: "Connect to a Key Vault via private endpoint—Code Samples", Jul. 6, 2022, Available online at <https://learn.microsoft.com/en-us/samples/azure/azure-quickstart-templates/key-vault-private-endpoint/>, 5 pages.
Nolle, "Operational Strategies for Isolation in Cloud Computing", Tech Target, Sep. 15, 2021, 6 pages.
Organization Governance for Google Cloud Marketplace, Available online at: https://cloud.google.com/marketplace/docs/governance, Accessed from internet on Jan. 18, 2023, 1 page.
Palanisamy, "Cloud-based and Containerized Testing Environments Revolutionizing Text Automation", International Journal of Science and Research Archive, 2021, 11 pages.
Power your Cloud Business with StreamOne Cloud Marketplace, Available online at: https://asia.techdata.com/sg/wp-content/uploads/2021/01/SCM_TD_10.23.pdf, 2 pages.
Private Marketplace, Available online at: https://aws.amazon.com/marketplace/features/privatemarketplace, 2023, 4 pages.
Resell Cloud Marketplace Products from Independent Software Vendors (ISVs), Available online at: https://cloud.google.com/marketplace/docs/partners/resell, Accessed from internet on Jan. 18, 2023, 1 page.

(56)　　　　　References Cited

OTHER PUBLICATIONS

Set up your Cloud Marketplace Products for Resale, Available online at: https://cloud.google.com/marketplace/docs/partners/resell/set-up-reselling, Accessed from internet on Jan. 18, 2023, 2 pages.

U.S. Appl. No. 18/498,964, Non-Final Office Action mailed on Jul. 29, 2025, 23 pages.

U.S. Appl. No. 18/537,902, Non-Final Office Action, mailed on May 20, 2025, 10 pages.

U.S. Appl. No. 18/368,870, Non-Final Office Action mailed on Mar. 31, 2025, 11 pages.

U.S. Appl. No. 18/368,884, Non-Final Office Action mailed on Mar. 6, 2025, 44 pages.

U.S. Appl. No. 18/468,037, Non-Final Office Action mailed on Mar. 20, 2025, 8 pages.

U.S. Appl. No. 18/468,044, Non-Final Office Action mailed on May 19, 2025, 22 pages.

U.S. Appl. No. 18/468,047, Non-Final Office Action mailed on May 23, 2025, 11 pages.

Vanbenschoten et al., "Enabling the Next Generation of Multi-Region Applications with CockroachDB", Available Online at https//www cockroachlabs com/pdf/SIGMOD2022 pdf, Jun. 11, 2022, 14 pages.

Vidich, "Microsoft Publishes Secure Isolation Guidance for Azure and Azure Government", Microsoft, Dev Blogs, Aug. 31, 2020, 6 pages.

Want to Resell Public Cloud Services?, Available online at: https://ngkloud.com/resell-public-cloud/, 2021, 3 pages.

What is AWS Marketplace, Available online at: https://docs.aws.amazon.com/marketplace/latest/userguide/what-is-marketplace.html, Accessed from internet on Jan. 18, 2023, 5 pages.

What is Azure Marketplace?, Available online at: https://learn.microsoft.com/en-us/marketplace/azure-marketplace-overview?source=recommendations, Dec. 30, 2022, 9 pages.

What is Google Cloud Marketplace?, Available online at: https://cloud.google.com/marketplace/docs, Accessed from internet on Jan. 18, 2023, 2 pages.

Yedida et al., "Partitioning Cloud-based Microservices", Research Gate, via Deep Learning, Sep. 29, 2021, 11 pages.

U.S. Appl. No. 18/498,964 , Notice of Allowance, Mailed on Nov. 18, 2025, 10 pages.

Brassil, Physical Layer Network Isolation in Multi-tenant Clouds, Institute of Electrical and Electronics Engineers 30th International Conference on Distributed Computing Systems Workshops, Jul. 2010, pp. 77-81.

E2E Network Slicing—Key 5G technology—What is it? Why do we need it? How do we implement it? By Harrison et al (Year: 2015).

N. Katica and A. Tahirovic, "Opportunities for telecom operators in cloud computing business," 2012 Proceedings of the 35th International Convention MIPRO, Opatija, Croatia, 2012, pp. 495-500. (Year: 2012).

Study of Software as a Service Support Platform for Small and Medium Businesses Chang-Jie Guo, Wei Sun, Zhong-Bo Jiang, Ying Huang, Bo Gao, and Zhi-Hu Wang (Year: 2011).

U.S. Appl. No. 18/368,863, Non-Final Office Action mailed on Jun. 17, 2025, 11 pages.

U.S. Appl. No. 18/368,881, Non-Final Office Action mailed on Jan. 6, 2026, 25 pages.

U.S. Appl. No. 18/468,037, Notice of Allowance mailed on Dec. 23, 2025, 9 pages.

U.S. Appl. No. 18/468,047, Final Office Action mailed on Jan. 15, 2026, 10 pages.

U.S. Appl. No. 18/647,741, Non-Final Office Action mailed on Nov. 4, 2025, 17 pages.

U.S. Appl. No. 18/647,893, Notice of Allowance mailed on Sep. 15, 2025, 9 pages.

U.S. Appl. No. 18/647,971, Non-Final Office Action mailed on Oct. 10, 2025, 16 pages.

* cited by examiner

1202

Data Corpus
1200

Downstream Dependency Graph for a Service Feature of Service A

1210

| Service A<br>1208h | Service B<br>1208i | Service D<br>1208j |
|---|---|---|

| Service Feature<br>1206h | Service Feature<br>1206i | Service Feature<br>1206n |
|---|---|---|

1212a

1212d

⋮

Service Feature
1206p

1212e

1212

| Service C<br>1208k | Service E<br>1208m |
|---|---|

| Service Feature<br>1206k | Service Feature<br>1206q |
|---|---|

1212b

⋮ 1212f

Service Feature
1206m

1212c

HEALTH METRICS ASSOCIATED WITH CLOUD SERVICES

BENEFIT CLAIMS; RELATED APPLICATIONS; INCORPORATION BY REFERENCE

This application claims the benefit of the following U.S. Provisional Patent Applications, which are hereby incorporated by reference: U.S. Provisional Patent Application No. 63/462,875, titled "SYSTEM AND METHOD FOR PROVIDING DEDICATED CLOUD ENVIRONMENTS FOR USE WITH A CLOUD COMPUTING INFRASTRUCTURE," filed Apr. 28, 2023; and U.S. Provisional Patent Application No. 63/503,143, titled "TECHNIQUES FOR VALIDATING AND TRACKING REGION BUILD SKILLS," filed May 18, 2023.

The following U.S. Patent Applications are hereby incorporated by reference: U.S. patent application Ser. No. 18/647,893, titled "MANAGING RESOURCE CONSTRAINTS IN A CLOUD ENVIRONMENT," filed Apr. 26, 2024; U.S. patent application Ser. No. 18/647,971, titled "RESPONDING TO TRIGGER EVENTS THAT THREATEN AN OPERABILITY OF A CLOUD INFRASTRUCTURE," filed Apr. 26, 2024; U.S. patent application Ser. No. 18/498,964, titled "SKILLS SERVICE CONFIGURED TO MANAGE ASPECTS OF A BUILDING A DATA CENTER," filed Oct. 31, 2023; U.S. patent application Ser. No. 18/520,103, titled "TRACKING DATA CENTER BUILD DEPENDENCIES WITH CAPABILITIES AND SKILLS," filed Nov. 27, 2023; and U.S. patent application Ser. No. 18/537,902, titled "TRACKING DATA CENTER BUILD HEALTH," filed Dec. 13, 2023.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cloud environments. In particular, the present disclosure relates to providing health metrics for services of a cloud environment.

BACKGROUND

A cloud computing environment can be used to provide access to a range of complementary cloud-based components, such as software applications or services, that enable organizations or enterprise customers to operate their applications and services in a highly available hosted environment. The benefits to an organization in moving their application and service needs to a cloud environment include a reduction in the cost and complexity of designing, building, operating, and maintaining their own on-premise data center, software application framework, or other information technology infrastructure.

Organizations that utilize a cloud environment may utilize various techniques to monitor the operations and performance of the cloud environment. Cloud operators may monitor the operations and performance of the cloud environment, to gain insights into system health, detect operational issues, optimize resource allocation or utilization, and promptly respond to issues that may arise.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
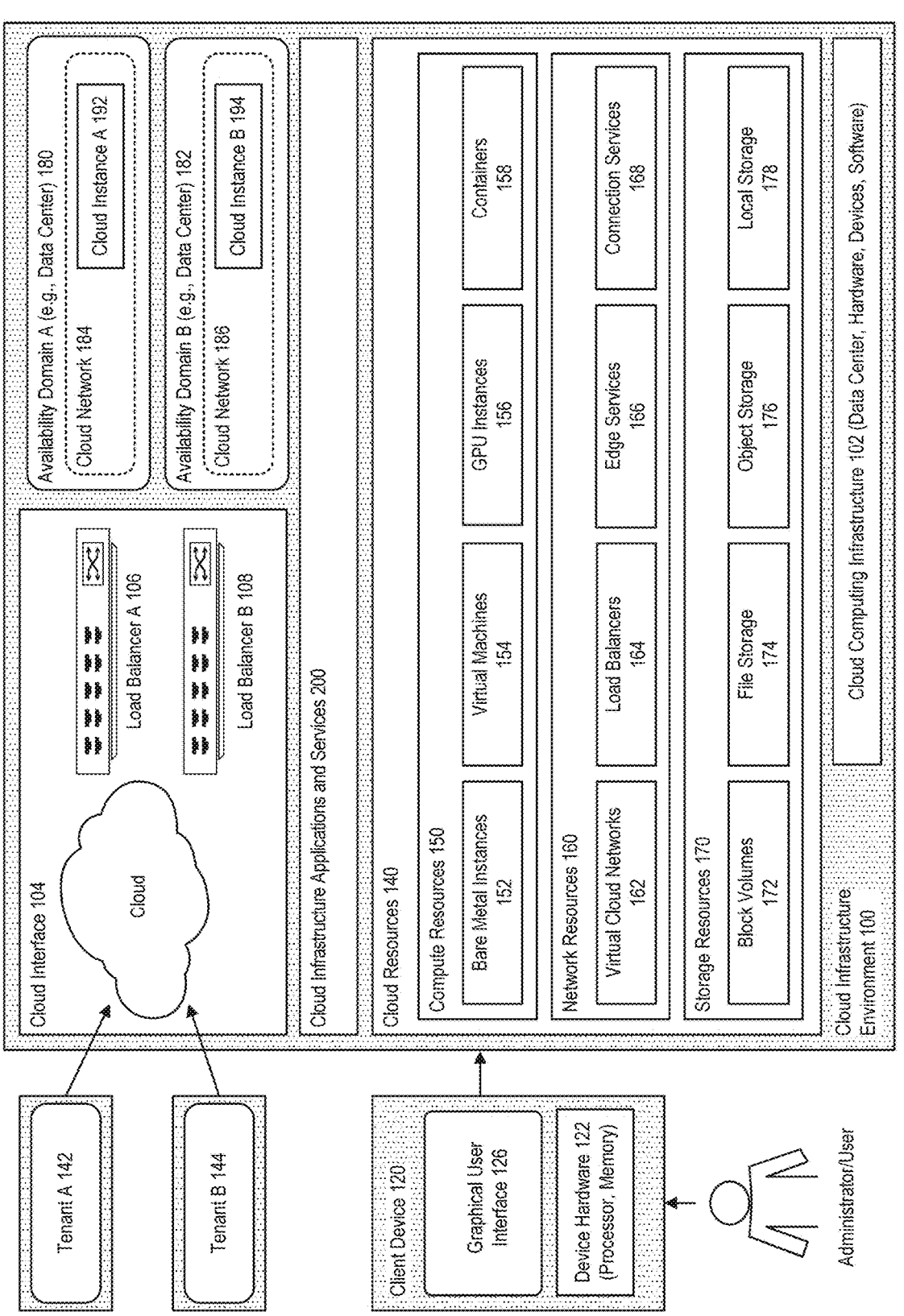
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE CLOUD ENVIRONMENTS
3. SYSTEM ARCHITECTURE FOR SERVICE HEALTH MONITORING
4. EXAMPLE OPERATIONS FOR GENERATING HEALTH METRICS
5. EXAMPLE HEALTH METRICS
6. EXAMPLE SERVICE HEALTH INTERFACES
7. MISCELLANEOUS; EXTENSIONS

1. General Overview

One or more embodiments include a health monitoring utility that generates health metrics for services based on alarm data corresponding to service features that are mapped to the service. The health metrics indicate whether a service is health or unhealth based on whether the service features of the service are healthy or unhealthy. By generating health metrics that are based on the particular service features of a service, the health metrics reflect the extent that particular service features impact the health of the service. Additionally, the health metrics indicate whether a service is health or unhealth based on an impact that services features of a service have on downstream service features. By generating health metrics that are based on an impact that the particular services have on downstream services, the health metrics for a particular reflect not only the health of the services themselves, but also the extent that particular service features impact the health of other services.

One or more embodiments determine the health of a service based on a mapping between the service and a set of one or more service features of the service that are associated with a detected alarm. In one example, a health monitoring utility determines that a detected alarm is associated with a service feature, and that the service feature is associated with a service of a cloud environment. The health monitoring utility computes a health metric for the service, based at least on the detected alarm that is associated with the service feature. Additionally, the health monitoring utility generates a visual representation that includes the health metric for display on a service health interface associated with the health monitoring utility.

Additionally, or alternatively, one or more embodiments determine the health of a service based on an impact that service features of the service have on downstream service features. In one example, a health monitoring utility determines an impact weight for a first service feature of a service based on a set of downstream service features that depend on the first service feature. The health monitoring utility then computes a weighted health metric for the service by applying the impact weight to a health metric for the service. The health monitoring utility generates a visual representation that includes the weighted health metric, and the visual representation is displayed on a service health interface. Additionally, or alternatively, the health monitoring utility may determine the health of a service based on an impact that upstream service features have on a service feature of the service.

The health metrics may be based on effects of detected alarms on service features, services, and/or the cloud environment. Additionally, or alternatively, the health metrics may be based on user-defined valuations for respective service features and/or services. In one example, the health monitoring utility may determine a health metric for a particular service that represents a health state of the particular service based on the status of one or more service features of the particular service. Additionally, or alternatively, the health monitoring utility may determine a health metric for a particular service that represents an impact of upstream services and/or service features that are depended upon by the particular service. Additionally, or alternatively, the health monitoring utility may determine a health metric for a particular service that represents an impact of the particular service on one or more downstream services features and/or service that depend upon the particular service. In one example, health metrics may be determined for a plurality of services, and the plurality of services may be ranked and displayed according to rank. The ranking may be based on the effects of detected alarms and/or user-defined valuations. Cloud operators may utilize the rankings to identify particular services for focusing operational activities, such as troubleshooting of alarms or performing system maintenance.

In one example, a cloud infrastructure provider deploys one or more instances of the health monitoring utility to the cloud environment. Additionally, or alternatively, the cloud infrastructure provider deploys one or more instances of the service health interface to the cloud environment. In one example, an instance of the health monitoring utility and/or the service health interface is deployed to a particular partition, such as a realm a region, or a tenancy, of a cloud environment. One or more cloud operators may access and utilize the health monitoring utility to monitor the operations and performance of the cloud environment. The health monitoring utility may provide insights into system health and/or identify operational issues. Additionally, or alternatively, cloud operators may utilize the health monitoring utility to optimize resource allocation or utilization and/or to promptly respond to issues that may arise. In one example, the partition is a realm, and a cloud operator for the realm utilizes the health monitoring utility to monitor the operations and performance of the realm. In on example, the partition is a region, and a cloud operator for the region utilizes the health monitoring utility to monitor the operations and performance of the region. In on example, the partition is a tenancy, and a cloud operator for the tenancy utilizes the health monitoring utility to monitor the operations and performance of the tenancy. In one example, the partition is a dedicated or private label cloud (PLC) tenancy provisioned for a PLC operator such as a customer that operates as reseller. The cloud infrastructure provider may transfer operation of the partition to the PLC operator or customer after deployment of the health monitoring utility.

One or more embodiments described in this Specification and/or recited in the claims may not be included in this General Overview section.

2. Example Cloud Environments

One or more embodiments provide features associated with cloud environments, including PLC environments. The cloud environments can be utilized, for example, by customers or tenants of a cloud infrastructure provider or reseller, in accessing software products, services, or other cloud offerings.

A cloud computing or cloud infrastructure environment can be used to provide access to a range of complementary cloud-based components, such as software applications or services, that enable organizations or enterprise customers to operate their applications and services in a highly available hosted environment. The benefits to an organization in moving their application and service needs to a cloud infrastructure environment include a reduction in the cost and complexity of designing, building, operating, and maintaining their own on-premise data center, software application framework, or other information technology infrastructure. Organizations that utilize a cloud environment may utilize various operational tools to monitor the operations and performance of the cloud environment.

Cloud Infrastructure Environments

Figure 2:
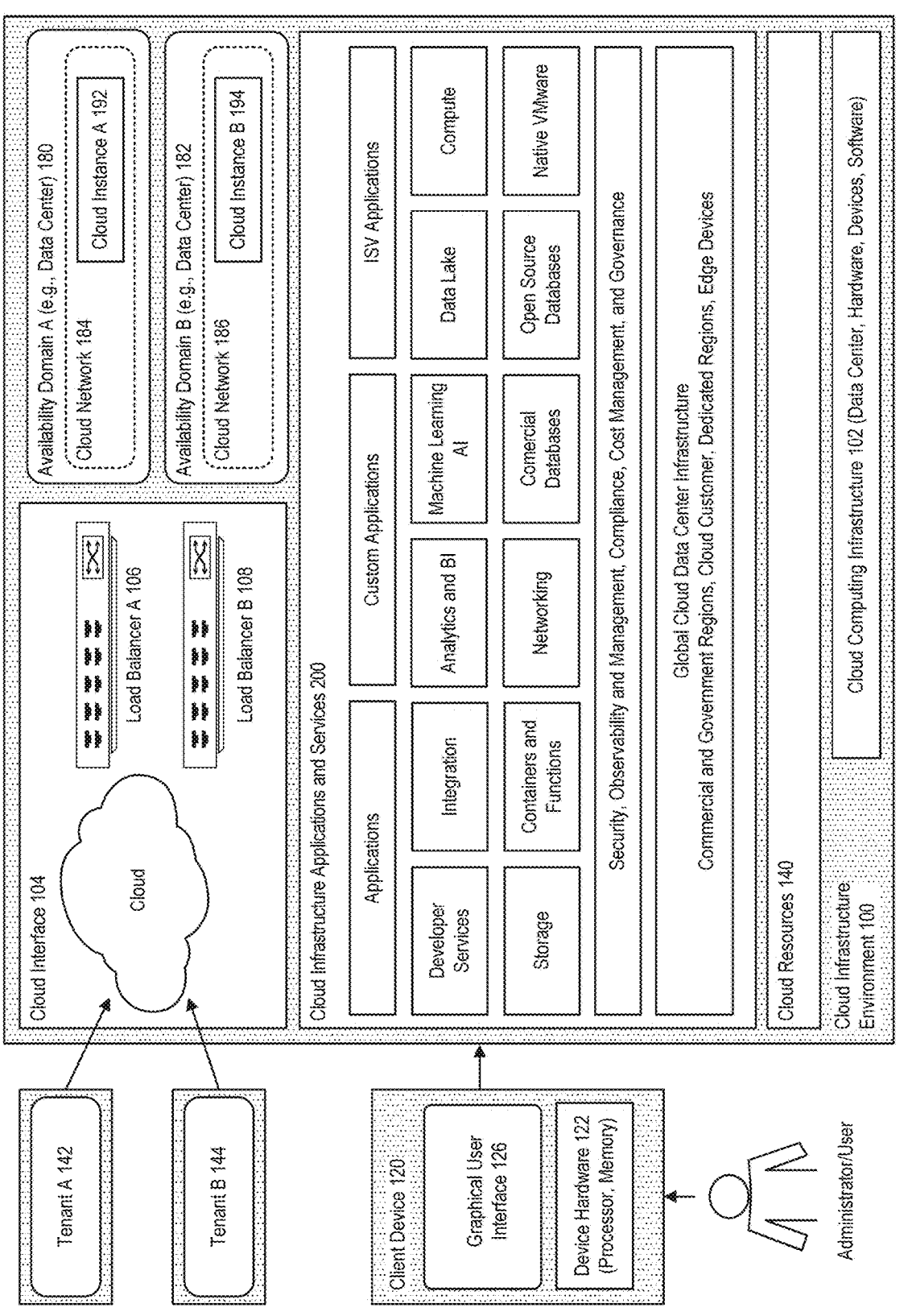
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS.

An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
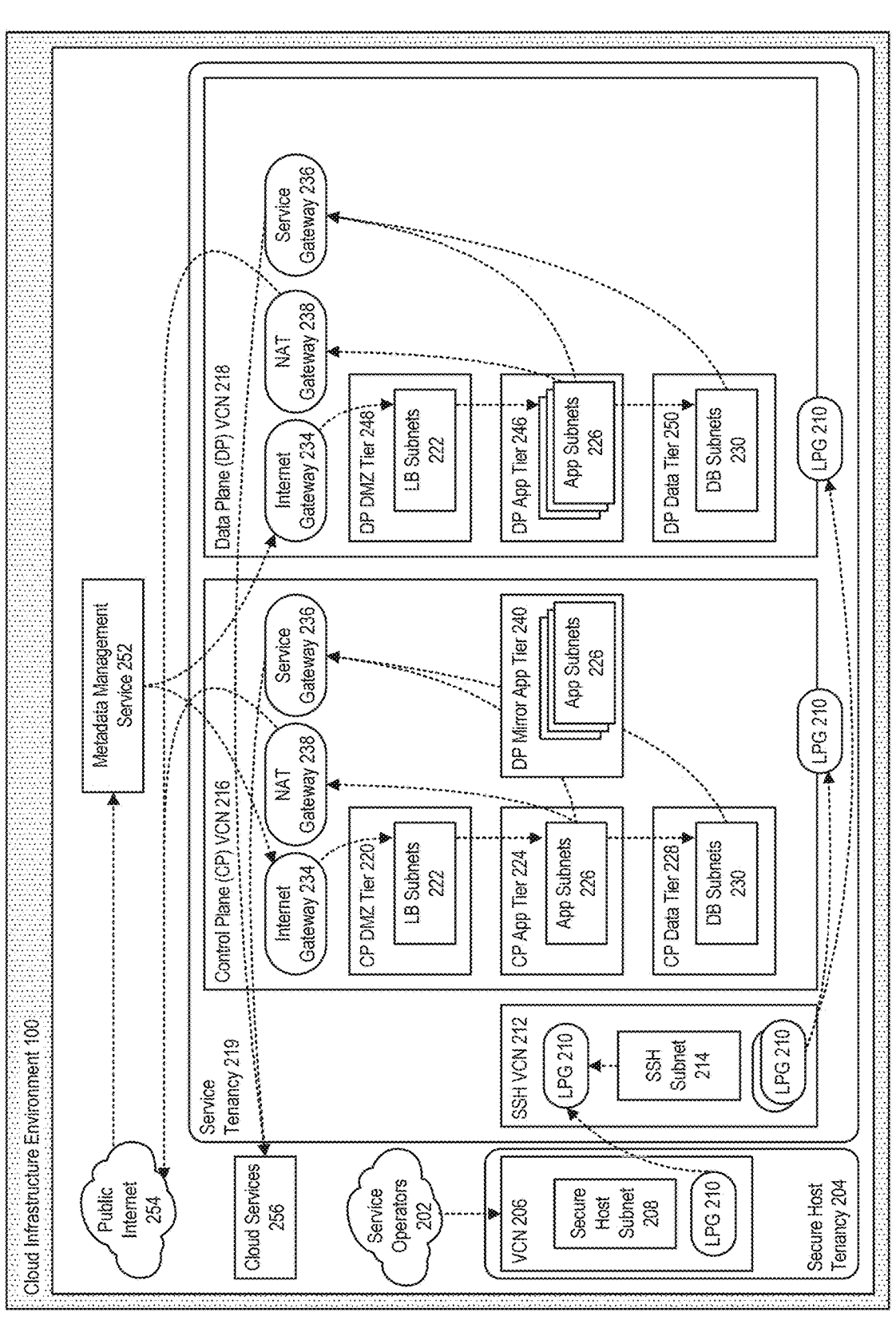
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
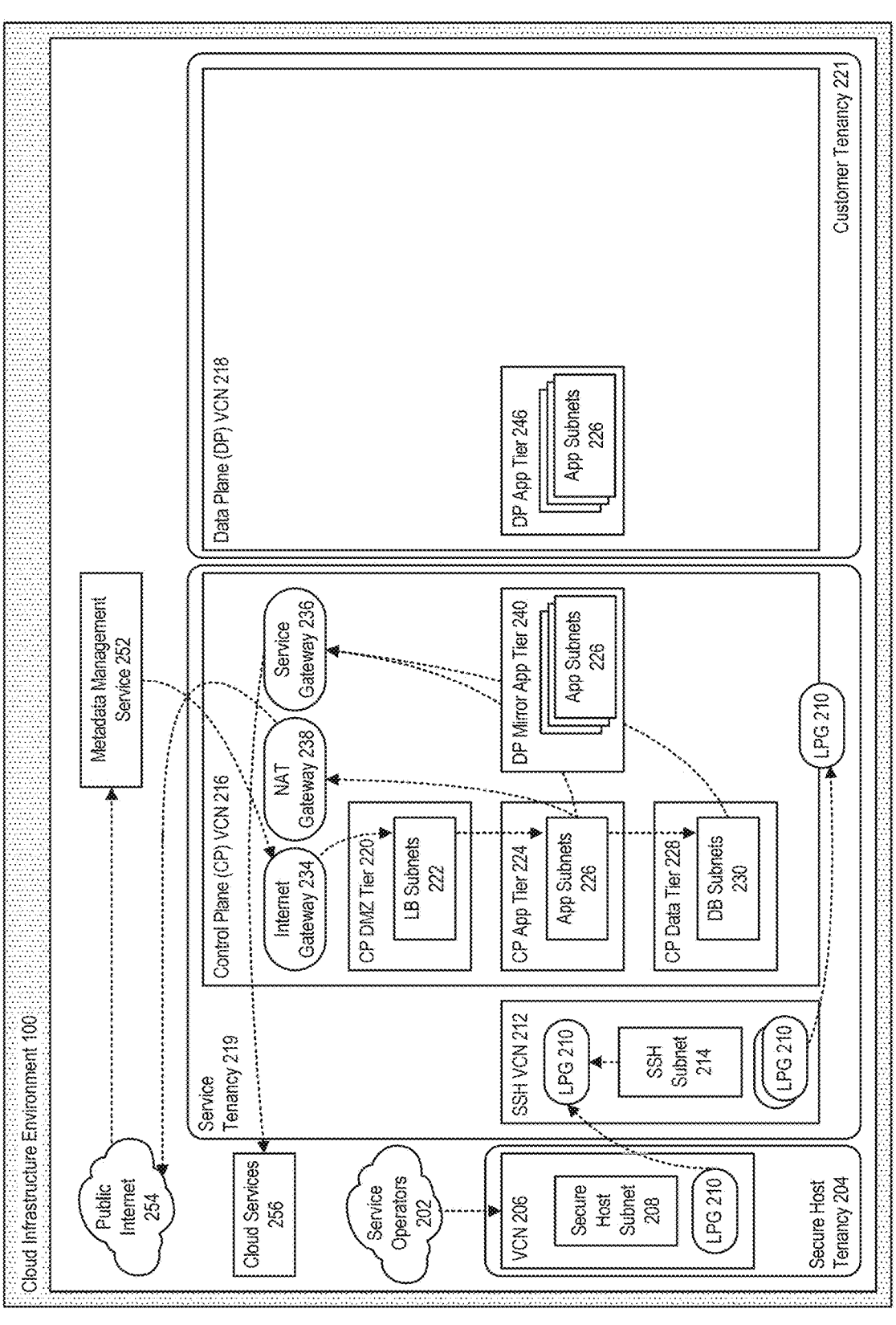
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
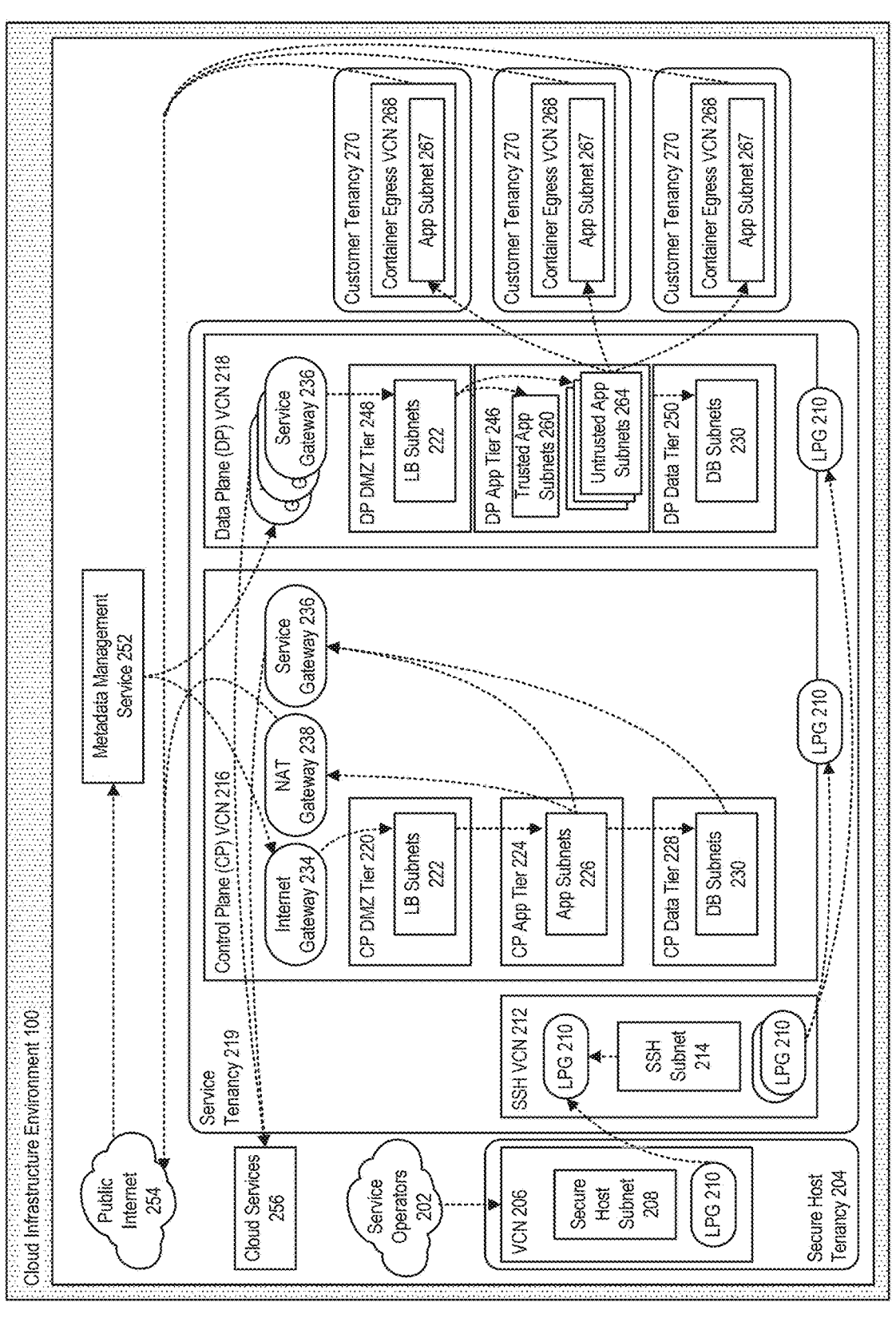
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
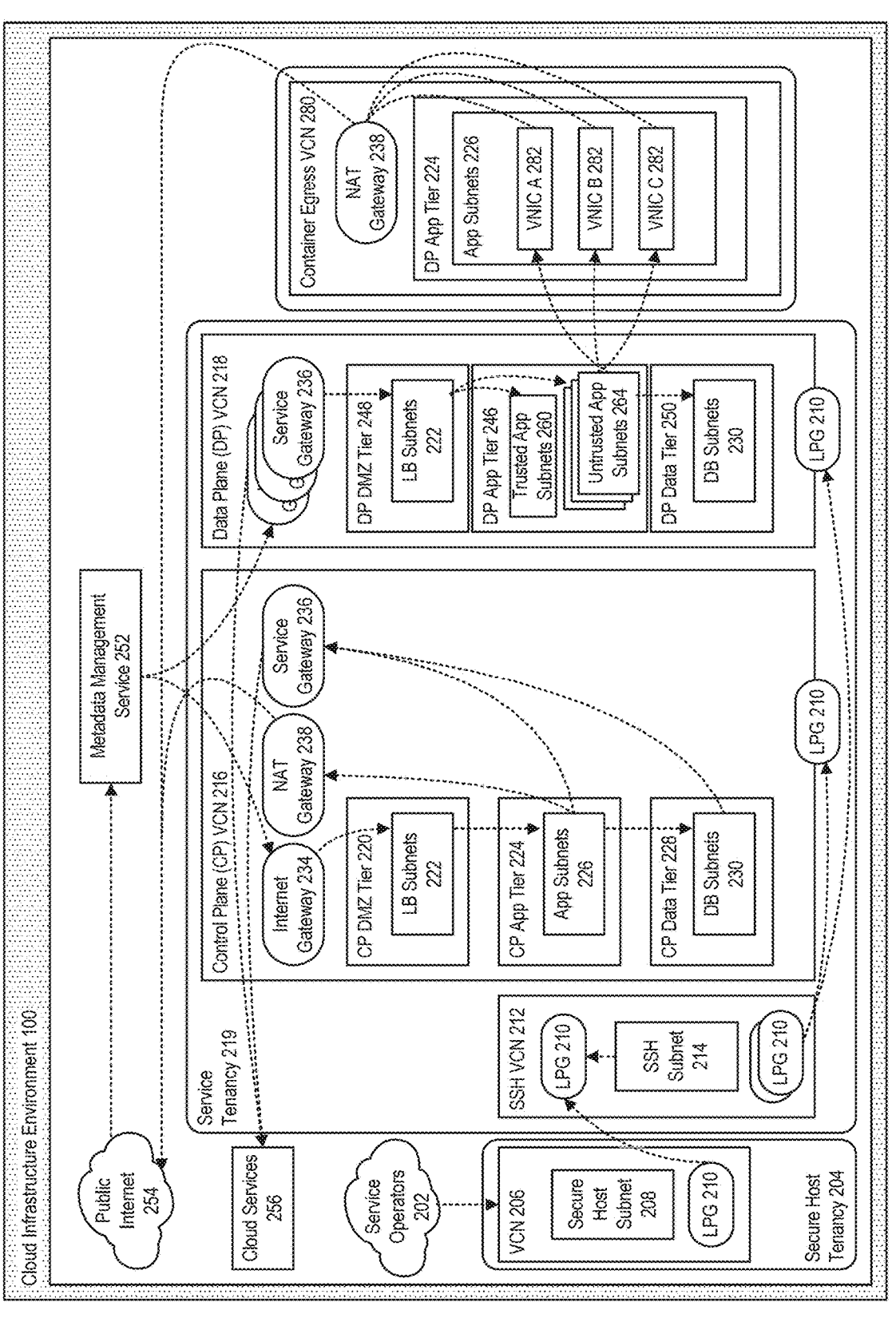
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
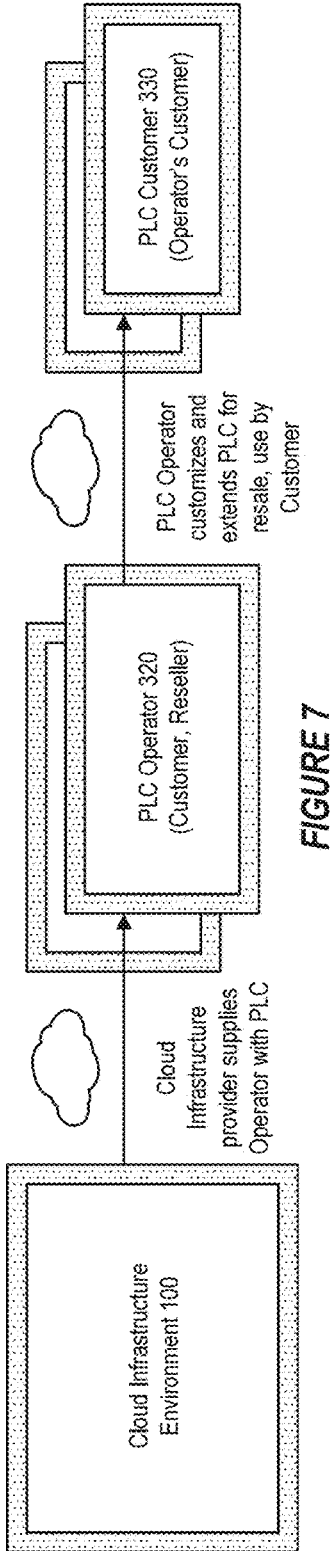
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more PLC environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
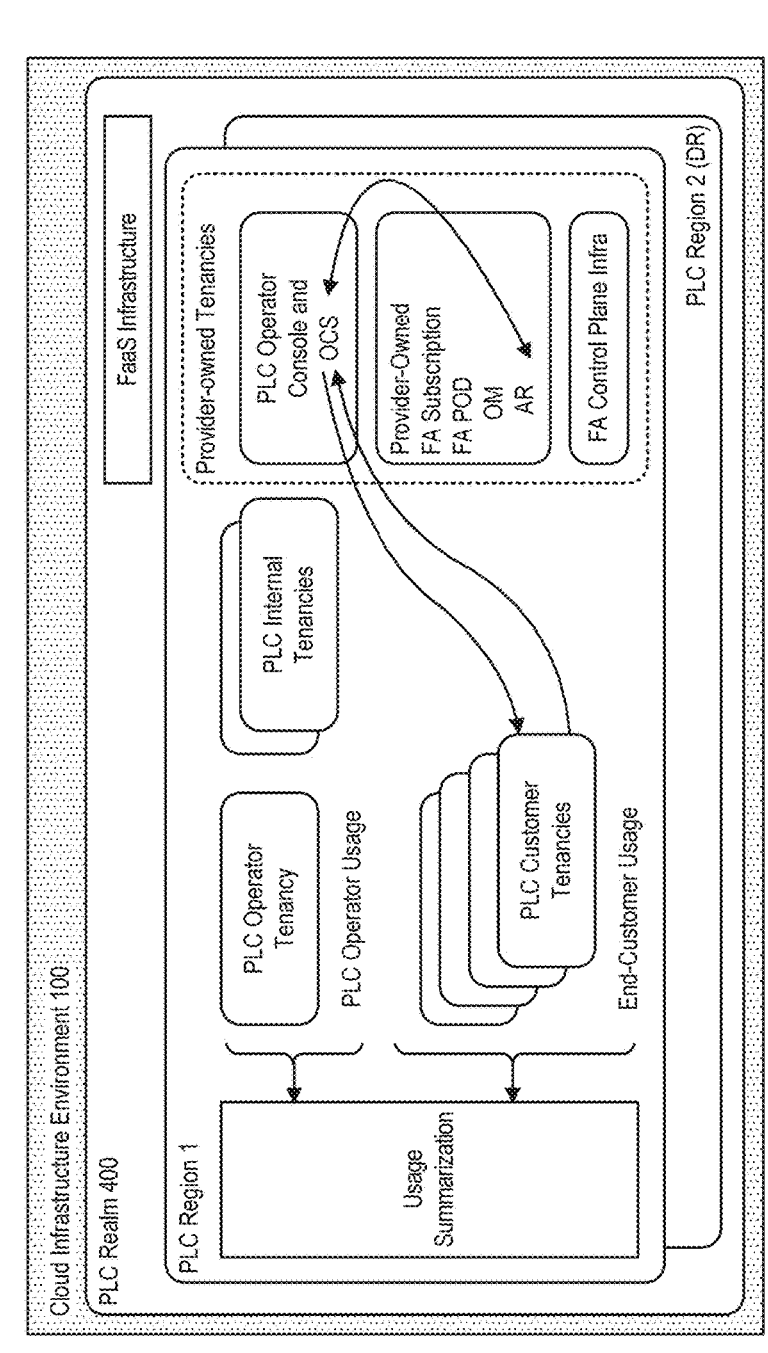
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
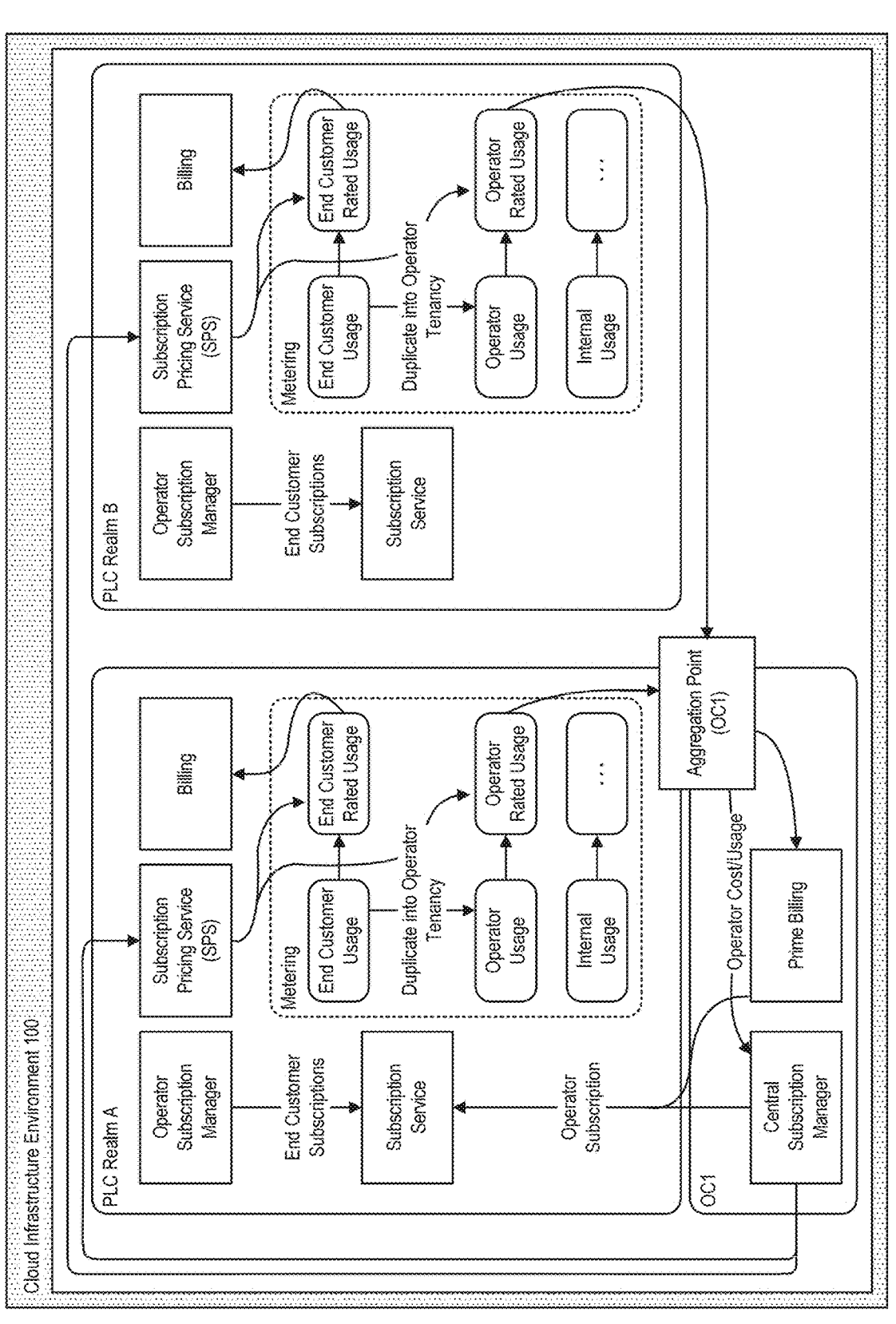
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
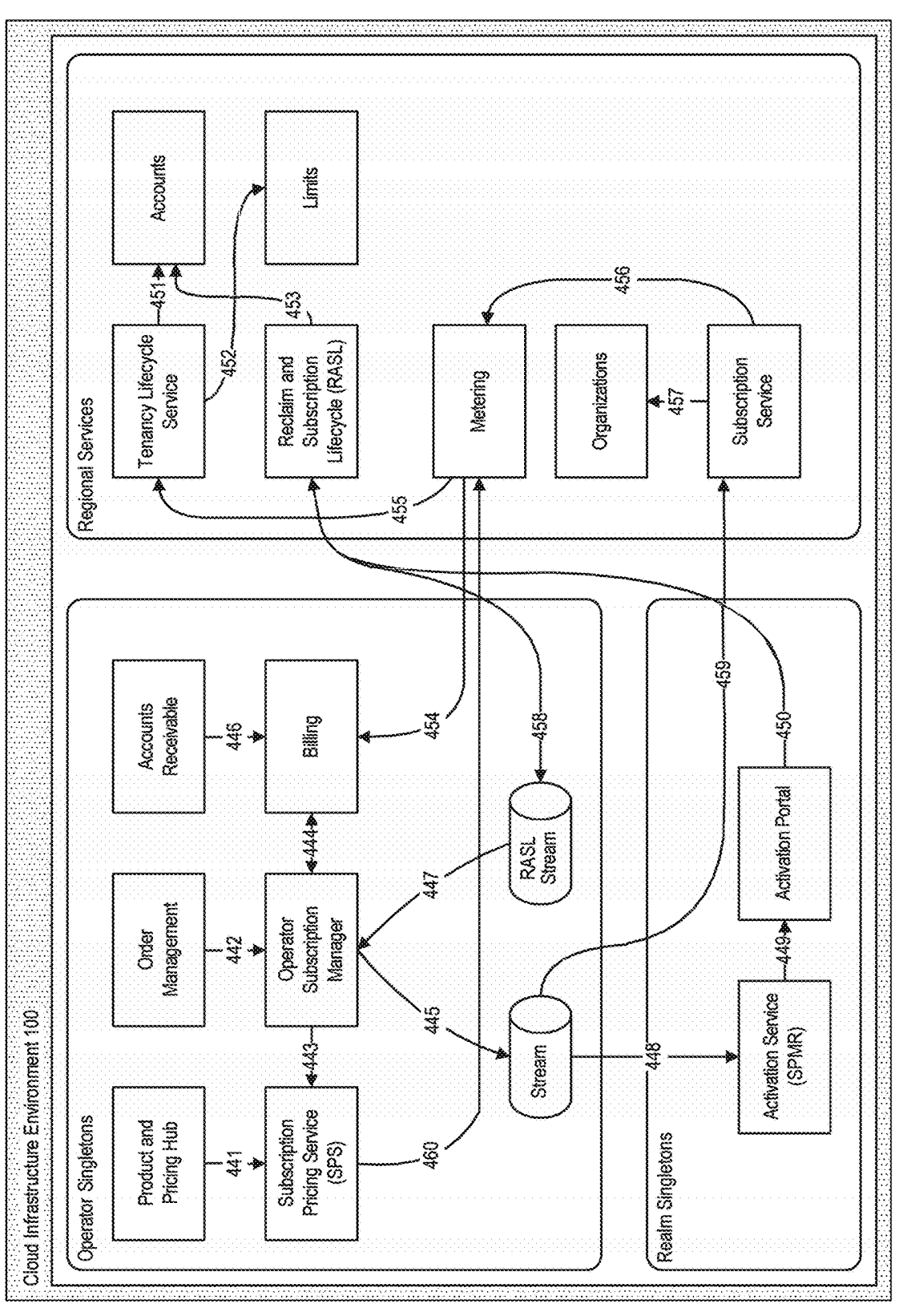
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can synchronize product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to a cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud subscription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

3. System Architecture for Service Health Monitoring

Figure 11A:
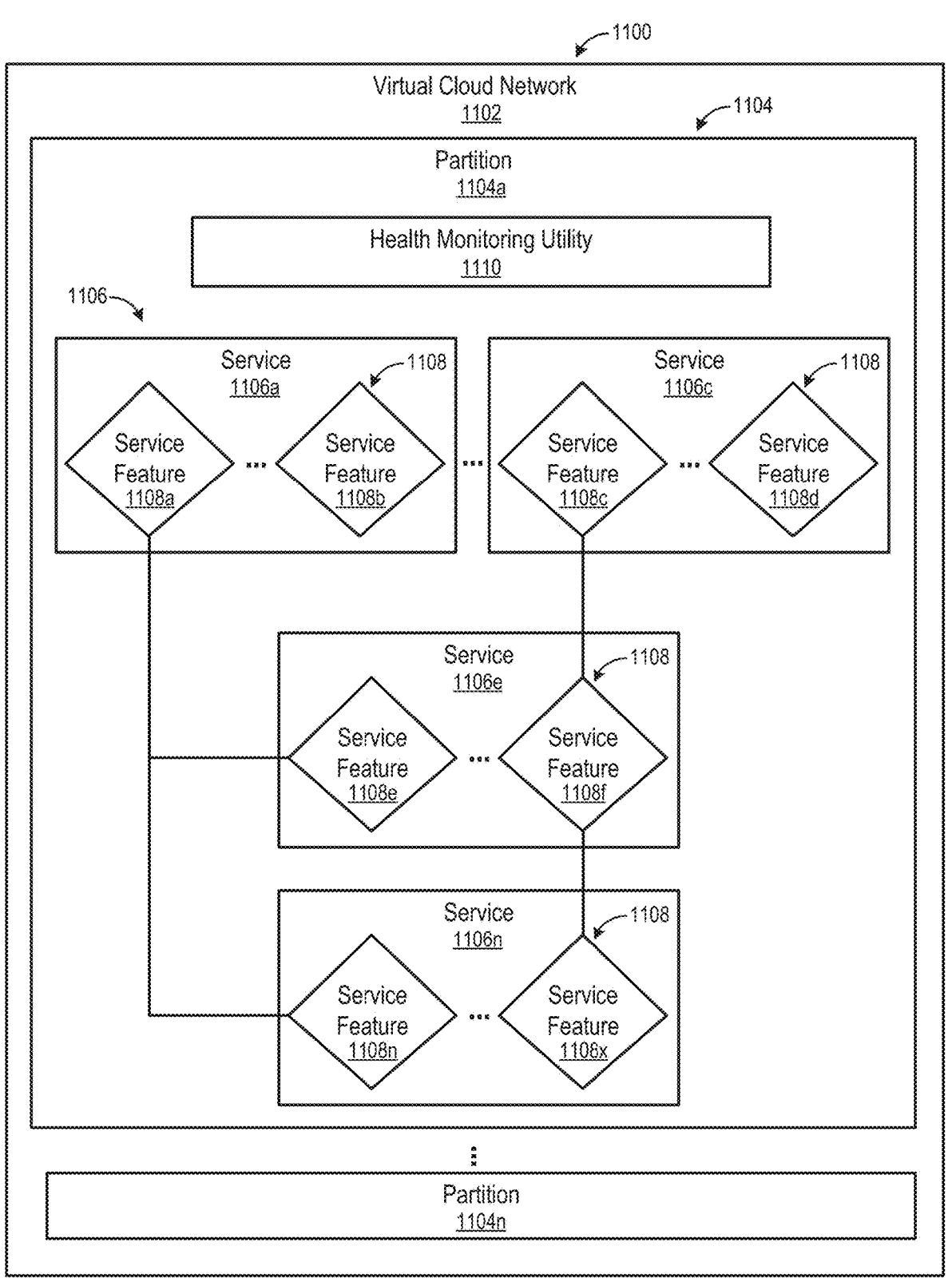
FIGS. 11A and 11B illustrate features of a system that includes a health monitoring utility in accordance with one or more embodiments.
Figure 11B:
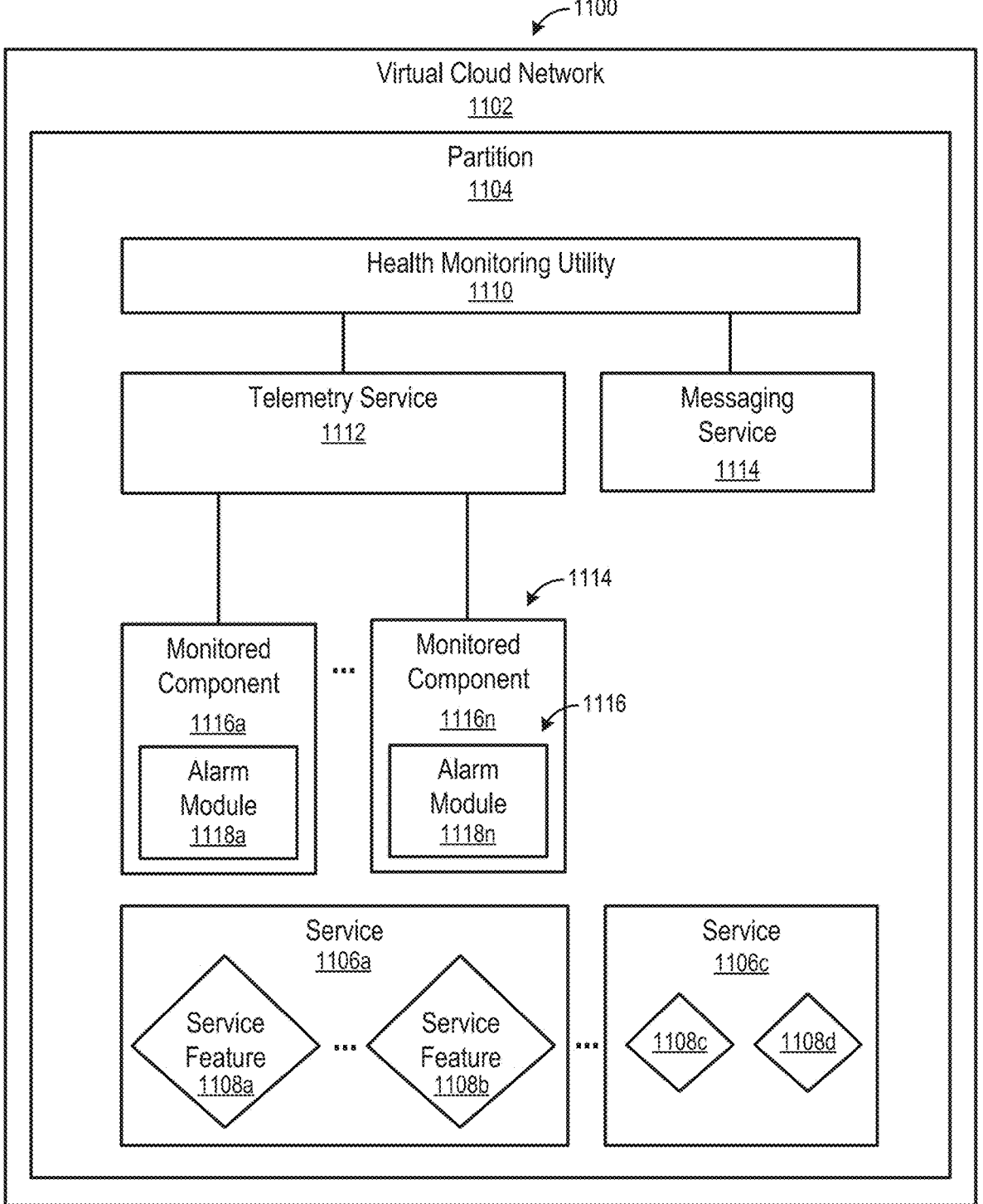
Figure 11C:
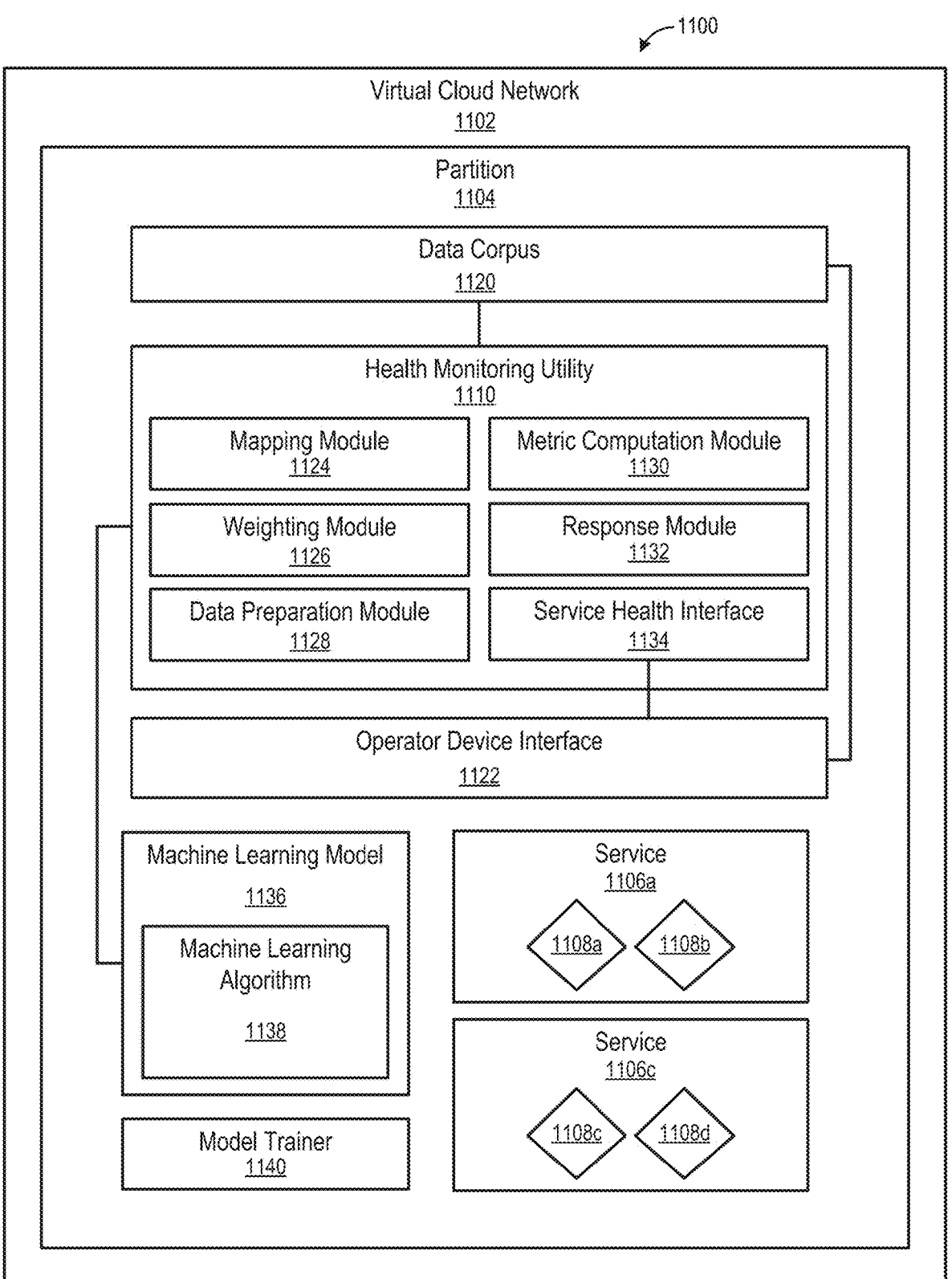
FIG. 11C illustrates further features of a system that includes a health monitoring utility in accordance with one or more embodiments.

FIGS. 11A-11C illustrate a system 1100 that includes features for monitoring the health of services and/or service features in accordance with one or more embodiments. In one or more embodiments, the system 1100 refers to hardware and/or software configured to perform operations described herein. Examples of operations are described below with reference to FIGS. 13A-13C. In addition to the features described with reference to FIGS. 11A-11C, the system 1100 may include one or more features described above in Section 2, titled "Dedicated or Private Label Cloud Environments."

In one or more embodiments, the system 1100 may include more or fewer components than the components described with reference to FIGS. 11A-11C. The components described with reference to FIGS. 11A-11C may be local to or remote from each other. The components described with reference to FIGS. 11A-11C may be implemented in software and/or hardware. The components of system 1100 may be distributed over multiple applications and/or machines. Multiple components may be combined into one application and/or machine. Operations described with respect to one component may instead be performed by another component.

The system 1100 includes a virtual cloud network 1102. A plurality of partitions 1104 are deployed on the virtual cloud network 1102, such as partition 1104a and partition 1104n. The partitions 1104 represent logically or physically isolated portions of the virtual cloud network 1102. In one example, the partitions 1104 include tenant partitions, or tenancies, that isolate portions of the virtual cloud network 1102 between different entities, or tenants, such as PLC operators or customers. Additionally, or alternatively, the partitions 1104 may include service partitions that isolate different services or workloads. Additionally, or alternatively, the partitions 1104 may include geographic partitions that isolate a portion of the virtual cloud network 1102 corresponding to a particular geographic region. Additionally, or alternatively, the partitions 1104 may include network partitions that isolate the virtual cloud network 1102 into separate segments or subnets.

A. Example Services and Service Features

As illustrated in FIG. 11A with respect to partition 1104*a*, a partition 1104 includes a plurality of services 1106, and the plurality of services 1106 respectively include a plurality of service features 1108. Additionally, the partition 1104 includes a health monitoring utility that monitors the health of the services 1106 and/or service features 1108 of the partition 1104. In one example, partition 1104*a* includes service 1106*a*, service 1106*c*, service 1106*e*, and service 1106*n*. Service 1106*a* includes service feature 1108*a* and service feature 1108*b*. Service 1106*c* includes service feature 1108*c* and service feature 1108*d*. Service 1106*e* includes service feature 1108*e* and service feature 1108*f*. Service 1106*n* includes service feature 1108*n* and service feature 1108*x*.

In one example, the health monitoring utility 1110 determines the health of a service 1106 based on the health of the service features 1108 of the service 1106. As illustrated in FIG. 11A, the health monitoring utility 1110 determines the health of service 1106*a* based on the health of service feature 1108*a* and service feature 1108*b*. Additionally, or alternatively, the health monitoring utility 1110 determines the health of service 1106*c* based on the health of service feature 1108*c* and service feature 1108*d*. Additionally, or alternatively, the health monitoring utility 1110 determines the health of service 1106*e* based on the health of service feature 1108*e* and service feature 1108*f*. Additionally, or alternatively, the health monitoring utility 1110 determines the health of service 1106*n* based on the health of service feature 1108*n* and 1108*x*.

In one example, the health monitoring utility 1110 determines the health of a service 1106 based on an impact that one or more service features 1108 of a service 1106 have on other service features 1108 arranged downstream. As illustrated in FIG. 11A, service feature 1108*c* of service 1106*e* is arranged downstream from service feature 1108*a* of service 1106*a*. Service feature 1108*e* depends on service feature 1108*a*. In one example, a functionality of service feature 1108*e* depends on a functionality of service feature 1108*a*. Additionally, service feature 1108*n* of service 1106*n* is arranged downstream from service feature 1108*a* of service 1106*a*. Service feature 1108*n* depends on service feature 1108*a*. In one example, a functionality of service feature 1108*n* depends on a functionality of service feature 1108*a*. The functionalities of service feature 1108*a* may include generating one or more outputs that are utilized as an input by service feature 1108*e* and/or by service feature 1108*n*. Additionally, or alternatively, the functionalities of service feature 1108*a* may include executing one or more operations that directly or indirectly impact service feature 1108*e* and/or service feature 1108*n*. Additionally, or alternatively, service feature 1108*e* and/or service feature 1108*n* may be arranged subsequent to service feature 1108*a* with respect to a data flow or a sequence of operations. The health monitoring utility 1110 may determine the health of service 1106*a* based at least in part on (a) an impact that service feature

1108*a* has on service feature 1108*e* and/or (b) an impact that service feature 1108*a* has on service feature 1108*n*. The impact that service feature 1108*a* has on service feature 1108*e* may result from a dependency between service feature 1108*a* and service feature 1108*e*. The impact that service feature 1108*a* has on service feature 1108*n* may result from a dependency between service feature 1108*a* and service feature 1108*n*.

As further illustrated in FIG. 11A, service feature 1108*f* of service 1106*e* is arranged downstream from service feature 1108*c* of service 1106*c*, and service feature 1108*x* of service 1106*n* is arranged downstream from service feature 1108*f* of service 1106*e*. Service feature 1108*f* depends on service feature 1108*c*. In one example, a functionality of service feature 1108*f* depends on a functionality of service feature 1108*c*. The functionalities of service feature 1108*c* may include generating one or more outputs that are utilized as an input by service feature 1108*f* and/or executing one or more operations that directly or indirectly impact service feature 1108*f*. Additionally, or alternatively, service feature 1108*f* may be arranged subsequent to service feature 1108*c* with respect to a data flow or a sequence of operations. Additionally, service feature 1108*x* depends on service feature 1108*f*. In one example, a functionality of service feature 1108*x* depends on a functionality of service feature 1108*f*. The functionalities of service feature 1108*f* may include generating one or more outputs that are utilized as an input by service feature 1108*x* and/or executing one or more operations that directly or indirectly impact service feature 1108*x*. Additionally, or alternatively, service feature 1108*x* may be arranged subsequent to service feature 1108*f* with respect to a data flow or a sequence of operations. Additionally, service feature 1108*x* depends indirectly from service feature 1108*c*. Service feature 1108*c* indirectly impacts service feature 1108*x*. The health monitoring utility 1110 may determine the health of service 1106*c* based at least in part on an impact that service feature 1108*c* has on service feature 1108*f* and/or service feature 1108*x*. Additionally, or alternatively, the health monitoring utility 1110 may determine the health of service 1106*c* and/or the health of service 1106*f* based at least in part on an impact that service feature 1108*f* has on service feature 1108*x*.

In one example, the health monitoring utility 1110 determines the health of a service 1106 based on an impact that on one or more service features 1108 arranged upstream have on one or more service features of the service 1106. As illustrated in FIG. 11A, service feature 1108*a* of service 1106*a* is arranged upstream from service feature 1108*e* of service 1106*e* and service feature 1108*n* of service 1106*n*. Service feature 1108*a* impacts service feature 1108*e* as a result of a dependency between service feature 1108*a* and service feature 1108*c*. Additionally, or alternatively, service feature 1108*a* impacts service feature 1108*n* as a result of a dependency between service feature 1108*a* and service feature 1108*n*. The health monitoring utility 1110 may determine the health of service 1106*e* based at least in part on an impact that service feature 1108*a* has on service feature 1108*c*. Additionally, or alternatively, the health monitoring utility 1110 may determine the health of service 1106*n* based at least in part on an impact that service feature 1108*a* has on service feature 1108*n*.

As further illustrated in FIG. 11A, service feature 1108*f* of service 1106*e* is arranged upstream from service feature 1108*x* of service 1106*n*, and service feature 1108*c* of service 1106*c* is arranged upstream from service feature 1108*f*. Service feature 1108*f* impacts service feature 1108*x* as a result of a dependency between service feature 1108*f* and service feature 1108x. Service feature 1108c impacts service feature 1108f as a result of a dependency between service feature 1108c and service feature 1108f. The health monitoring utility 1110 may determine the health of service 1106e based at least in part on an impact that service feature 1108c has on service feature 1108f. Additionally, or alternatively, the health monitoring utility 1110 may determine the health of service 1106n based at least in part on an impact that service feature 1108f and/or service 1106c have on service feature 1108x.

The term "downstream," as used herein with reference to an arrangement of a first service feature downstream from a second service features, refers to at least one of the following: (a) the first service feature being arranged subsequent to the second service feature with respect to a data flow or a sequence of operations, (b) the first service feature being dependent upon a functionality of the second feature, such as an output of the second service feature that the first service feature utilizes as an input, or (c) an operation executed by the second service feature that directly or indirectly impacts the first service feature.

The term "upstream," as used herein with reference to an arrangement of a first service feature upstream from a second service feature, refers to at least one of the following: (a) the first service feature being arranged prior to the second service feature with respect to a data flow or a sequence of operations, (b) the first service feature having a functionality that the second feature depends upon, such as an output of the first service feature that the second service feature utilizes as an input, or (c) an operation executed by the first service feature that directly or indirectly impacts the second service feature.

The term "dependent" or "dependency," as used herein with reference to a first service feature being dependent upon or having a dependency from a second service feature, refers to at least one of the following: (a) the first service feature being arranged subsequent to the second service feature with respect to a data flow or a sequence of operations, (b) the first service feature being dependent upon a functionality of the second feature, such as an output of the second service feature that the first service feature utilizes as an input, or (c) an operation executed by the second service feature that directly or indirectly impacts the first service feature. In one example, a downstream service feature is dependent upon an upstream service feature.

As used herein, the term "service" refers to a modular, self-contained unit of functionality that is deployed in a cloud infrastructure. A service may encapsulate a specific set of functionalities, utilities, or tasks. A service may include a unit of functionality ranging from a simple standalone application or utility to a complex distributed system that includes multiple interconnected components. A service may include a well-defined interface for interaction with other services, service features, or operator device interfaces.

In one example, a service includes a compute instance, a virtual machine, a container, or a storage system. Additionally, or alternatively, a service includes an application, a program, a utility, a resource, a platform, an infrastructure as a service (IaaS), a platform as a service (PaaS), a software as a service (SaaS), a database as a service (DBaaS), a container orchestration service, a serverless computing service, a storage service, a content delivery network (CDN) service, an identity and access management (IAM) service, a networking service, a machine learning or AI service, a big data or analytics service, an internet of things (IoT) service, a blockchain service, a monitoring or logging service, a customized service, or a customer-specific service.

An IaaS may include one or more of the following: virtual machines, compute instances, or cloud servers. A PaaS may include one or more of the following: application hosting, application services, or cloud-native application platforms. A SaaS may include one or more of the following: email and productivity suites, office applications, or collaboration tools. A DBaaS may include one or more of the following: a managed database, a database service, or a database platform. A container orchestration service may include one or more of the following: a container orchestration platform or a cluster management service. A serverless computing service may include one or more of the following: a function as a service (FaaS) or a serverless computing architecture. A storage services may include one or more of the following: object storage, block storage, or file storage. A CDN services may include one or more of the following: a content delivery service, a content caching service, a streaming and media delivery service, or a content automation service. An IAM service may include one or more of the following: an authentication or authorization service, an identity management services, or a federated identity service. A networking services may include one or more of the following: a VPC service or a software-defined networking (SDN) service. A machine learning service may include one or more of the following: a machine learning platform, a model training service, an automated model selection or configuration service, an AI integration service, a model monitoring or management services, or a deep learning service. A big data or analytics service may include one or more of the following: a data warehousing service, an analytics platform, or a data lake service. An IoT service may include one or more of the following: an IoT platform, a device management service, or an edge computing service. A blockchain services may include one or more of the following: a blockchain platform, a distributed ledger service, a smart contracts service, a security or cryptography service, or a tokenization service. A monitoring or logging services may include one or more of the following: a monitoring service, a logging service, or an application performance monitoring service.

As used herein, the term "service feature" refers to a feature, functionality, capability, characteristic, parameter, or facet of a service. A service feature may contribute to an operation, output, state, or quality of a service. A service feature may pertain to build-time and/or run-time of a service. In one example, a service may be a service feature with respect to one or more other services.

In one example, a service feature, such as a service feature that pertains to build-time of a service, includes one or more of the following: a dependency management feature, a build automation feature, a code compilation feature, a code quality feature, a unit testing feature, an artifact generation feature, a configuration management feature, a continuous integration feature, a code packaging feature, a dependency scanning feature, a documentation generation feature, a code obfuscation feature, a versioning feature, a tagging feature, or a build-time optimization feature.

Additionally, or alternatively, a service feature, such as a service feature that pertains to run-time of a service, includes one or more of the following: a deployment feature, an authentication feature, an authorization security feature, an encryption feature, a compliance feature, a content delivery feature, a content caching feature, a logging feature, an auditing feature, a disaster recovery feature, a scalability feature, a virtualization feature, an automation feature, a machine learning integration feature, a reliability feature, an availability feature, a fault tolerance feature, a data redundancy feature, a response time feature, a throughput capacity feature, a data encryption feature, a performance monitoring feature, a performance optimization feature, a resource utilization feature, a load balancing feature, or a patch management feature.

Additionally, or alternatively, a service feature, such as a service feature that pertains to both run-time and build-time of a service, includes one or more of the following: a resource management feature, an error handling and logging feature, a dynamic configuration feature, a thread management feature, a session management feature, a caching feature, a connection pooling feature, or an adaptive security feature.

B. Example Monitoring Sources

Referring to FIG. 11B, example sources of data utilized by the health monitoring utility 1110 to monitor the health of services and/or service features are further described. FIG. 11B illustrates features of a system 1100 that includes a virtual cloud network 1102 with a partition 1104 deployed in the virtual cloud network 1102. The partition 1104 includes one or more services 1106 and corresponding service features 1108. As an example, FIG. 11B shows service 1106a and service 1106c as well as service feature 1108a and service feature 1108b of service 1106a and service feature 1108c and service feature 1108d of service 1106c. Additionally, the system 1100 described with reference to FIG. 11B may include one or more additional components, features, or functionalities described with reference to FIG. 11A.

As shown in FIG. 11B, the partition 1104 includes a health monitoring utility 1110. The health monitoring utility receives health data from a plurality of data sources. In one example, the partition 1104 includes a telemetry service 1112 that provides health data to the health monitoring utility 1110. Additionally, or alternatively, the partition 1104 may include a messaging service 1114 that provides health data to the health monitoring utility 1110. The telemetry service 1112 and the messaging service 1114 may represent alternative, redundant, or backup sources of health data. In one example, the telemetry service 1112 provides health data based on alarms, and the messaging service 1114 provides health data based on datagrams. In one example, the health data from the telemetry service 1112 is relatively more detailed than the health data from the messaging service 1114. In one example, the health monitoring utility 1110 utilizes the telemetry service 1112 as a primary source of health data and the messaging service 1114 as a backup source of health data. The health monitoring utility 1110 may utilize health data from the telemetry service 1112 under normal operating conditions and may fail-over to the messaging service 1114 in the event of a disruption or error in the health data from the telemetry service 1112.

ii. Telemetry Service

The telemetry service 1112 collects health data from various components of the cloud infrastructure, including components associated with partition 1104 and/or components of the virtual cloud network 1102 that are located external to partition 1104. The telemetry service 1112 may collect health data from various components in real time. Additionally, or alternatively, the telemetry service 1112 may extract data from historical records or logs associated with the various components. The telemetry service 1112 may generate and/or maintain logs, events, or traces associated with the various components. Further, the telemetry service 1112 may track the execution flow of various operations, such as function calls, input/output operations, or errors.

In one example, the partition 1104 includes a plurality of monitored components 1116, such as monitored component 1116a and monitored components 1116n. The telemetry service 1112 collects health data associated with the plurality of monitored components 1116, such as monitored component 1116a and monitored components 1116n. The monitored components 1116 include one or more services 1106 and/or one or more service features 1108 of a service 1106. For example, the monitored components 1116 may include compute instances, virtual machines, containers, or storage systems. Additionally, or alternatively, the monitored components 1116 may include aspects of the cloud infrastructure, such as aspects that impact the operations of the services 1106 and/or service features 1108. For example, the monitored components 1116 may include routers, switches, load balancers, firewalls, and other network devices. The monitored components 1116 may provide health data directly or indirectly associated with services 1106 and/or one or more service features 1108. An example of health data that is directly associated with a service 1106 and/or a service feature 1108 may include monitoring data pertaining to operations of the service 1106 and/or a service feature 1108, such as function calls, input/output operations, or errors. An example of health data that is indirectly associated with a service 1106 and/or a service feature 1108 may include monitoring data pertaining to a load balancer that is indicative of incoming network traffic and/or a utilization rate of a service 1106 and/or a service feature 1108.

As shown in FIG. 11B, the partition 1104 includes a plurality of monitored alarm modules 1118, such as alarm module 1118a and alarm module 1118n. The alarm modules 1118 are associated, respectively, with a monitored component 1116. The health data includes alarm data associated with the alarm modules 1118. As shown in FIG. 11B, alarm module 1118a is associated with monitored component 1116a, and alarm module 1118n is associated with monitored component 1116n. An alarm module 1118 may represent a portion of a monitored components 1116, a portion of the telemetry service 1112, or a separate component.

The alarm modules 1118 monitor various parameters of the corresponding monitored components 1116. The alarm modules 1118 may generate one or more alarm parameters corresponding to the various parameters of the monitored components 1116. The alarm parameters may include a label that identifies a monitored component 1116 associated with the alarm parameter and a state indicator that indicates a state of the alarm parameter. The state of the alarm parameter may indicate whether the alarm is clear or firing. Additionally, or alternatively, the state of the alarm parameter may indicate an operational state of the monitored component 1116. The alarm data includes alarm state information associated with the alarm parameters. The alarm state information associated with an alarm parameter may include a state of the alarm parameter and/or an indication of a change to a state of the alarm parameter.

The various parameters of a monitored component 1116 that an alarm module 1118 monitors may include one or more of the following: events, states, log entries, metrics, thresholds, algorithms, or patterns. The events monitored by an alarm module 1118 may include provisioning events, deprovisioning events, resource allocations, resource deallocations, startup events, stopping events, configuration setups, configuration changes, compliance validations, security protocol events, security vulnerability events, updates, or user actions. The states monitored by an alarm module 1118 may include operational states, such as one or more of the following: running, stopped, operational, paused, error, initializing, terminated, pending, or updating. Additionally, or alternatively, the states monitored by an alarm module 1118 may include custom states specific to the behavior of particular monitored components 1116. The log entries monitored by an alarm module 1118 may include entries associated with events or states of various components. Additionally, or alternatively, the log entries monitored by an alarm module 1118 may include one or more of the following: system messages, chronological records, debugging information, audit trails, compliance records, security records, or user activities. The metrics monitored by an alarm module 1118 may include one or more of the following: CPU usage, memory utilization, network traffic, disk I/O, response times, or error rates. The metrics monitored by an alarm module 1118 may include predefined limits or triggers associated with parameters of the corresponding monitored components 1116. The algorithms monitored by an alarm module 116 may include computations based on one or more parameters of the monitored components 1116. The patterns monitored by an alarm module 1118 may include trends, correlations, or anomalies associated with one or more parameters of the monitored components 1116.

The health monitoring utility 1110 computes health metrics for services 1106 and/or service features 1108 based on health data from monitored components 1116 corresponding to the services 1106 and/or service features 1108. Example features and functionalities of the health monitoring utility are further described below with reference to FIG. 11C. Example health metrics are further described below with reference to FIGS. 14A-14E and FIGS. 15A and 15B.

ii. Messaging Service

Referring further to FIG. 11B, the messaging service 1114 may generate health data that include messages, such as datagrams, that indicate the status or availability of a particular monitored component 1116. The health monitoring utility 1110 may access messages from the messaging service 1114 concurrently with the health data from the telemetry service or in the event of a failover condition associated with the telemetry service 1112. The health monitoring utility 1110 may fail-over to the messaging service 1114 with respect to one or more monitored components 1116, for example, depending on the particular monitored components 1116 associated with the fail-over condition. In one example, the failover condition may include a failure of one or more alarm modules 1118. When the failover condition may include a failure of one or more alarm modules 1118, the health monitoring utility 1110 may revert to utilizing messages from the messaging service 1114 to compute health metrics corresponding to the one or more alarm modules 1118 associated with the failover condition. Additionally, or alternatively, the failover condition may represent a failure of the telemetry service 1112. When the failover condition represents a failure of the telemetry service 1112, the health monitoring utility 1110 may revert to utilizing messages from the messaging service 1114 to compute health metrics, for example, with respect to one or more of the alarm modules 1118.

The messages from the messaging service 1114 may represent a lower level of detail or granularity than health data from the telemetry service 1112. In one example, the messages from the messaging service 1114 may include a binary indication of a healthy state or an unhealthy state for a respective monitored component 1116. In one example, the health monitoring utility 1110 may compute a health metric for a monitored component 1116 based on a namespace corresponding to the monitoring component and a criteria expression.

In one example, the health monitoring utility 1110 may monitor the telemetry service 1112 based on messages from the messaging service 1114, for example, to validate that the telemetry service 1112 is functioning properly. Additionally, or alternatively, the health monitoring utility 1110 may compute health metrics for a monitored component 1116 based on a combination of health data from the telemetry service 1112 and the messaging service 1114.

C. Example Health Monitoring Utility

Referring to FIG. 11C, an example health monitoring utility 1110 is further described in accordance with one or more embodiments. FIG. 11C illustrates features of a system 1100 that includes a virtual cloud network 1102 with a partition 1104 deployed in the virtual cloud network 1102. The partition 1104 includes one or more services 1106 and corresponding service features 1108. As an example, FIG. 11C shows service 1106a and service 1106c as well as service feature 1108a and service feature 1108b of service 1106a and service feature 1108c and service feature 1108d of service 1106c. Additionally, the system 1100 described with reference to FIG. 11C may include one or more additional components, features, or functionalities described with reference to FIG. 11A and/or FIG. 11B.

As shown in FIG. 11C, the partition 1104 includes a health monitoring utility 1110, a data corpus 1120, and an operator device interface 1122. The health monitoring utility 1110 utilizes datasets stored in the data corpus 1120 to generate health metrics associated with the services 1106 and/or service features 1108. The datasets stored in the data corpus 1120 may be generated based on inputs from an operator device interface 1122. Additionally, the data corpus 1120 may store health data obtained from the telemetry service 1112 and/or from the messaging service 1114 (FIG. 11B). An example data corpus 1120 is further described with reference to FIGS. 12A-12C.

The health monitoring utility 1110 may include one or more of the following: a mapping module 1124, a weighting module 1126, a data preparation module 1128, a metric computation module 1130, or a response module 1132. Additionally, the health monitoring utility includes a service health interface 1134. An example service health interface 1134 is further described with reference to FIGS. 16A-16C.

In one example, a system 1100 that includes one or more components of the health monitoring utility 1110 is deployed to the virtual cloud network 1102 concurrently with, or subsequent to, deploying the partition 1104 to the virtual cloud network 1102. In one example, a first entity deploys the partition 1104 and the system 1100, including the one or more components of the health monitoring utility 1110, and then transfers operation of the partition 1104 to a second entity. In one example, the first entity is a cloud infrastructure provider, and the second entity is a PLC operator or customer. The second entity utilizes the health monitoring utility 1110 in connection with operating the partition 1104. In one example, the second entity accesses the service health interface 1134 of health monitoring utility 1110, for example, to monitor the health of one or more services executing in the partition 1104. In one example, the first entity and the second entity are distinguishable based on identity resources for the cloud environment. A set of identity resources for the cloud environment may include a first identity domain corresponding to the first entity and a second identity domain corresponding to the second entity. The partition 1104, including the health monitoring utility 1110 deployed to the partition 1104, is accessible in accordance with the second identity domain corresponding to the second entity.

i. Example Mapping Module

In one example, the mapping module 1124 generates mappings associated with services 1106, service features 1108, and/or alarm parameters. The mappings may indicate alarm parameters that correspond to service features 1108 and/or service features that correspond to services 1106. The mappings may define relationships, dependencies, and/or communication channels between alarm parameters and service features 1108 and/or between service features 1108 and services 1106. In one example, the mappings are generated based on inputs from an operator via the operator device interface 1122. Additionally, or alternatively, the mapping module 1124 may include one or more mapping utilities that generate mappings between alarm parameters and service features 1108 and/or between service features 1108 and services 1106. The one or more mapping utilities may include a service discovery utility, a configuration management utility, an orchestration platform, or an event-driven architecture utility. In one example, the mapping module 1124 utilizes the one or more mapping utilities to dynamically update mappings between alarm parameters and service features 1108 and/or between service features 1108 and services 1106. The mappings may be dynamically updated as different services 1106 and/or services features 1108 are provisioned and/or deprovisioned in the partition 1104. Example mappings are further described with reference to FIG. 12A.

In one example, the mapping module 1124 generates dependency graphs that indicate dependencies between services 1106 and/or service features 1108. In one example, a dependency graph may include a plurality of dependencies between different service features 1108. Additionally, or alternatively, a dependency graph may include a plurality of dependencies between different services 1106. In one example, the dependency graphs are generated based on inputs from an operator via the operator device interface 1122. Additionally, or alternatively, the mapping module 1124 may include one or more dependency graph utilities that generate dependency graphs between service features 1108 and/or services 1106. The one or more dependency graph utilities may include a service discovery utility, a configuration management utility, an orchestration platform, or an event-driven architecture utility. In one example, the mapping module 1124 utilizes the one or more dependency graph utilities to dynamically update dependency graphs. The dependency graphs may be dynamically updated as different services 1106 and/or services features 1108 are provisioned and/or deprovisioned in the partition 1104. Example dependency graphs are further described with reference to FIGS. 12B and 12C.

ii. Example Weighting Module

The weighting module 1126 assigns weights to various weighted items. The weighted items may include services 1106, service features 1108, and/or alarm parameters. Additionally, or alternatively, the weighted items may include mappings, dependencies, and/or nodes. A weight assigned to a weighted item may represent a degree of importance, significance, value, or impact of the weighted item within a given context. A relatively higher weight may indicate that a weighted item is relatively more important, more significant, more valuable, or more impactful. A relatively lower weight may indicate that a weighted item is relatively less important, less significant, less valuable, or less impactful. The weights assigned to weighted items may be stored in the data corpus 1120. In one example, the weights are stored in association with the mappings and/or dependency graphs stored in the data corpus 1120.

In one example, a weight that is assigned to a weighted item (e.g., a service 1106, service feature 1108, or alarm parameter) may represent an importance or value of the weighted item to one or more components or operations of the cloud environment. A weight assigned to a service feature 1108 of a service 1106 may represent an importance or value of the service feature 1108 to the service 1106. A weight assigned to a service 1106 may represent an importance or value of the service 1106 to one or more operational aspects of the cloud environment. Additionally, or alternatively, a weight assigned to a service 1106 may represent an importance or value of the service 1106 to one or more business activities that depend on the service 1106.

In one example, a weight that is assigned to a weighted item (e.g., a service 1106, service feature 1108, or alarm parameter) may represent an impact or significance of the weighted item to one or more components or operations of the cloud environment. A weight assigned to an alarm parameter may represent an impact or significance of the alarm parameter to a service feature 1108 that is mapped to the alarm parameter. Additionally, or alternatively, a weight assigned to a service feature 1108 of a service 1106 may represent an impact or significance of the service feature 1108 to one or more corresponding services 1106. Additionally, or alternatively, a weight assigned to a service feature 1108 of a service 1106 may represent an impact or significance of the service feature 1108 to one or more downstream service features 1108.

The weighting module 1126 may assign the weights to various nodes, mappings, and/or dependencies. The weight assigned to a particular node may depend on one or more adjacent nodes. In one example, an alarm parameter that is associated with a first service feature 1108 and a second service feature 1108 may have a first weight with respect to the first service feature 1108 and a second weight with respect to the second service feature 1108. The difference in weight between the first service feature 1108 and the second service feature 1108 may indicate that the alarm parameter is more important, more significant, more valuable, or more impactful to the first service feature 1108 than the second service feature 1108. In one example, a service feature 1108 is mapped to a first alarm parameter that is assigned a first weight and a second alarm parameter that is assigned a second weight. Additionally, the first weight is greater than the second weight. The first weight being greater than the second weight indicates that an importance, significance, value, or impact of the first alarm parameter with respect to the service feature 1108 is greater than that of the second alarm parameter with respect to the service feature 1108.

In one example, a service 1106 is mapped to a first service feature 1108 that is assigned a first weight and a second service feature 1108 that is assigned a second weight. Additionally, the first weight is greater than the second weight. The first weight being greater than the second weight indicates that an importance, significance, value, or impact of the first service feature 1108 with respect to the service 1106 is greater than that of the second service feature 1108 with respect to the service 1106. In one example, an upstream service feature 1108 may have a first weight with respect to a first downstream service feature 1108 and a second weight with respect to a second downstream service feature 1108. The difference in weight between the first downstream service feature 1108 and the second downstream service feature 1108 may indicate that the upstream service feature 1108 is more important, more significant, more valuable, or more impactful to the first downstream service feature 1108 than the second downstream service feature 1108. Additionally, or alternatively, a downstream service feature 1108 may have a first weight with respect to a first upstream service feature 1108 and a second weight with respect to a second upstream service feature 1108. The difference in weight between the first upstream service feature 1108 and the second upstream service feature 1108 may indicate that an importance, significance, value, or impact of the first upstream service feature 1108 with respect to the downstream service feature 1108 is greater than that of the second upstream service feature on the downstream service feature 1108.

In one example, the weights assigned to weighted items (e.g., a service 1106, service feature 1108, or alarm parameter) are generated based on inputs from an operator via the operator device interface 1122. The weighted items may include user-defined weights, such as a user-defined valuation, a user-defined importance, a user-defined significance, and/or a user-defined impact. The user-defined weights may differ between different partitions. In one example, different tenants, such as PLC operators or customers, may provide different user-defined weights for different services and/or for different instances of a service. A tenant may determine the user-defined weights based on the context of the services, service features, cloud operations, or business activities of the tenant. In one example, the weighted items may include user-defined business values. A user-defined business value of a weighted item may represent the importance, significance, value, or impact of the weight item on the business or operations of the tenant. The relative importance, significance, value, or impact of various weight items may differ between different tenants, for example, based on differences in businesses or operations between different tenants and/or based on differences in priorities between different tenants.

In one example, the weighting module 1126 may include one or more weighting utilities that generate weights for different weighted items. The one or more weighting utilities may dynamically update weights for weighted items. The weighted items may be dynamically updated based on parameters of the cloud environment. In one example, the weighting module 1126 dynamically updates the weights for one or more weighed items based on one or more of the following types of parameters: events, states, log entries, metrics, thresholds, algorithms, or patterns. In one example, the weighting module 1126 dynamically updates the weights for one or more weighted items based on an operational state, and/or a change in an operational state, of one or more services 1106 and/or service features 1108 corresponding to the weighted item. For example, the weighting module 1126 may dynamically update a weight for a service feature 1108 in response to a service 1106 initiating use of the service feature 1108 and/or in response to the service suspending or terminating use of the service feature 1108. The weighting module 1126 may detect a transition of the service feature from a stopped or paused operational state to an initialization or running operational state or vice versa. The weighting module 1126 may assign a relatively low weight to the service feature 1108 when in the stopped or paused operational state, for example, based on the service feature 1108 not being utilized by the service 1106. The relatively low weight may indicate that the service feature 1108 has relatively low importance, significance, value, or impact when the service feature is in a stopped or paused operational state. The weighting module 1126 may assign a relatively high weight to the service feature 1108 when in the initialization or running operational state, for example, based on the service feature 1108 being utilized by the service 1106. The relatively high weight may indicate that the service feature 1108 has relatively high importance, significance, value, or impact when the service feature is in an initialization or running operational state. As another example, the weighting module 1126 may assign yet another weight to a service feature in response to determining a transition from an initialization or running operational state to an error or updating operational state. The weighting module 1126 may detect a transition of the service feature from the initialization or running operational state to the error or updating operational state or vice versa. The difference in weighting may represent a difference in importance, significance, value, or impact of the service between the initialization or running operational state and the error or updating operational state.

In one example, the weighting module 1126 may utilize a machine learning model 1136 to determine weights for various weighted items. Example machine learning models 1136 are further described below. Example weightings are further described with reference to FIGS. 14A-14E and FIGS. 15A and 15B.

iii. Data Preparation Module

The data preparation module 1128 collects, processes, and/or generates health data utilized to compute health metrics, including data associated with the plurality of monitored components 1116 (FIG. 11B). The health data includes alarm data associated with the alarm modules 1118. The data preparation module 1128 may collect the health data from the telemetry service 1112 and/or the messaging service 1114. Additionally, the data preparation module 1128 may collect data from the data corpus 1120, such as data pertaining to mappings and/or dependency graphs stored in the data corpus 1120 and/or weights associated with weighted items stored in the data corpus 1120. In one example, the data preparation module 1128 generates additional health data based on the health data collected by the data preparation module 1128.

The data preparation module 1128 transmits the health data to the metric computation module 1130 for computation of health metrics. Additionally, the data preparation module 1128 transmits data from the data corpus 1120 utilized by the metric computation module 1130 to compute health metrics. In one example, the data preparation module 1128 may execute one or more data preparation operations on the health data and/or on the data from the data corpus 1120 prior to transmitting the data to the metric computation module 1130. The data preparation operations may include one or more of the following: cleaning, integration, transformation, aggregation, disaggregation, normalization, or scaling.

The data preparation module 1128 detects alarms corresponding to alarm parameters based on alarm data associated with the alarm parameters. In one example, the data preparation module 1128 may detect the alarms based on state changes of the alarm parameters. When the data preparation module 1128 determines an alarm for an alarm parameter, the data preparation module 1128 determines the state corresponding to the state change based on the alarm data. The data preparation module 1128 may determine that an alarm state has changed by comparing a current alarm state to a previous alarm state. In one example, when an alarm state changes for an alarm parameter, the data preparation module 1128 generates a new alarm state for the alarm parameter and stores the new alarm state in the data corpus 1120.

In one example, the data preparation module 1128 determines a monitored component 1116 corresponding to the alarm parameter based on a label that identifies the monitored component 1116 corresponding to the alarm parameter. In one example, the data preparation module 1128 may determine one or more service features 1108 that are mapped to the alarm parameter based on one or more mappings stored in the data corpus 1120. Additionally, based on the one or more mappings stored in the data corpus 1120, the data preparation module 1128 may determine one or more services 1106 that are mapped, respectively, to the one or more service features 1108. In one example, the data preparation module 1128 may determine one or more additional service features 1108 that have a dependency relationship with a service feature 1108 that is mapped to the alarm parameter. The one or more additional service features 1108 may include downstream service features and/or upstream service features. The one or more additional service features 1108 may be determined based on one or more dependency graphs stored in the data corpus 1120.

iv. Metric Computation Module

The metric computation module 1130 computes health metrics for the various services 1106 and/or service features 1108. The metric computation module 1130 may compute the health metrics based on health information data received from the data preparation module 1128. In one example, the metric computation module 1130 determines whether service features 1108 and/or services 1106 are healthy or unhealthy based on the health information data. In one example, the metric computation module 1130 computes health metrics of services features 1108 based on alarm states of alarm parameters that are mapped to the service features 1108. Additionally, or alternatively, the metric computation module 1130 computes health metrics of services 1106 based on health metrics of service features 1108. Additionally, or alternatively, the metric computation module 1130 computes health metrics of a partition 1104 based on health metrics of services 1106 of the partition 1104. Additionally, or alternatively, the metric computation module 1130 computes health metrics of the virtual cloud network 1102 based on health metrics of one or more partitions 1104. Additionally, or alternatively, the metric computation module 1130 computes health metrics of a region based on health metrics of one or more virtual cloud networks 1102 within the region.

In one example, the metric computation module 1130 determines that a service feature 1108 is healthy when the state of an alarm that is mapped to the service feature 1108 indicates a healthy state. Additionally, or alternatively, the metric computation module 1130 determines that a service feature 1108 is unhealthy when the state of an alarm that is mapped to the service feature 1108 indicates an unhealthy state. The metric computation module 1130 changes a health metric for a service feature 1108 from a healthy state to an unhealthy state, or from an unhealthy state to a healthy state, in response to a state change of an alarm that is mapped to the service feature 1108.

In one example, the metric computation module 1130 may determine that a particular service feature 1108 is healthy based on a determination that one or more upstream service features 1108 and/or one or more downstream service features 1108 that share a dependency with the particular service feature 1108 are healthy. Additionally, or alternatively, the metric computation module 1130 may determine that a particular service feature 1108 is unhealthy based on a determination that one or more upstream service features 1108 and/or one or more downstream service features 1108 that share a dependency with the particular service feature 1108 are unhealthy.

In one example, the metric computation module 1130 determines that a service 1106 is healthy when one or more service features 1108 of the service 1106 respectively indicate a healthy state. In one example, the metric computation module 1130 determines that a service 1106 is healthy when a threshold number of service features 1108 of the service 1106 respectively indicate a healthy state. In one example, a service 1106 is healthy when all service features 1108 of the service 1106 are healthy. Additionally, or alternatively, the metric computation module 1130 determines that a service 1106 is unhealthy when one or more service features 1108 of the service 1106 respectively indicate an unhealthy state. In one example, the metric computation module 1130 determines that a service 1106 is unhealthy when a threshold number of service features 1108 of the service 1106 respectively indicate an unhealthy state. In one example, a service 1106 is unhealthy when any particular service feature 1108 of the service 1106 is unhealthy. The metric computation module 1130 changes a health metric for a service 1106 from a healthy state to an unhealthy state, or from an unhealthy state to a healthy state, in response to a state change for one or more service features 1108 of the service 1106.

In one example, the metric computation module 1130 may determine that a service 1106 is healthy based on a determination that one or more upstream service features 1108 and/or one or more downstream service features 1108 that share a dependency with a service feature 1108 of the service 1106 are healthy. Additionally, or alternatively, the metric computation module 1130 may determine that a service 1106 is unhealthy based on a determination that one or more upstream service features 1108 and/or one or more downstream service features 1108 that share a dependency with a service feature 1108 of the service 1106 are unhealthy.

In one example, the metric computation module 1130 computes a health score for one or more services 1106 and/or one or more service features 1108. The metric computation module 1130 may compute health scores based on weights assigned to alarm parameters, service features 1108, and/or services 1106. The health score for a service feature 1108 may represent an aggregation or composite of one or more weights assigned to alarm parameters that are mapped to the service feature 1108. The health score for a service feature 1108 may reflect a weight assigned to the service feature 1108. The health score for a service 1106 may represent an aggregation or composite of one or more health scores of service features 1108 of the service 1106.

In one example, the metric computation module 1130 computes a health score for one or more services 1106 and/or one or more service features 1108 based on downstream service features 1108 that depend on a particular service. In one example, the health score for a particular service feature 1108 may be determined based on downstream service features 1108 that depend on the particular service feature 1108. The health score for the particular service feature 1108 may represent a degree of importance, significance, value, or impact of the particular service feature 1108 on the downstream service features 1108. In one example, the health score for a service 1106 may represent the importance, significance, value, or impact that one or more service features 1108 of the service 1106 have on downstream service features 1108. In one example, the health score for a particular service feature 1108 may be determined based on upstream service features 1108 that are depended upon by the particular service feature 1108. In one example, the health score for a particular service feature 1108 may represent a degree of importance, significance, value, or impact of one or more upstream service features

1108 on the particular service feature 1108. In one example, the health score for a service 1106 may represent the importance, significance, value, or impact that upstream service features 1108 have on one or more service features 1108 of the service 1106.

v. Response Module

The response module 1132 determines operations or courses of action to be executed in response to health metrics of services 1106 and/or service features 1108. In one example, the response module 1132 initiates an operation or course of action with respect to a health metric when the health metric satisfies a threshold. In one example, the response module 1132 may generate a visual representation that includes the health metric for display on the service health interface 1134. Additionally, or alternatively, the response module 1132 may pause a build status for a partition in response to a health metric. Additionally, or alternatively, the response module 1132 may stop execution of a service 1106 and/or a service feature 1108 based on a health metric. Additionally, or alternatively, the response module 1132 may augment a status of a provisioning process for service based on a health metric. Additionally, or alternatively, the response module 1132 may deprovision a service 1106 based on a health metric. Additionally, or alternatively, the response module 1132 may transmit a message to a cloud operator console and/or to a network address associated with the cloud operator.

In one example, the response module 1132 may determine whether to initiate a response to a health metric based on whether the health metric meets a threshold. Additionally, or alternatively, the response module 1132 may compare a health metric to a plurality of thresholds, and the particular response may depend on the particular thresholds that the health metric satisfies. In one example, the plurality of thresholds may represent an increasing level of severity, and the corresponding responses may represent an increasing level of responsiveness.

vi. Service Health Interface

The service health interface 1134 generates and displays visual representations of various health state information pertaining to various services 1106 and/or service features 1108. The health state information may include health scores, health statuses, and/or rankings associated with various services 1106 and/or service features 1108. Additionally, or alternatively, the service health interface 1134 may generate and display visual representations of mappings and/or dependency graphs associated with various services 1106 and/or service features 1108.

In one example, the services 1106 and/or service features 1108 included for display by the service health interface 1134 are based on one or more user-defined criteria. The user-defined criteria may include thresholds for determining whether to include a services 1106 and/or service features 1108 in a visual representation. A threshold may correspond to a health score, a health status, and/or a ranking. Additionally, or alternatively, a threshold may correspond to a time stamp for an update to the health state information. The service health interface 1134 may include a service 1106 and/or a service feature 1108 in the visual representation when the corresponding state information meets one or more thresholds. The thresholds may be based on a degree of importance, significance, value, or impact of the service 1106 and/or service features 1108.

In one example, the service health interface 1134 may dynamically update the thresholds for including a service 1106 and/or service feature 1108 in a visual representation. The dynamic updates may be based on parameters of the cloud environment, such as one or more of the following types of parameters: events, states, log entries, metrics, thresholds, algorithms, or patterns.

Example service health interfaces 1134 are further described below with reference to FIGS. 16A-16C.

D. Example Operator Device Interface

In one example, the operator device interface 1122 is communicatively coupled or couplable with the health monitoring utility 1110. The operator device interface 1122 may include hardware and/or software configured to facilitate interactions between an operator and the health monitoring utility 1110 and/or other aspects of the system 1100. The operator device interface 1122 may render user interface elements and receive input via user interface elements. For example, the operator device interface 1122 may display outputs generated by the health monitoring utility 1110. Additionally, or alternatively, the operator device interface 1122 may be configured to receive inputs to the health monitoring utility 1110. Examples of interfaces include a GUI, a command line interface (CLI), a haptic interface, or a voice command interface. Examples of user interface elements include checkboxes, radio buttons, dropdown lists, list boxes, buttons, toggles, text fields, date and time selectors, command lines, sliders, pages, or forms. Any one or more of these interfaces or interface elements may be utilized by the operator device interface 1122.

In an embodiment, different components of an operator device interface 1122 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, the operator device interface 1122 may be specified in one or more other languages, such as Java, C, or C++.

In one example, the health monitoring utility 1110 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

E. Example Machine Learning Models

Referring further to FIG. 11C, in one example, the health monitoring utility 1110 may include and/or utilize at least one machine learning model 1136. As shown in FIG. 11C, machine learning model 1136 is located within partition 1104. Additionally, or alternatively, a machine learning model 1136 utilized by the health monitoring utility may be located elsewhere in the virtual cloud network 1102. The health monitoring utility 1110 may utilize a machine learning model 1136 to generate mappings between alarm parameters and service features 1108 and/or mappings between service features 1108 and services 1106. Additionally, or alternatively, the health monitoring utility 1110 may utilize a machine learning model 1136 to generate dependency graphs for service features 1108 and/or services 1106. Additionally, or alternatively, the health monitoring utility 1110 may utilize a machine learning model 1136 to determine weights for weighted items (e.g., alarm parameters, service features 1108, and/or services 1106). Additionally, or alternatively, the health monitoring utility 1110 may utilize a machine learning model 1136 to determine thresholds for selecting services 1106 and/or service features 1108 to be included in visual representations for display on the service health interface 1134.

A machine learning algorithm 1138 may include one or more machine learning algorithms 1138, such as supervised algorithms and/or unsupervised algorithms. Various types of algorithms may be used, such as linear regression, logistic regression, linear discriminant analysis, classification and regression trees, naïve Bayes, k-nearest neighbors, learning vector quantization, support vector machine, bagging, random forest, boosting, backpropagation, and/or clustering. In addition, or in the alternative, to a machine learning model 1136, the health monitoring utility 1110 may utilize one or more classical models. A classical model may include one or more classical statistical algorithms that rely on a set of assumptions about one or more of the underlying data, the data generating process, or the relationships between the variables. Example classical statistical algorithms may include linear regression, logistic regression, ANOVA (analysis of variance), or hypothesis testing.

In one example, a machine learning algorithm 1138 can be iterated to learn a target model f that best maps a set of input variables to an output variable. In particular, a machine learning algorithm 1138 may be configured to generate and/or train a machine learning model 1136. A machine learning algorithm 1138 may be iterated to learn a target model f that best maps a set of input variables to an output variable using a set of training data. Training data used by a machine learning algorithm 1138 may be stored in the data corpus 1120. The training data may include datasets and associated labels. The datasets may be associated with input variables for the target model f. The associated labels may be associated with the output variable of the target model f. The training data may be updated based on, for example, feedback on the accuracy of the current target model f. Updated training data may be fed back into the machine learning algorithm 1138 that, in turn, updates the target model f.

A machine learning algorithm 1138 may generate a target model f such that the target model/best fits the datasets of training data to the labels of the training data. Additionally, or alternatively, a machine learning algorithm 1138 may generate a target model f such that when the target model f is applied to the datasets of the training data, a maximum number of results determined by the target model f matches the labels of the training data. Different target models may be generated based on different machine learning algorithms 1138 and/or different sets of training data.

In one example, as shown in FIG. 11C, the health monitoring utility 1110 may include a model trainer 1140 that utilizes one or more machine learning algorithms 1138 to generate and/or train a machine learning model 1136. In one example, the model trainer 1140 may obtain and/or generate feedback from one or more of the machine learning models 1136. The model trainer 1140 may train, update, and/or retrain one or more of the machine learning models 1136 based at least in part on the feedback. The feedback may correspond to one or more outputs of at least one machine learning model 1136. In one example, the model trainer 1140 may obtain a plurality of training datasets. The model trainer 1140 may train a machine learning model 1136 utilized by the health monitoring utility 1110 based at least in part on the plurality of training datasets.

The training datasets may be stored in the data corpus 1120. In one example, the training data may include outputs from one or more of the machine learning models 1136. For example, a machine learning model 1136 may be iteratively trained and/or retrained based at least in part on outputs generated by one or more of the machine learning models 1136. A machine learning model 1136 may be iteratively improved over time as additional datasets are analyzed by the machine learning model 1136 to produce additional outputs, and the machine learning model 1136 is iteratively trained or retrained based on the additional outputs.

In one example, the training data may include one or more initial supervised learning datasets. The model trainer 1140 may train a machine learning model 1136 based at least in part on the one or more initial supervised learning datasets. In one example, the training data may include one or more subsequent supervised learning datasets. The model trainer 1140 may update or retrain the machine learning model 1136 based on one or more subsequent supervised learning datasets. The one or more subsequent supervised learning datasets may be generated based at least in part on feedback corresponding to one or more outputs of the machine learning model 1136.

F. Example Data Corpus

Figure 12A:
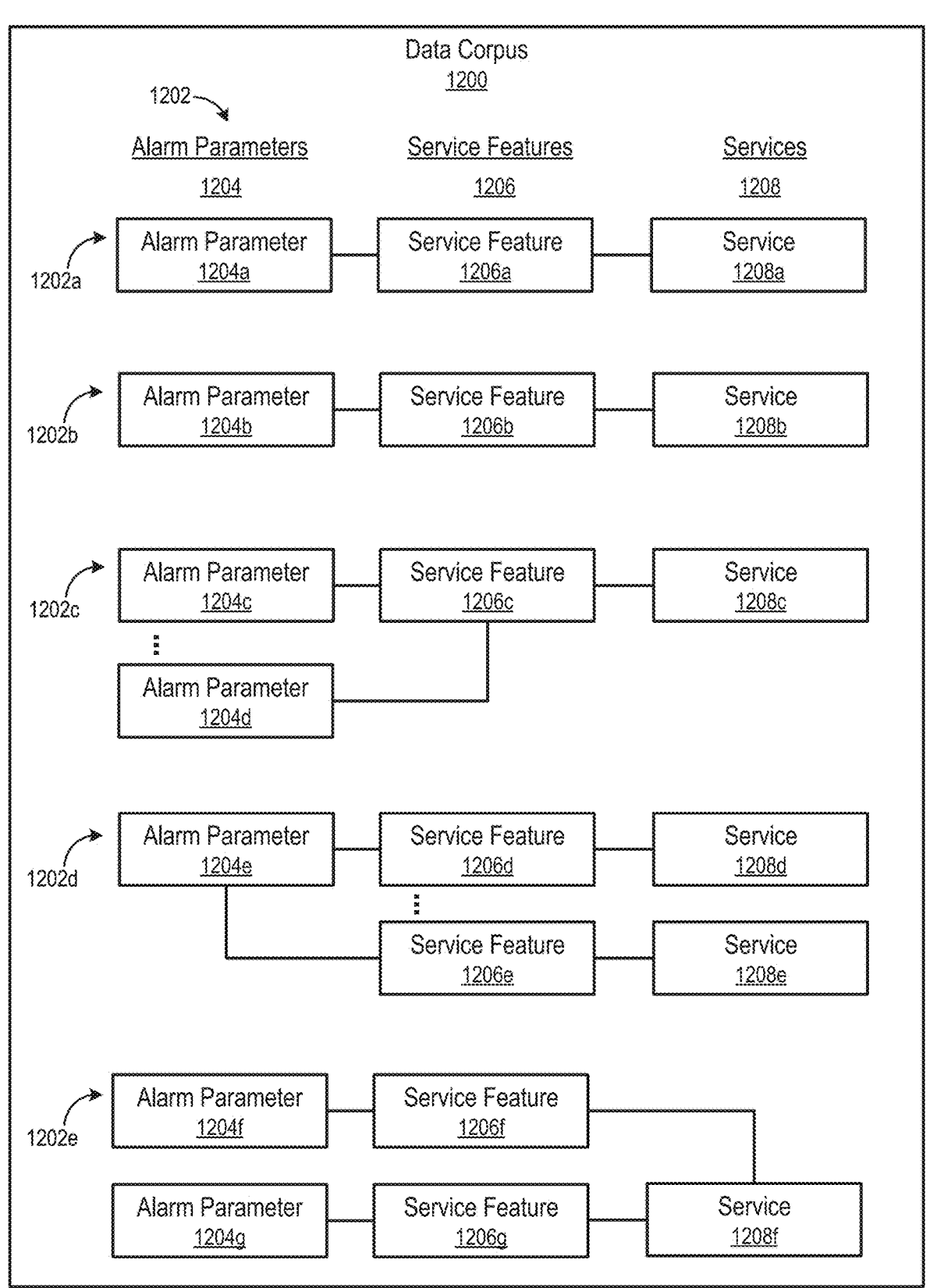
FIG. 12A illustrates example mappings of alarm parameters to service features and service features to services in accordance with one or more embodiments.
Figure 12B:
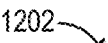
FIGS. 12B and 12C illustrate example dependency graphs that include dependencies between service features in accordance with one or more embodiments.
Figure 12C:
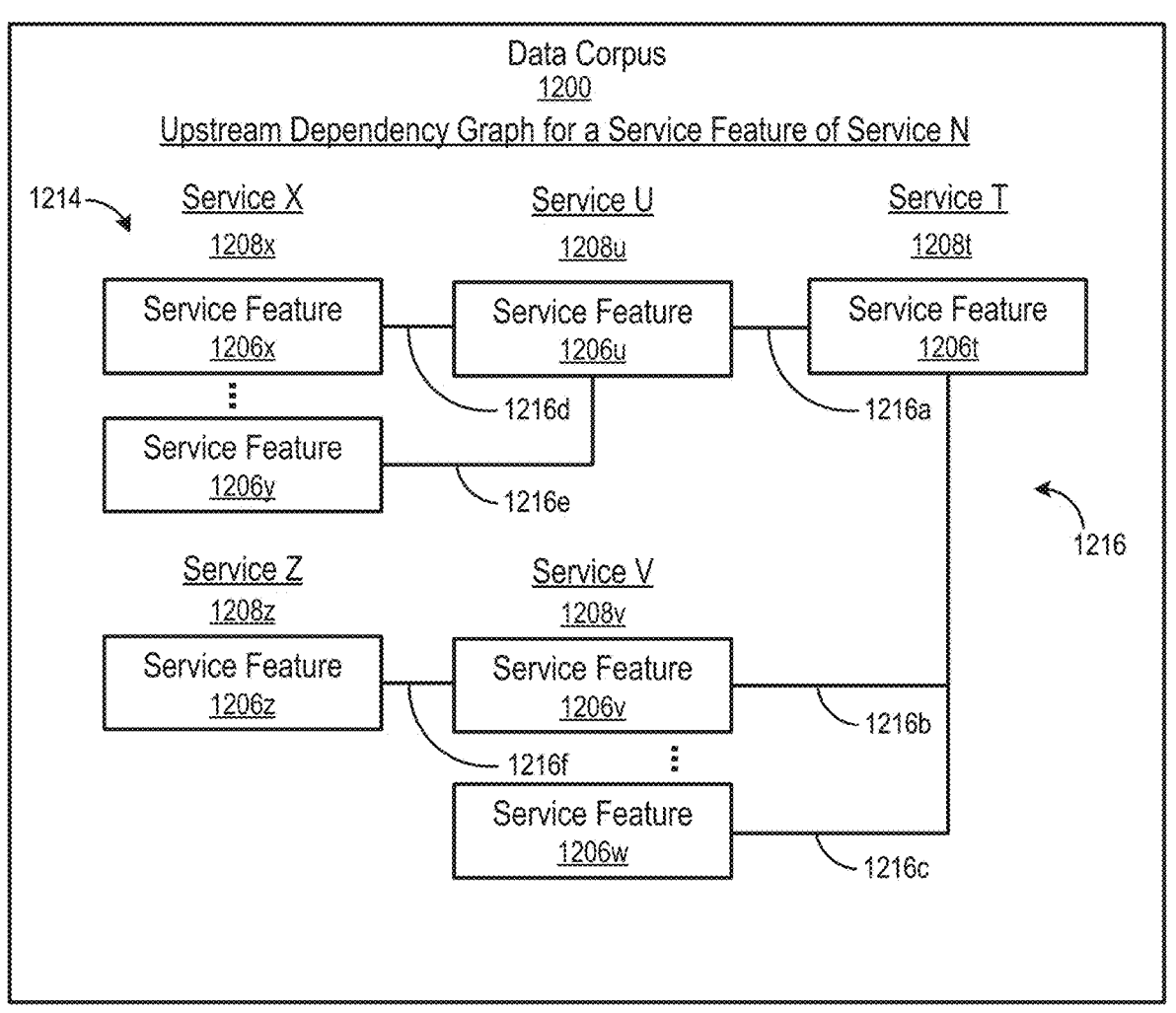

FIGS. 12A-12C illustrate features of an example data corpus 1200. The data corpus 1200 described with reference to FIGS. 12A-12C may be included in one or more embodiments described with reference to FIGS. 11A-11C. Additionally, or alternatively, one or more features of the data corpus 1120 described with reference to FIGS. 11A-11C may be included in the data corpus 1200 described with reference to FIGS. 12A-12C.

i. Example Mappings

As shown in FIG. 12A, a data corpus 1200 includes a plurality of mappings 1202. The plurality of mappings 1202 include mapped relationships between alarm parameters 1204 and service features 1206. The mapped relationships between alarm parameters 1204 and service features 1206 identify particular alarm parameters 1204 that are associated with a particular service feature 1206. Additionally, or alternatively, the plurality of mappings 1202 include mapped relationships between service features 1206 and services 1208. The mapped relationships between service features 1206 and services 1208 identify particular service features 1206 of a particular service 1208.

In one example, the data corpus 1200 includes mappings 1202 of a particular alarm parameter 1204 to a particular service feature 1206 of a particular service 1208. As one example, mapping 1202a maps alarm parameter 1204a to service feature 1206a of service 1208a. As another example, mapping 1202b maps alarm parameter 1204b to service feature 1206b of service 1208b. Additionally, or alternatively, the data corpus 1200 may include mappings 1202 that map a particular service feature 1206 to a plurality of alarm parameters 1204 associated, respectively, with the particular service feature 1206. As one example, mapping 1202c maps alarm parameter 1204c and alarm parameter 1204d to service feature 1206c of service 1208c. Additionally, or alternatively, the data corpus 1200 may include mappings 1202 that map a particular alarm parameter 1204 to a plurality of service features 1206 associated, respectively, with the particular alarm parameter 1204. As one example, mapping 1202d maps alarm parameter 1204e to service feature 1206d of service 1208*d*. Additionally, mapping 1202*d* maps alarm parameter 1204*e* to service feature 1206*e* of service 1208*c*. Additionally, or alternatively, the data corpus 1200 may include mappings 1202 that map a particular service 1208 to a plurality of service features 1206 of the service 1208. Additionally, the mappings 1202 may map the plurality of service features 1206 of the service 1208 to one or more alarm parameters 1204. As one example, mapping 1202*e* maps alarm parameter 1204*f* to service feature 1206*f* of service 1208*f*. Additionally, mapping 1202*e* maps alarm parameter 1204*g* to service feature 1206*g* of service 1208*f*.

The mappings 1202 stored in the data corpus 1200 represent all or a subset of relationships between alarm parameters 1204 and service features 1206 for a particular service 1208. Additionally, or alternatively, the mappings 1202 stored in the data corpus 1200 represent all or a subset of services 1208 executing in a partition. In one example, the data corpus 1200 includes a particular set of mappings 1202 that are determined to be of particular interest for monitoring the health of the cloud environment. The data corpus 1200 may include mappings 1202 that are defined by a user such as a cloud operator. The mappings 1202 that are defined by a user may correspond to particular alarm parameters 1204, service features 1206, and/or services 1208 that are of interest to the user. Additionally, or alternatively, the data corpus 1200 may include mappings 1202 that are automatically generated by a mapping utility. The mappings 1202 that are automatically generated by a mapping utility may correspond to particular alarm parameters 1204, service features 1206, and/or services 1208 that the mapping utility determines may be of interest to a user such as a cloud operator.

i. Example Dependency Graphs

Referring to FIGS. 12B and 12C, the data corpus 1200 may include a plurality of dependency graphs that map functional dependencies between service features. A dependency graph 1210 represents dependencies associated with a one or more service features 1206. In one example, the dependency graphs may include downstream dependency graphs 1210 that represent downstream dependencies 1212 for one or more service features 1206. The downstream dependencies 1212 for a particular service feature 1206 indicate downstream service features 1206 that are dependent upon, or impacted by, one or more functionalities or operations of the particular service feature 1206. Additionally, or alternatively, in one example, the dependency graphs may include upstream dependency graphs 1214 that represent upstream dependencies 1216 for one or more service features 1206.

FIG. 12B illustrates an example downstream dependency graph 1210 for service feature 1206*h* of service 1208*h*. The downstream dependency graph 1210 illustrated in FIG. 12B represents downstream dependencies 1212 for service feature 1206*h*. The downstream dependencies 1212 identify service features 1206 that are dependent upon, or impacted by, service feature 1206*h* of service 1208*h*. As one example, the downstream dependency graph 1210 includes downstream dependency 1212*a* between service feature 1206*h* and service feature 1206*i* of service 1208*i*. Downstream dependency 1212*a* indicates that service feature 1206*i* is dependent upon, or impacted by, service feature 1206*h*. As another example, downstream dependency 1212*b* and downstream dependency 1212*c* indicate, respectively, that both service feature 1206*k* and service feature 1206*m* of service 1208*k* are dependent upon, or impacted by, service feature 1206*h*.

The downstream dependencies 1212 may include one or more downstream service features 1206 that are dependent upon, or impacted by, a particular service feature 1206 that is dependent upon, or impacted by, another service feature 1206. As one example, the downstream dependency graph 1210 includes downstream dependency 1212*d* between service feature 1206*i* of service 1208*i* and service feature 1206*n* of service 1208*j* and downstream dependency 1212*e* between service feature 1206*i* and service feature 1206*p*. Together, downstream dependency 1212*a* and downstream dependency 1212*d* indicate that service feature 1206*n* is dependent upon, or impacted by, service feature 1206*h*. Additionally, downstream dependency 1212*a* and downstream dependency 1212*e* indicate that service feature 1206*p* is dependent upon, or impacted by, service feature 1206*h*. Service feature 1206*n* and/or service feature 1206*p* may, respectively, be indirectly dependent upon service feature 1206*h* by virtue of the dependency from service feature 1206*i* indicated, respectively, by downstream dependency 1212*d* and downstream dependency 1212*e*. As another example, downstream dependency 1212*f* between service feature 1206*k* of service 1208*k* and service feature 1206*q* of service 1208*m* indicate that service feature 1206*p* is dependent upon, or impacted by, service feature 1206*h*. Service feature 1206*q* may be indirectly dependent upon service feature 1206*h* by virtue of the dependency from service feature 1206*k* indicated by downstream dependency 1212*f*.

FIG. 12C illustrates an example upstream dependency graph 1214 for service feature 1206*t* of service 1208*t*. The upstream dependency graph 1214 illustrated in FIG. 12C represents upstream dependencies 1216 for service feature 1206*t*. The upstream dependencies 1216 identify service features 1206 that service feature 1206*t* of service 1208*t* depends upon or that impact service feature 1206*t*. As one example, the upstream dependency graph 1214 includes upstream dependency 1216*a* between service feature 1206*t* and service feature 1206*u* of service 1208*u*. Upstream dependency 1216*a* indicates that service feature 1206*t* depends upon, or is impacted by, service feature 1206*u*. As another example, upstream dependency 1216*b* and upstream dependency 1216*c* indicate, respectively, that service feature 1206*t* depends upon, or is impacted by, service feature 1206*v* and service feature 1206*w* of service 1208*v*.

The upstream dependencies 1216 may include one or more upstream service features 1206 that are dependent upon, or impacted by, another upstream service feature 1206. As one example, the upstream dependency graph 1214 includes upstream dependency 1216*d* between service feature 1206*u* of service 1208*u* and service feature 1206*x* of service 1208*x* and upstream dependency 1216*e* between service feature 1206*u* and service feature 1206*y*. Together, upstream dependency 1216*a* and upstream dependency 1216*d* indicate that service feature 1206*t* is dependent upon, or impacted by, service feature 1206*x*. Additionally, upstream dependency 1216*a* and upstream dependency 1216*e* indicate that service feature 1206*t* is dependent upon, or impacted by, service feature 1206*y*. Service feature 1206*t* may be indirectly dependent upon, or indirectly impacted by, service feature 1206*x* and/or service feature 1206*y* by virtue of the upstream dependencies respectively indicated by upstream dependency 1216*d* and upstream dependency 1216*e*. As another example, upstream dependency 1216*f* between service feature 1206*v* of service 1208*v* and service feature 1206*z* of service 1208*z* indicate that service feature 1206*t* is dependent upon, or impacted by, service feature 1206z. Service feature 1206t may be indirectly dependent upon service feature 1206z by virtue of upstream dependency 1216f.

The data corpus 1200 may include dependency graphs for all or a subset of service features 1206 of a particular services 1208 executing in a partition. Additionally, or alternatively, the dependency graphs stored in the data corpus 1200 represent all or a subset of downstream dependencies 1212 and/or upstream dependencies 1216 between various service features 1206. In one example, the data corpus 1200 includes a particular set of dependency graphs for service features 1206 that are determined to be of particular interest for monitoring the health of the cloud environment. The data corpus 1200 may include dependency graphs that are defined by a user such as a cloud operator. The dependency graphs that are defined by a user may correspond to particular service features 1206 and/or services 1208 that are of interest to the user. Additionally, or alternatively, the data corpus 1200 may include dependency graphs that are automatically generated by a mapping utility. The dependency graphs that are automatically generated by a mapping utility may correspond to particular service features 1206 and/or services 1208 that the mapping utility determines may be of interest to a user such as a cloud operator.

In one or more embodiments, the data corpus 1200 is any type of storage unit and/or device (e.g., a file system, database, collection of tables, or any other storage mechanism) for storing data. Further, the data corpus 1200 may include multiple different storage units and/or devices. The multiple different storage units and/or devices may or may not be of the same type or located at the same physical site. Further, the data corpus 1200 may be implemented or executed on the same computing system as the health monitoring utility 1110 (FIGS. 11A-11C). Additionally, or alternatively, the data corpus 1200 may be implemented or executed on a computing system separate from the health monitoring utility 1110 (FIGS. 11A-11C). The data corpus 1200 may be communicatively coupled to the health monitoring utility 1110 (FIGS. 11A-11C) via a direct connection or via a network. Information describing the data corpus 1200 may be implemented across any of components of the system 1100 (FIGS. 11A-11C). However, this information is described with reference to the data corpus 1200 for purposes of clarity and explanation.

4. Example Operations for Generating Health Metrics

Figure 13A:
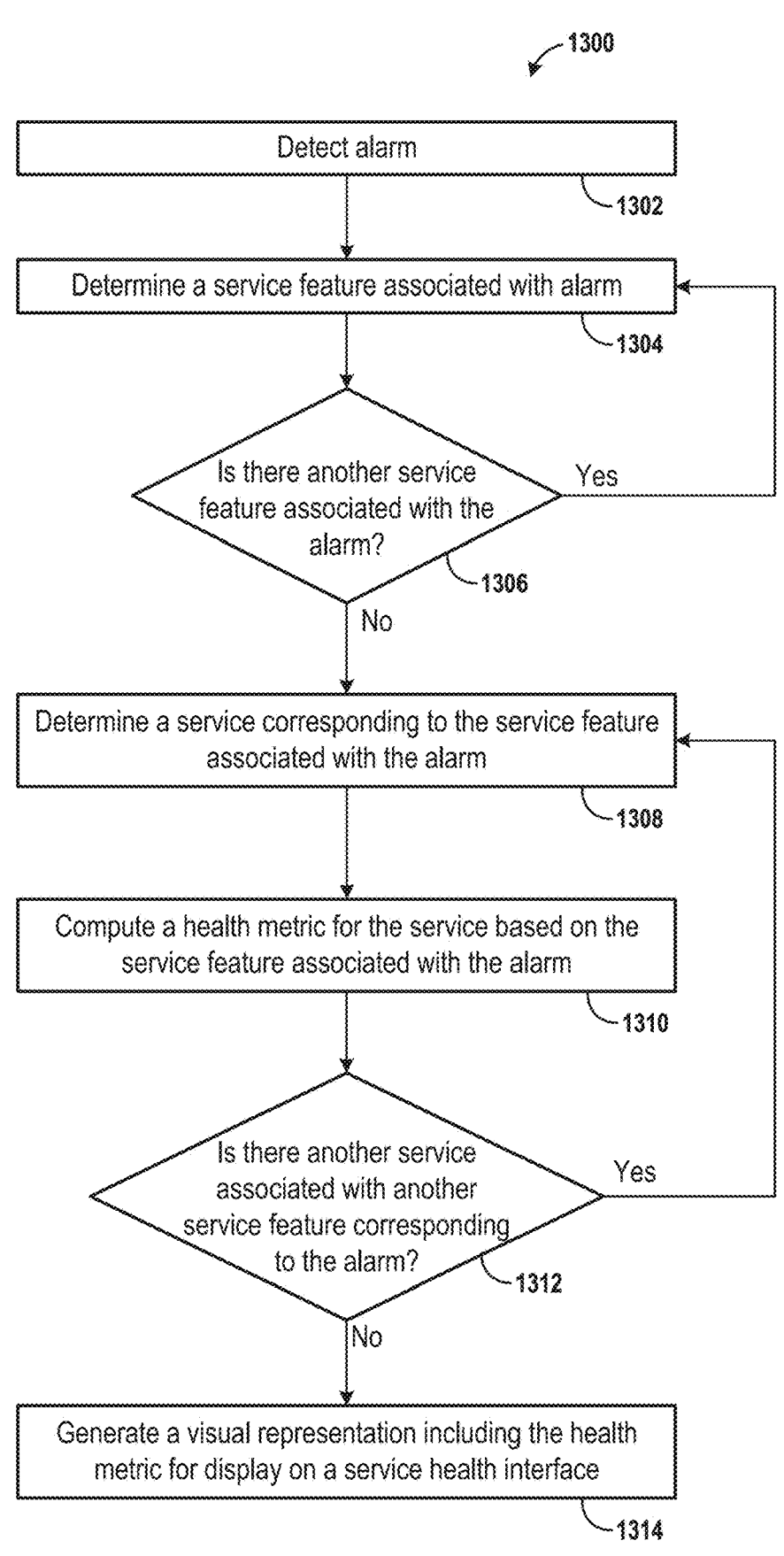
FIGS. 13A-13C illustrate example sets of operations for monitoring the health of services of a system in accordance with one or more embodiments.
Figure 13B:
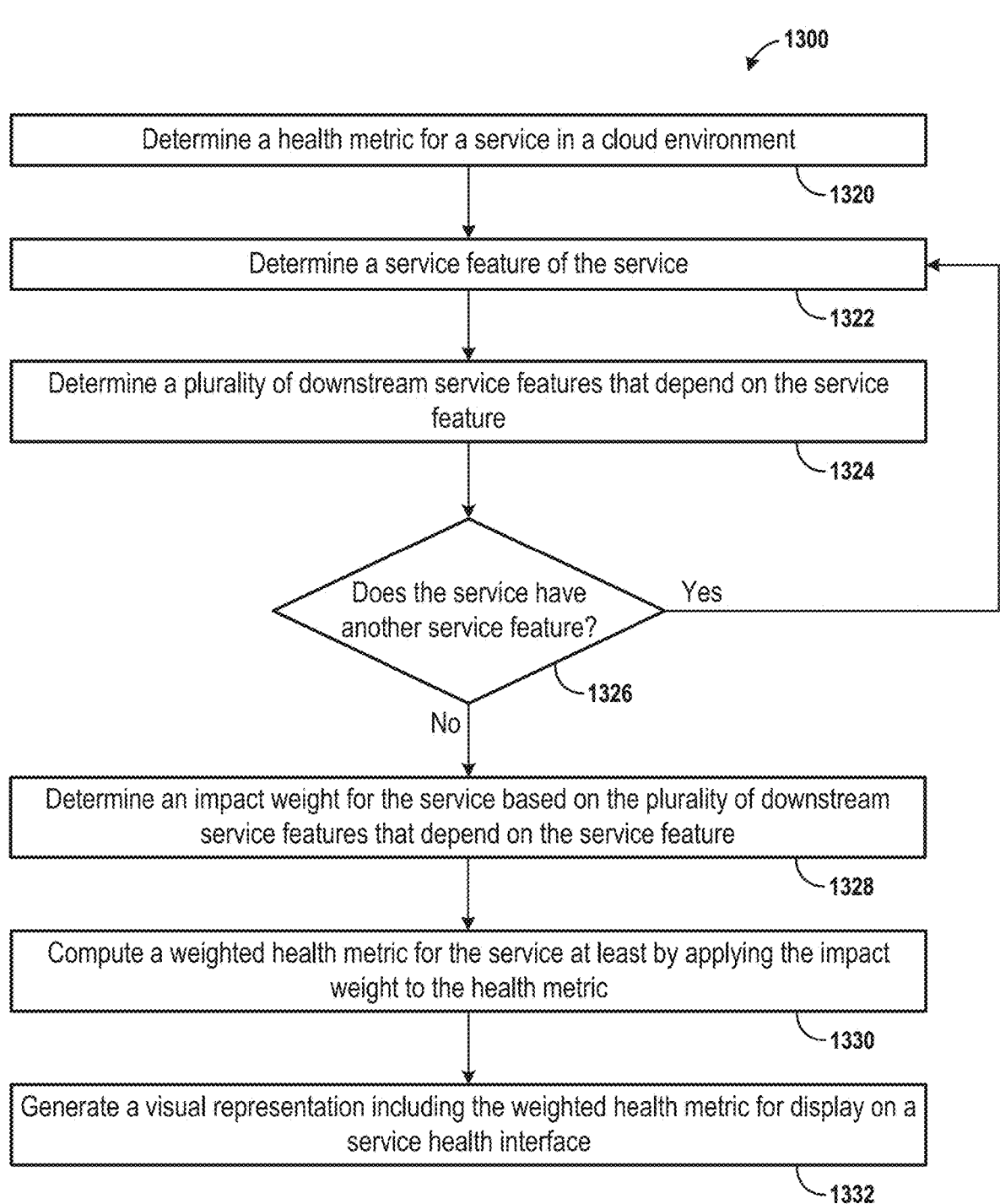
Figure 13C:
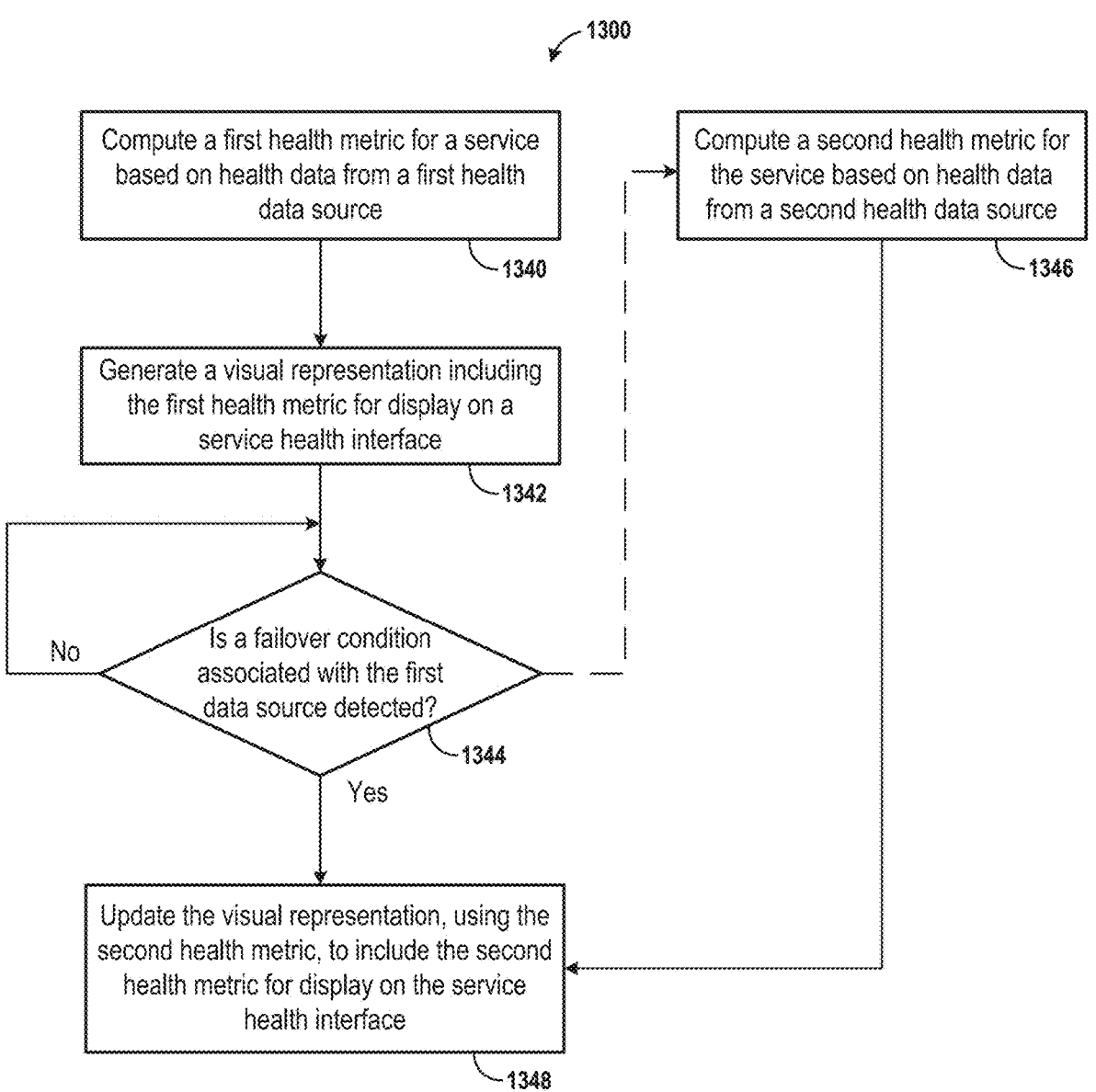

Referring to FIGS. 13A-13C, example operations 1300 pertaining to monitoring the health of services of a system are further described in accordance with one or more embodiments. One or more operations 1300 described with reference to FIGS. 13A-13C may be modified, combined, rearranged, or omitted. Accordingly, the particular sequence of operations 1300 described with reference to FIGS. 13A-13C should not be construed as limiting the scope of one or more embodiments. In one example, the operations 1300 may be performed by the one or more components of the system described with reference to FIGS. 11A-11C.

A. Determining Health Metrics Based on Service Features of a Service

Referring to FIG. 13A, a system may execute operations 1300 pertaining to determining health metrics based on service features of a service. As shown in FIG. 13A, a system determines that an alarm is detected (Operation 1302), and in response to determining that the alarm is detected, the system determines one or more service features associated with detected alarm (Operation 1304). In one example, the system detects a first alarm and determines that the first alarm is associated with a first service feature based on a mapping between the first service feature and the first detected alarm. In one example, the system determines whether there is another service feature associated with the alarm (Operation 1306). The system may determine one or more service features associated with the alarm based on mappings between alarm parameters and service features. The mapping may be stored in a data corpus and/or in metadata associated with the service and/or the service feature. In one example, in addition to the first service feature, the system determines that a second service feature is associated with the alarm.

For the respective service features associated with detected alarm, the system determines a service corresponding to the respective service feature (Operation 1308). Upon having determined a service corresponding to a service feature, the system computes a health metric for the service (Operation 1310). The health metric for the service is computed based at least in part on the service feature associated with the alarm. The health metric may represent an effect of the alarm on at least one of the following: the service feature, the service, or the cloud environment. In one example, the health metric is computed based at least in part on a user-defined valuation for the service feature. The user-defined valuation for a service feature may be stored in a data corpus and/or in metadata associated with the service feature. Example health metrics are further described below with reference to FIGS. 14A-14E, FIGS. 15A and 15B, and FIGS. 16A-16C.

In one example, the system determines that first service corresponds to the first service feature and computes a first health metric for the first service. The first health metric is computed based on the first service feature associated with the alarm. In one example, the system determines whether there is another service associated with another service feature corresponding to the alarm (Operation 1312). The system may determine one or more services corresponding, respectively, to one or more service features associated with the alarm based on mappings between services and service features. The mapping may be stored in a data corpus and/or in metadata associated with the service and/or the service feature. In one example, in addition to the first service corresponding to the first service feature, the system determines that a second service corresponds to a second feature associated with the alarm.

Upon having computed one or more health metrics for one or more services corresponding to one or more service features associated with the alarm, the system generates a visual representation that includes the one or more health metrics for display on a service health interface (Operation 1314). In one example, the system determines a ranking of the service features relative to one another based at least in part on a comparison of the health metrics corresponding to the respective service features. The system may display the rankings on the service health interface. Example service health interfaces are further described below with reference to FIGS. 16A-16C.

In one example, the system determines the one or more service features associated with an alarm and/or the service corresponding to the one or more service features based on mappings represented as key-value pairs. The system may identify service features by searching for a key that corresponds to the alarm and retrieving one or more associated values corresponding, respectively, to the one or more service features associated with the alarm. The system may identify a service corresponding to the one or more service features by traversing the mapping from a particular value associated with a particular service feature to a corresponding service. For example, the mappings may be stored in a relational database and/or a table. Additionally, or alternatively, the system may search for a key that corresponds to a service feature and retrieve an associated value corresponding to a service. Additionally, or alternatively, mappings may be stored in metadata associated with an alarm parameter, a service feature, and/or a service, and the system may determine the mapped elements by accessing the mappings from the metadata.

B. Determining Health Metrics Based on Impact on Downstream Service Features

Referring to FIG. 13B, a system may execute operations 1300 pertaining to determining health metrics based on an impact that service features have on other downstream service features and/or services. As shown in FIG. 13B, a system determines a health metric for a service in a cloud environment (Operation 1320). In one example, the health metric is determined in accordance with the operations 1300 described with reference to FIG. 13A. As described with reference to FIG. 13B, the system may apply an impact weight to the health metric for a service based on an impact that one or more services features of the service have on one or more downstream service features and/or services. Additionally, or alternatively, the system may apply an impact weight to the health metric for the service based on an impact that one or more upstream service features have on one or more service features of the service.

As shown in FIG. 13B, the system determines a service feature of the service (Operation 1322). The system may determine the service feature based on a mapping between the service and the service feature. The mapping may be stored in a data corpus and/or in metadata associated with the service and/or the service feature.

For a particular service identified at operation 1322, the system determines one or more downstream service features that depend on the service feature (Operation 1324). The system may determine the downstream service features from a dependency graph corresponding to the service feature. The dependency graph may map functional dependencies between the service feature and one or more downstream service features. In one example, the data corpus includes a foreign key representing the service feature that corresponds to a primary key representing the dependency graph for the service feature. The system may determine the foreign key from the mapping between the service feature and the service. The system may determine the one or more downstream service features by traversing the dependency graph and retrieving values corresponding to the downstream service features. In one example, the system determines whether the service has an additional service feature (Operation 1326). When the system determines that the service has an additional service feature, the system returns to operation 1324, where the system determines one or more downstream service features that depend on the additional service feature. The system may determine downstream service features for one or more service features of the service.

Upon having determined the downstream service features for one or more service features of the service, at operation 1324, the system determines an impact weight for the service. The impact weight is determined based on the downstream service features that depend on a service feature of the service (Operation 1328). The system may compute the impact weight based on one or more service features of the service. In one example, the impact weight is a dependency weight as described below with reference to FIG. 15A. In one example, the system determines a count of the first plurality of downstream service features and computes the impact weight based on the count of the plurality of downstream service features. In one example, the system computes a plurality of impact weights corresponding, respectively, to a plurality of service features of the service. Additionally, in one example, the system computes an impact weight for the service based on the plurality of impact weights corresponding to the plurality of services. In one example, the system determines a plurality of downstream service features that depend on a service feature of the service. To determine the plurality of downstream service features, the system accesses a dependency graph and determines, based on the dependency graph, a first dependency between the service feature and a first downstream service feature. Additionally, the system determines a second dependency between the service feature and a second downstream service feature based on the dependency graph.

The impact weight for the service may be computed based on a number of downstream service features that are impacted by a particular service feature of the service. Additionally, or alternatively, the impact weight for the service may be computed based on one or more weights associated, respectively, with the one or more downstream service features impacted by the particular service feature. Additionally, or alternatively, the impact weight for the service may be computed based on one or more weight associated, respectively, with one or more service features of the service that impact one or more downstream service features. The system may determine a weight associated with a service feature of a service based on the dependency graph corresponding to the service feature. Additionally, or alternatively, the system may determine weights associated with the downstream service features based on the dependency graph corresponding to the service feature. In one example, the dependency graph includes mappings between services features and corresponding weights. The system may traverse the dependency graph to identify service features and retrieve the weights corresponding to the downstream service features.

In one example, the impact weights corresponding to downstream service features are user-defined values. The system may compute service feature weights based on the user-defined values for the downstream service features. Additionally, or alternatively, the impact weight for a service may be computed based on user-defined values for one or more service features of the service. In one example, the impact weight represents a composite of the service feature weights for the one or more service features of the service and the service feature weights for the downstream service features corresponding, respectively, to the one or more service features of the service.

Upon having determined an impact weight for the service, the system computes a weighted health metric for the service at least by applying the impact weight to the health metric (Operation 1330). Upon having determined the impact weight for the service, the system generates a visual representation that includes the weighted health metric for display on a service health interface (Operation 1332). In one example, the system determines a first impact weight corresponding to a first service feature of the service and a second impact weight corresponding to a second service feature of the service. Additionally, in one example, the system computes a weighted health metric for the service based on an impact weight determined for the service based on the first impact weight corresponding to the first service feature and the second impact weight corresponding to a second service feature. In one example, the system determines an impact weight for a plurality of services executing in a partition. In one example, the system determines a ranking of the services relative to one another based at least in part on a comparison of the weighted health metrics. The system may display the rankings on the service health interface. Example service health interfaces are further described below with reference to FIGS. 16A-16C.

C. Changing Health Data Sources Responsive to Failover Conditions

Referring to FIG. 13C, a system may execute operations 1300 pertaining to changing health data sources responsive to a failover condition. The system may generate and display health metrics for services utilizing health data from a first health data source, and in response to determining a failover condition, the system may change from the first health data source to a second health data source. In response to the failover condition, the system may generate and display health metrics for services utilizing health data from a second health data source. In one example, the transition from the first health data source to the second health data source is automatic. In one example, the transition from the first health data source to the second health data source is imperceptible from the visual representations displayed on a service health interface. Additionally, or alternatively, the service health interface may include an indication of the health data source utilized to compute various health metrics. Additionally, or alternatively, the service health interface may transmit a notification accessible by a user when transitioning from the first health data source to the second health data source. In one example, the system may condition a transition from the first health data source to the second health data source upon receipt of an input indicating a user approval of the transition. In one example, the transition from the first health data source to the second health data source may be conditioned on the user approval, for example, when the second health data source represents a lower level of detail or granularity than the first health data source.

In one example, the system computes a first health metric for a service based on health data from a first health data source (Operation 1340). The first health data source may include a telemetry service. The system generates a visual representation that includes the first health metric for display on a service health interface (Operation 1342). The system determines whether a failover condition associated with the first data source is detected (Operation 1344). When the failover condition is not detected, the system continues displaying the first health metric in the visual representation on a service health interface. When the failover condition is detected, the system updates the visual representation using a second health metric that is computed for the service based on health data from a second health data source. In one example, the system computes a second health metric for the service based on the health data from the second health data source concurrently with computation of the first health metric based on the health data from the first health data source (Operation 1346). Additionally, or alternatively, the system may compute the second health metric based on the health data from the second health data source in response to a determination that the failover condition is detected (Operation 1344). Additionally, or alternatively, in response to determining that the failover condition is detected, the system updates the visual representation, using the second health metric, for display on the service health interface (Operation 1348).

In one example, the system detects the failover condition at operation 1344 by monitoring one or more alarm parameters corresponding to the first health data source. The failover condition may correspond to the telemetry service and/or one or more alarm parameters corresponding, respectively, to one or more monitored components that are monitored by the telemetry service. Additionally, or alternatively, the failover condition may correspond to a messaging service. In one example, the system determines a failover condition based on an error alarm corresponding to an alarm parameter. Additionally, or alternatively, the system determines the failover condition based on a degraded state associated with the alarm parameter. As examples, the degraded state may represent a hardware failure, a software bug, a networking issue, or data corruption. The degraded state may include one or more of the following: incomplete or missing alarms, delayed alarms, false alarms, inconsistent alarm behavior, or reduced accuracy of alarm data.

In one example, the failover condition is based on a time duration from a state change meeting a threshold. The time duration may indicate how much time has elapsed since a last state change for an alarm parameter, the threshold may represent a time duration that a state change is expected to occur. If the time duration meets the threshold, the state of the alarm parameter may be considered suspect. The system may transition from the first health data source to the second health data source with respect to all or a portion of the alarm parameters. In one example, the system transitions from the first health data source to the second health data source with respect to a particular alarm parameter that exhibits a failover condition.

5. Example Health Metrics

Referring now to FIGS. 14A-14E and FIGS. 15A and 15B, example health metrics are further described. In one example, the health metrics represent an effect of one or more alarm on at least one of the following: a service feature associated with the alarm, a service corresponding to the service feature, or the cloud environment. Additionally, or alternatively, the health metrics may represent an impact that a particular service feature has on one or more downstream service features and/or an impact that one or more upstream service features has on a particular service feature. A health metric may represent a sum, product, or composite of one or more input parameters utilized to compute the health metric. The one or more input parameters may include functions, operators, variables, or constants. The one or more input parameters may be associated with a service, a service feature, or an alarm. The one or more input parameters may include additional health metrics. Additionally, or alternatively, the one or more input parameters may include weights such as weights applied to the one or more additional health metrics. The examples described below with reference to FIGS. 14A-14E and FIGS. 15A and 15B are provided for purposes of clarity and should not be construed as limiting the scope of any of the claims.

A. Health Metrics Based on Alarms Associated with Service Features of a Service

As shown in FIGS. 14A-14E, a system computes health metrics 1400 for services based on service features of the service. The health metrics for the services represent an effect on the health of a service attributable to alarms associated with service features of the service. The health metrics 1400 may be weighted to represent a degree of importance, significance, value, or impact of a particular service feature and/or alarm.

Figure 14A:
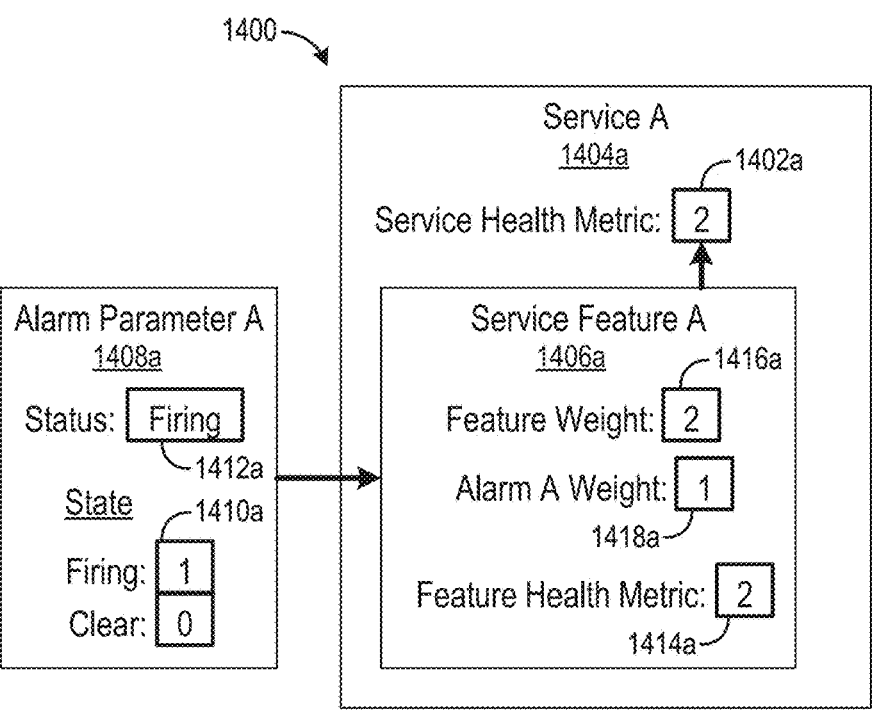
FIGS. 14A-14E illustrate example health metrics for monitoring the health of services of a system in accordance with one or more embodiments.

Referring to FIG. 14A, the health metrics 1400 include a service health metric 1402a that represents a health of service 1404a. The system computes service health metric 1402a based on service feature 1406a of service 1404a. Service feature 1406a is associated with alarm parameter 1408a. Service health metric 1402a represents an effect of service feature 1406a on the health of service 1404a attributable to alarm parameter 1408a. As shown in FIG. 14A, alarm parameter 1408a has an alarm state 1410a that indicates an alarm status 1412a of alarm parameter 1408a. The alarm state 1410a is (1) when alarm parameter 1408a is firing. Alarm state 1410a is (0) when alarm parameter 1408a is clear. The alarm status 1412a of alarm parameter 1408a indicates that alarm parameter 1408a is firing.

The system computes feature health metric 1414a based on alarm parameter 1408a. Feature health metric 1414a may be computed based on the alarm state 1410a and/or the alarm status 1412a. In one example, the system computes feature health metric 1414a based on a feature weight 1416a corresponding to service feature 1406a. Feature weight 1416a represents a degree of importance, significance, value, or impact of service feature 1406a on the health of service 1404a. Additionally, or alternatively, the system computes feature health metric 1414a based on alarm weight 1418a corresponding to alarm parameter 1408a. Alarm weight 1418a represents a degree of importance, significance, value, or impact of alarm parameter 1408a on service feature 1406a. In one example, feature health metric 1414a represents a sum, product, or composite of feature weight 1416a and alarm weight 1418a. Additionally, or alternatively, feature health metric 1414a may represent a product of one or more functions, operators, variables, or constants associated with service feature 1406a and/or alarm parameter 1408a.

In one example, service health metric 1402a represents a sum, product, or composite of feature health metric 1414a and one or more additional feature health metrics of service 1404a. Additionally, or alternatively, service health metric 1402a may represent a product of one or more functions, operators, variables, or constants associated with service 1404a. In one example, feature health metric 1414a has a value of (2) representing a product of feature weight 1416a and alarm weight 1418a (e.g., 2×1=2). In one example, service health metric 1402a has a value of (2) representing a product of feature health metric 1414a and one or more additional feature health metrics.

Figure 14B:
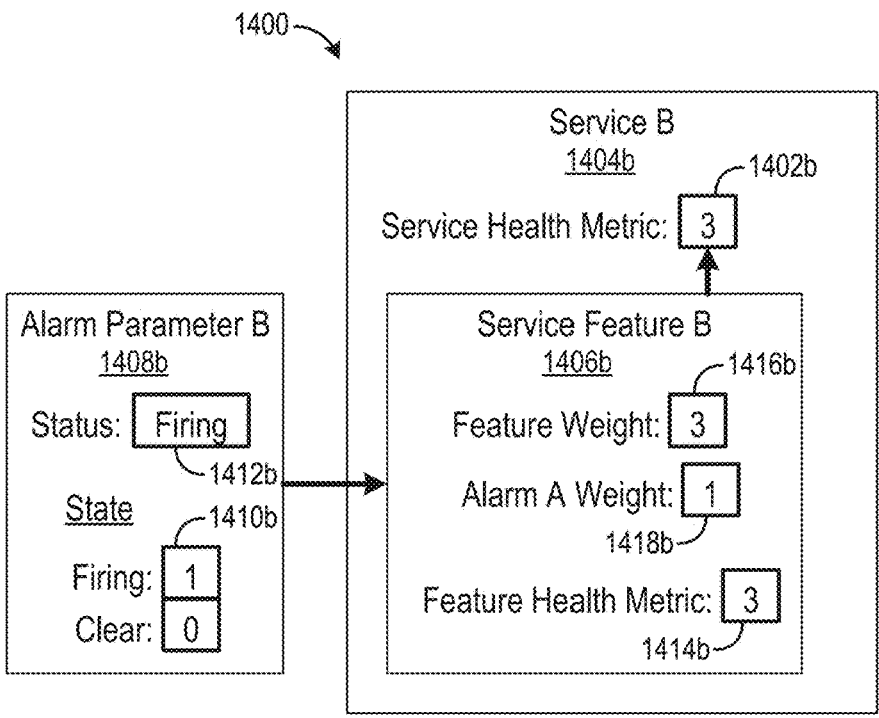

Referring to FIG. 14B, the health metrics 1400 include a service health metric 1402b that represents a health of service 1404b. The system computes service health metric 1402b based on service feature 1406b of service 1404b. Service feature 1406b is associated with alarm parameter 1408b. Service health metric 1402b represents an effect of service feature 1406b on the health of service 1404b attributable to alarm parameter 1408b. As shown in FIG. 14B, alarm parameter 1408b has an alarm state 1410b that indicates an alarm status 1412b of alarm parameter 1408b. The alarm state 1410b is (1) when alarm parameter 1408b is firing. Alarm state 1410b is (0) when alarm parameter 1408b is clear. The alarm status 1412b of alarm parameter 1408b indicates that alarm parameter 1408b is firing.

The system computes feature health metric 1414b based on alarm parameter 1408b. Feature health metric 1414b may be computed based on the alarm state 1410b and/or the alarm status 1412b. In one example, the system computes feature health metric 1414b based on a feature weight 1416b corresponding to service feature 1406b. Feature weight 1416b represents a degree of importance, significance, value, or impact of service feature 1406b on the health of service 1404b. Additionally, or alternatively, the system computes feature health metric 1414b based on alarm weight 1418b corresponding to alarm parameter 1408b. Alarm weight 1418b represents a degree of importance, significance, value, or impact of alarm parameter 1408b on service feature 1406b. In one example, feature health metric 1414b represents a sum, product, or composite of feature weight 1416b and alarm weight 1418b. Additionally, or alternatively, feature health metric 1414b may represent a product of one or more functions, operators, variables, or constants associated with service feature 1406b and/or alarm parameter 1408b.

In one example, service health metric 1402b represents a sum, product, or composite of feature health metric 1414b and one or more additional feature health metrics of service 1404b. Additionally, or alternatively, service health metric 1402b may represent a product of one or more functions, operators, variables, or constants associated with service 1404b. In one example, feature health metric 1414b has a value of (3) representing a product of feature weight 1416b and alarm weight 1418b (e.g., 3×1=3). In one example, service health metric 1402b has a value of (3) representing a product of feature health metric 1414b and one or more additional feature health metrics.

Figure 14C:
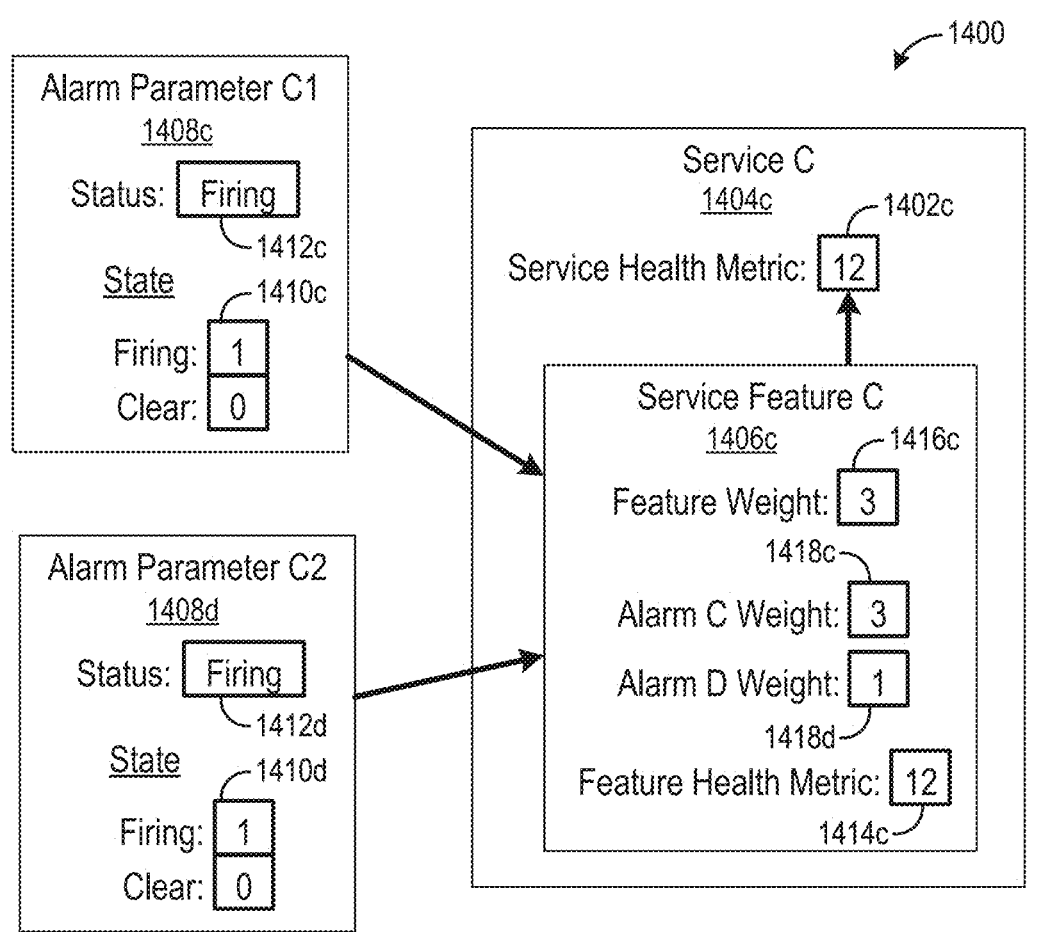

Referring to FIG. 14C, in one example, the system computes a feature health metric for a service feature based on a plurality of alarm parameters associated with the service feature. The feature health metric may represent an effect on the service feature attributable to the respective alarm parameters. Additionally, or alternatively, the system may compute a service health metric for a service based on a service feature that is associated with a plurality of alarm parameters. As shown in FIG. 14C, the system computes service health metric 1402c based on service feature 1406c of service 1404c. Service feature 1406c is associated with alarm parameter 1408c and alarm parameter 1408d. Service health metric 1402c represents an effect of service feature 1406c on the health of service 1404c attributable to alarm parameter 1408c and/or alarm parameter 1408d.

As shown in FIG. 14C, alarm parameter 1408c has an alarm state 1410c that indicates an alarm status 1412c of alarm parameter 1408c. The alarm state 1410c is (1) when alarm parameter 1408c is firing. Alarm state 1410c is (0) when alarm parameter 1408c is clear. The alarm status 1412c of alarm parameter 1408c indicates that alarm parameter 1408c is firing. Additionally, alarm parameter 1408d has an alarm state 1410d that indicates an alarm status 1412d of alarm parameter 1408d. The alarm state 1410d is (1) when alarm parameter 1408d is firing. Alarm state 1410d is (0) when alarm parameter 1408d is clear. The alarm status 1412d of alarm parameter 1408d indicates that alarm parameter 1408d is firing.

The system computes feature health metric 1414c based on alarm parameter 1408c and alarm parameter 1408d. Feature health metric 1414c may be computed based on the alarm state 1410c and/or the alarm status 1412c of alarm parameter 1408a. Additionally, or alternatively, feature health metric 1414c may be computed based on the alarm state 1410d and/or the alarm status 1412d of alarm parameter 1408d. In one example, the system computes feature health metric 1414c based on a feature weight 1416c corresponding to service feature 1406c. Feature weight 1416c represents a degree of importance, significance, value, or impact of service feature 1406c on the health of service 1404c. Additionally, or alternatively, the system computes feature health metric 1414c based on alarm weight 1418c corresponding to alarm parameter 1408c and/or based on alarm weight 1418d corresponding to alarm parameter 1408d. Alarm weight 1418c represents a degree of importance, significance, value, or impact of alarm parameter 1408c on service feature 1406c. Alarm weight 1418d represents a degree of importance, significance, value, or impact of alarm parameter 1408d on service feature 1406c.

In one example, feature health metric 1414c represents a sum, product, or composite of feature weight 1416c, alarm weight 1418c, and alarm weight 1418d. Additionally, or alternatively, feature health metric 1414c may represent a product of one or more functions, operators, variables, or constants associated with service feature 1406c, alarm parameter 1408c, and/or alarm parameter 1408d. In one example, service health metric 1402c represents a sum, product, or composite of feature health metric 1414c and one or more additional feature health metrics of service 1404c. Additionally, or alternatively, service health metric 1402c may represent a product of one or more functions, operators, variables, or constants associated with service 1404c. In one example, feature health metric 1414c has a value of (12) representing a product of alarm weight 1418c and feature weight 1416c combined with a product of alarm weight 1418d and feature weight 1416c (e.g., 3×3+3×1=12). In one example, service health metric 1402c has a value of (12) representing a sum of feature health metric 1414c and one or more additional service features of service 1404b.

Figure 14D:
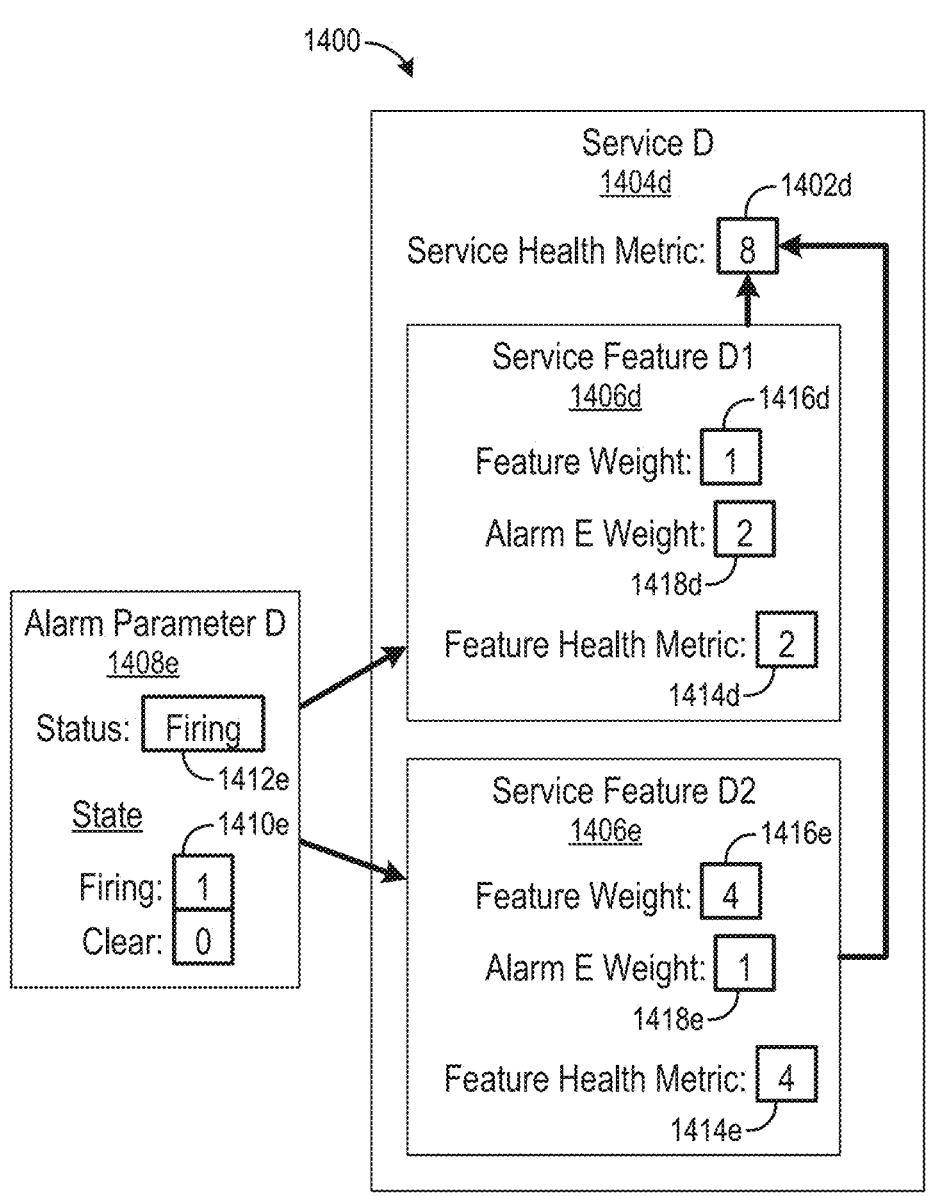

Referring to FIG. 14D, in one example, the system computes a service health metric for a service based on feature health metrics for a plurality of service features of the service that are associated with a particular alarm parameter. As shown in FIG. 14D, alarm parameter 1408e is associated with service feature 1406d and service feature 1406e of service 1404d. The system computes service health metric 1402d based on service feature 1406d and service feature 1406e of service 1404d. Alarm parameter 1408e is associated with service feature 1406d and service feature 1406e. Service health metric 1402d represents an effect of service feature 1406d on the health of service 1404d attributable to alarm parameter 1408e. Additionally, service health metric 1402d represents an effect of service feature 1406e on the health of service 1404d attributable to alarm parameter 1408c.

The system computes feature health metric 1414d based on alarm parameter 1408c. As shown in FIG. 14D, alarm parameter 1408e has an alarm state 1410e that indicates an alarm status 1412e of alarm parameter 1408e. The alarm state 1410e is (1) when alarm parameter 1408e is firing. Alarm state 1410e is (0) when alarm parameter 1408e is clear. The alarm status 1412e of alarm parameter 1408e indicates that alarm parameter 1408e is firing. Feature health metric 1414d may be computed based on the alarm state 1410e and/or the alarm status 1412e. In one example, the system computes feature health metric 1414d based on a feature weight 1416d corresponding to service feature 1406d. Feature weight 1416d represents a degree of importance, significance, value, or impact of service feature 1406d on the health of service 1404d. Additionally, or alternatively, the system computes feature health metric 1414d based on alarm weight 1418d corresponding to alarm parameter 1408e. Alarm weight 1418d represents a degree of importance, significance, value, or impact of alarm parameter 1408e on service feature 1406d. In one example, feature health metric 1414d represents a sum, product, or composite of feature weight 1416d and alarm weight 1418d. Additionally, or alternatively, feature health metric 1414d may represent a product of one or more functions, operators, variables, or constants associated with service feature 1406d and/or alarm parameter 1408c.

The system computes feature health metric 1414e based on alarm parameter 1408c. Feature health metric 1414e may be computed based on the alarm state 1410e and/or the alarm status 1412e. In one example, the system computes feature health metric 1414e based on a feature weight 1416e corresponding to service feature 1406e. Feature weight 1416e represents a degree of importance, significance, value, or impact of service feature 1406e on the health of service 1404d. Additionally, or alternatively, the system computes feature health metric 1414e based on alarm weight 1418e corresponding to alarm parameter 1408e. Alarm weight 1418e represents a degree of importance, significance, value, or impact of alarm parameter 1408c on service feature 1406e. In one example, feature health metric 1414e represents a sum, product, or composite of feature weight 1416e and alarm weight 1418e. Additionally, or alternatively, feature health metric 1414e may represent a product of one or more functions, operators, variables, or constants associated with service feature 1406e and/or alarm parameter 1408c.

In one example, service health metric 1402d represents a sum, product, or composite of feature health metric 1414d and feature health metric 1414c. Additionally, or alternatively, service health metric 1402d may represent a product of one or more functions, operators, variables, or constants associated with service 1404d. In one example, feature health metric 1414d has a value of (2) representing a product of feature weight 1416d and alarm weight 1418d (e.g., 2×1=2). In one example, feature health metric 1414e has a value of (4) representing a product of feature weight 1416e and alarm weight 1418e (e.g., 4×1=4). In one example, service health metric 1402d has a value of (8) representing a product of feature health metric 1414d and feature health metric 1414c.

Figure 14E:
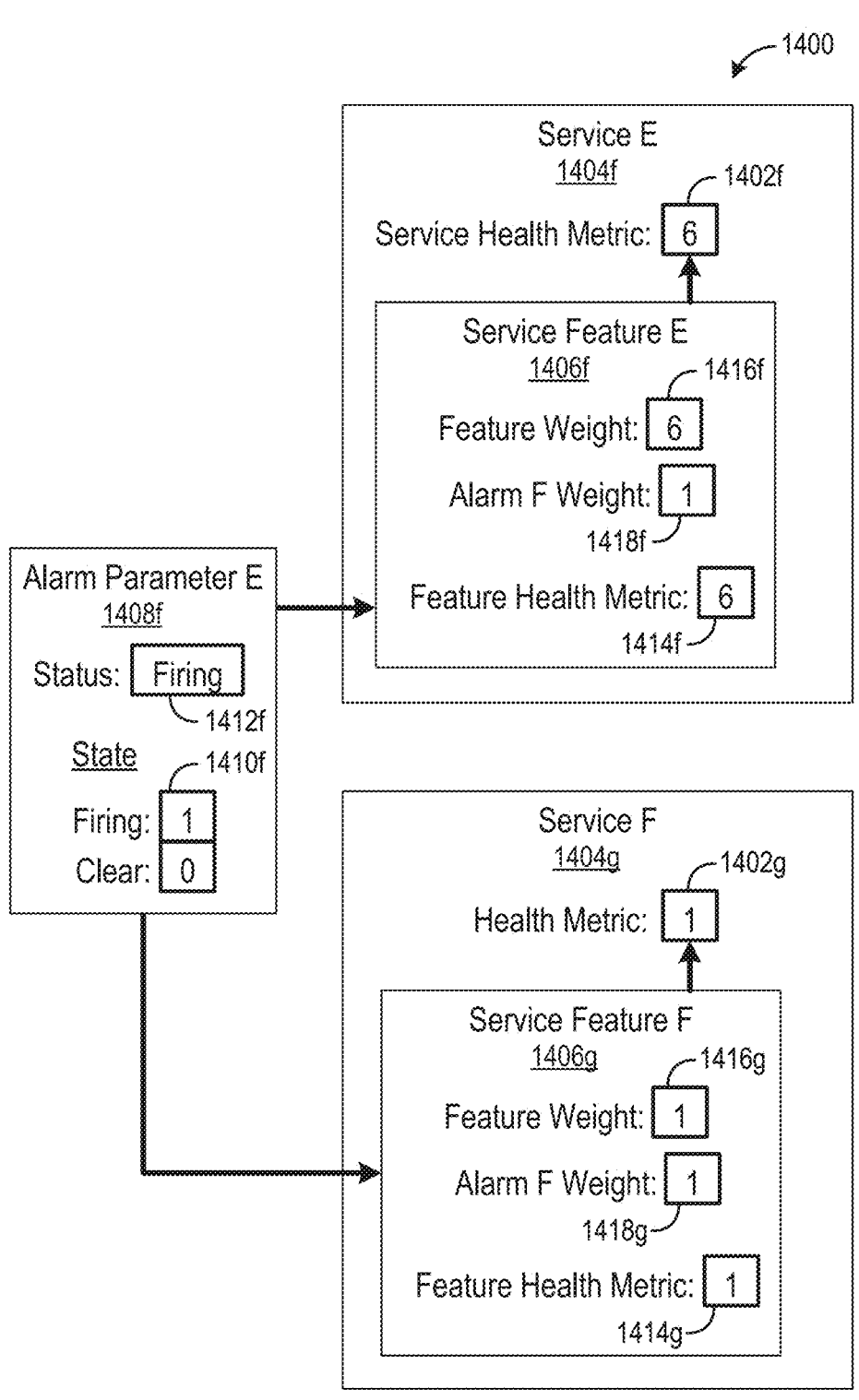

Referring to FIG. 14E, in one example, the system computes service health metrics for a plurality of services based on feature health metrics for a plurality of service features, of the respective services, that are associated with a particular alarm parameter. As shown in FIG. 14E, alarm parameter 1408f is associated with service feature 1406f of service 1404f. Additionally, alarm parameter 1408f is associated with service feature 1406g of service 1404g. The system computes service health metric 1402f based on service feature 1406f of service 1404f. Service health metric 1402f represents an effect of service feature 1406f on the health of service 1404f attributable to alarm parameter 1408f. Additionally, the system computes service health metric 1402g based on service feature 1406g of service 1404g. Service health metric 1402g represents an effect of service feature 1406g on the health of service 1404g attributable to alarm parameter 1408f. As shown in FIG. 14E, alarm parameter 1408f has an alarm state 1410f that indicates an alarm status 1412f of alarm parameter 1408f. The alarm state 1410f is (1) when alarm parameter 1408f is firing. Alarm state 1410f is (0) when alarm parameter 1408f is clear. The alarm status 1412f of alarm parameter 1408f indicates that alarm parameter 1408f is firing.

The system computes feature health metric 1414f of service feature 1406f based on alarm parameter 1408f. Additionally, the system computes service health metric 1402f based on feature health metric 1414f. In one example, the system computes feature health metric 1414f based on a feature weight 1416f corresponding to service feature 1406f.

Feature weight 1416f represents a degree of importance, significance, value, or impact of service feature 1406f on the health of service 1404f. Additionally, or alternatively, the system computes feature health metric 1414f based on alarm weight 1418f corresponding to alarm parameter 1408f. Alarm weight 1418f represents a degree of importance, significance, value, or impact of alarm parameter 1408f on service feature 1406f. In one example, feature health metric 1414f represents a sum, product, or composite of feature weight 1416f and alarm weight 1418f. Additionally, or alternatively, feature health metric 1414f may represent a product of one or more functions, operators, variables, or constants associated with service feature 1406f and/or alarm parameter 1408f.

In one example, service health metric 1402f represents a sum, product, or composite of feature health metric 1414f and one or more additional feature health metrics of service 1404f. Additionally, or alternatively, service health metric 1402f may represent a product of one or more functions, operators, variables, or constants associated with service 1404f. In one example, feature health metric 1414f has a value of (6) representing a product of feature weight 1416f and alarm weight 1418f (e.g., 6×1=6). In one example, service health metric 1402f has a value of (6) representing a product of feature health metric 1414f and one or more additional feature health metrics.

The system computes feature health metric 1414g based on alarm parameter 1408f. Additionally, the system computes service health metric 1402g based on feature health metric 1414g. Feature health metric 1414g may be computed based on the alarm state 1410f and/or the alarm status 1412f. In one example, the system computes feature health metric 1414g based on a feature weight 1416g corresponding to service feature 1406g. Feature weight 1416g represents a degree of importance, significance, value, or impact of service feature 1406g on the health of service 1404g. Additionally, or alternatively, the system computes feature health metric 1414g based on alarm weight 1418g corresponding to alarm parameter 1408f. Alarm weight 1418g represents a degree of importance, significance, value, or impact of alarm parameter 1408f on service feature 1406g. In one example, feature health metric 1414g represents a sum, product, or composite of feature weight 1416g and alarm weight 1418g. Additionally, or alternatively, feature health metric 1414g may represent a product of one or more functions, operators, variables, or constants associated with service feature 1406g and/or alarm parameter 1408f.

In one example, service health metric 1402g represents a sum, product, or composite of feature health metric 1414g and one or more additional feature health metrics of service 1404g. Additionally, or alternatively, service health metric 1402g may represent a product of one or more functions, operators, variables, or constants associated with service 1404g. In one example, feature health metric 1414g has a value of (1) representing a product of feature weight 1416g and alarm weight 1418g (e.g., 1×1=1). In one example, service health metric 1402g has a value of (1) representing a product of feature health metric 1414g and one or more additional feature health metrics.

B. Health Metrics Based on Impacts on Downstream Service Features

Figure 15A:
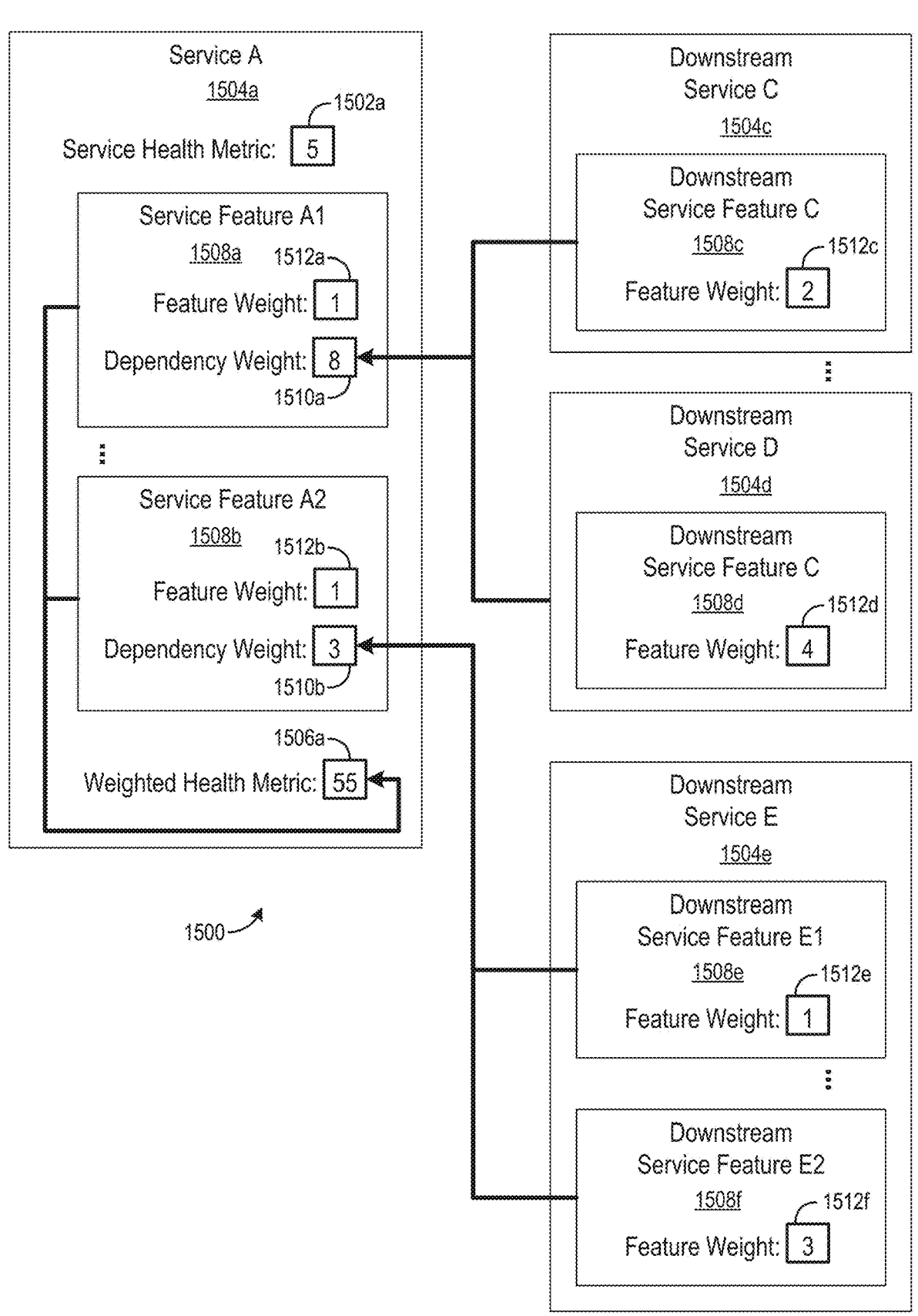
FIGS. 15A and 15B illustrate further example health metrics for monitoring the health of services of a system in accordance with one or more embodiments.

Referring to FIG. 15A, health metrics 1500 based on impacts of service features on downstream service features are further described. The health metrics 1500 representing impacts of service features own downstream service features include weighted health metrics computed based on service health metrics. The weighted health metric for a service may represent a degree of importance, significance, value, or impact that one or more service features of the service have on one or more downstream services.

As shown in FIG. 15A, the system computes a service health metric 1502a for service 1504a. Additionally, the system computes a weighted health metric 1506a for service 1504a based on the service health metric 1502a. Service 1504a includes service feature 1508a and service feature 1508b. In one example, a service feature may impact one or more downstream service features of one or more downstream services. Service feature 1508a impacts downstream service feature 1508c of service 1504c. Additionally, service feature 1508a impacts downstream service feature 1508d of service 1504d. In one example, a service feature may impact a plurality of downstream service features of a particular downstream service. Service feature 1508b impacts downstream service feature 1508e and downstream service feature 1508f of service 1504c.

The system computes a dependency weight for a service feature based on one or more downstream service features that depend on the service feature. In one example, the system determines the dependency weight based on a count of the downstream service features. The system determines a count of the downstream service features and computes the dependency weight based on the count of the downstream service features. In one example, the dependency weight is the count of downstream service features. In one example, the dependency weight represents a product of the count of the downstream service and one or more functions, operators, variables, or constants. Additionally, or alternatively, the system determines the dependency weight based on feature weights for one or more downstream service features that depend on the service feature. Additionally, or alternatively, the dependency weight for a service feature may be computed based on a feature weight of the service feature. In one example, the system computes dependency weight 1510a of service feature 1508a based on feature weight 1512c and feature weight 1512d. Feature weight 1512c corresponds to downstream service feature 1508c of service 1504c. Feature weight 1512d corresponds to downstream service feature 1508d of service 1504d. In one example, the dependency weight 1510a of service feature 1508a is additionally based on feature weight 1512a of service feature 1508a. In one example, dependency weight 1510a represents a sum, product, or composite of feature weight 1512a, feature weight 1512c, and feature weight 1512d. Additionally, or alternatively, dependency weight 1510a may represent a product of one or more functions, operators, variables, or constants associated with service feature 1508a, downstream service feature 1508c, and/or downstream service feature 1508d. As shown in FIG. 15A, dependency weight 1510a has a value of (8) representing a product of feature weight 1512c, feature weight 1512d, and feature weight 1512a (e.g., 2×4×1=8).

In one example, the system computes dependency weight 1510b of service feature 1508b based on feature weight 1512e and feature weight 1512f. Feature weight 1512e corresponds to downstream service feature 1508c of service 1504e. Feature weight 1512f corresponds to downstream service feature 1508d of service 1504c. In one example, the dependency weight 1510b of service feature 1508b is additionally based on feature weight 1512b of service feature 1508b. In one example, dependency weight 1510b represents a sum, product, or composite of feature weight 1512b, feature weight 1512e, and feature weight 1512f. Additionally, or alternatively, dependency weight 1510b may represent a product of one or more functions, operators, variables, or constants associated with service feature 1508*b*, downstream service feature 1508*c*, and/or downstream service feature 1508*f*. As shown in FIG. 15A, dependency weight 1510*b* has a value of (3) representing a product of feature weight 1512*c*, feature weight 1512*f*, and feature weight 1512*b* (e.g., 1×3×1=3).

In one example, the system computes weighted health metric 1506*a* based on dependency weight 1510*a* of service feature 1508*a* and dependency weight 1510*b* of service feature 1508*b*. Additionally, weighted health metric 1506*a* is based on service health metric 1502*a* of service 1504*a*. In one example, weighted health metric 1506*a* represents a sum, product, or composite of dependency weight 1510*a*, dependency weight 1510*b*, and service health metric 1502*a*. As shown in FIG. 15A, weighted health metric 1506*a* has a value of (55) representing a product of service health metric 1502*a* and dependency weight 1510*a* combined with a product of service health metric 1502*a* and dependency weight 1510*b* (e.g., 8×5+3×5=55).

C. Health Metrics Based on Impacts from Upstream Service Features

Figure 15B:
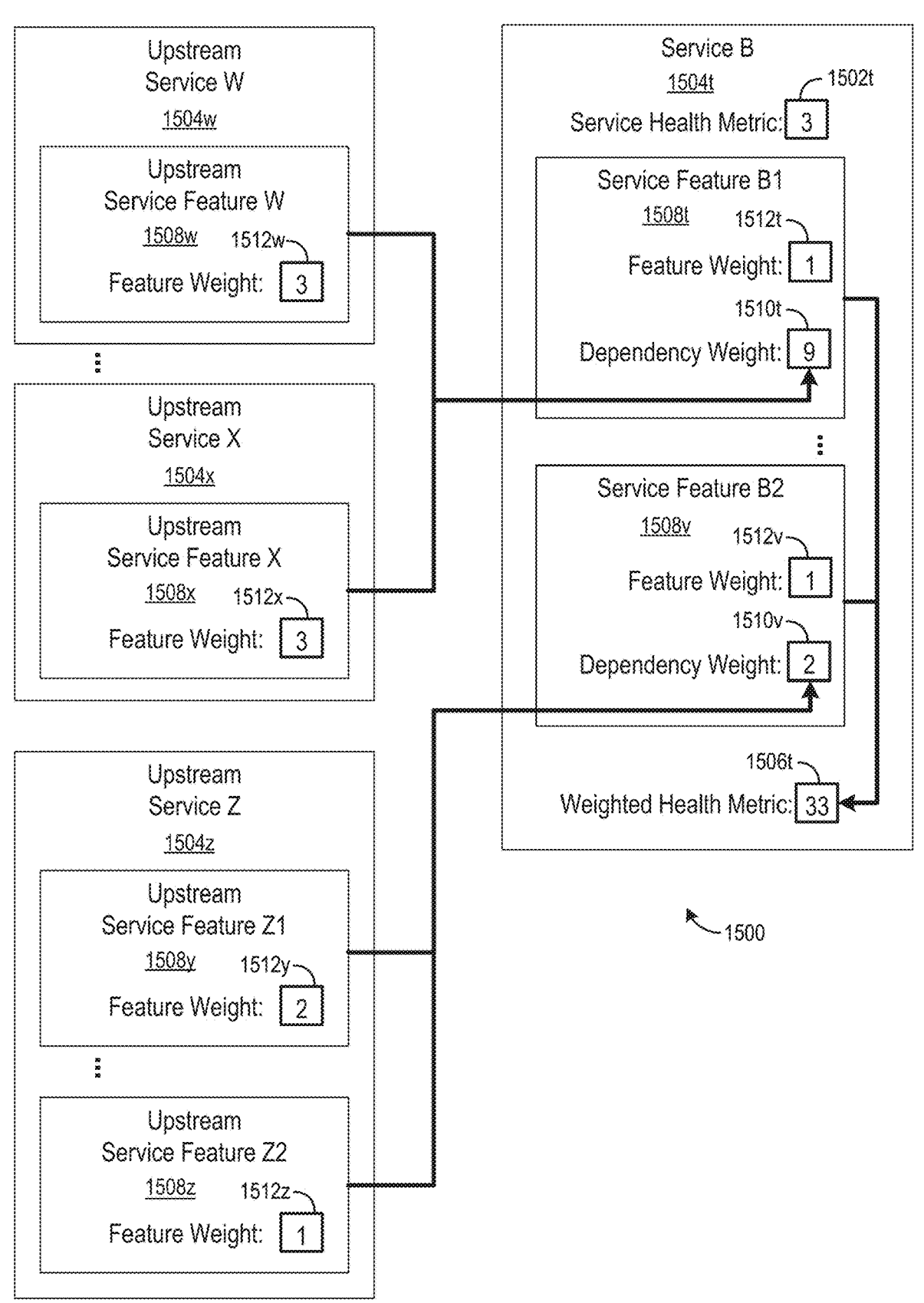

Referring to FIG. 15B, health metrics 1500 based on impacts on service features from upstream service features are further described. The health metrics 1500 representing impacts on service features from upstream service features include weighted health metrics computed based on service health metrics. The weighted health metric for a service may represent a degree of importance, significance, value, or impact that one or more upstream services have on the service features of the service.

As shown in FIG. 15B, the system computes a service health metric 1502*t* for service 1504*t*. Additionally, the system computes a weighted health metric 1506*t* for service 1504*t* based on the service health metric 1502*t*. Service 1504*t* includes service feature 1508*t* and service feature 1508*v*. In one example, a service feature may be impacted by one or more upstream service features of one or more upstream services. Service feature 1508*t* is impacted by upstream service feature 1508*w* of service 1504*w*. Additionally, service feature 1508*t* is impacted by upstream service feature 1508*x* of service 1504*x*. In one example, a service feature may be impacted by a plurality of upstream service features of a particular upstream service. Service feature 1508*v* is impacted by upstream service feature 1508*y* and upstream service feature 1508*z* of service 1504*z*.

The system computes a dependency weight for a service feature based on one or more upstream service features that are depended upon by the service feature. In one example, the system determines the dependency weight based on a count of the upstream service features. The system determines a count of the upstream service features and computes the dependency weight based on the count of the upstream service features. In one example, the dependency weight is the count of upstream service features. In one example, the dependency weight represents a product of the count of the upstream service and one or more functions, operators, variables, or constants. Additionally, or alternatively, the system determines the dependency weight based on features weights for one or more upstream service features that are depended upon by the service feature. Additionally, the dependency weight for a service feature may be computed based on a feature weight of the service feature. In one example, the system computes dependency weight 1510*t* of service feature 1508*t* based on feature weight 1512*w* and feature weight 1512*x*. Feature weight 1512*w* corresponds to upstream service feature 1508*w* of service 1504*w*. Feature weight 1512*x* corresponds to upstream service feature 1508*x* of service 1504*x*. In one example, the dependency weight 1510*t* of service feature 1508*t* is additionally based on feature weight 1512*t* of service feature 1508*t*. In one example, dependency weight 1510*t* represents a sum, product, or composite of feature weight 1512*t*, feature weight 1512*w*, and feature weight 1512*x*. Additionally, or alternatively, dependency weight 1510*t* may represent a product of one or more functions, operators, variables, or constants associated with service feature 1508*t*, upstream service feature 1508*w*, and/or upstream service feature 1508*x*. As shown in FIG. 15A, dependency weight 1510*t* has a value of (9) representing a product of feature weight 1512*w*, feature weight 1512*x*, and feature weight 1512*t* (e.g., 3×3×1=9).

In one example, the system computes dependency weight 1510*v* of service feature 1508*v* based on feature weight 1512*y* and feature weight 15122. Feature weight 1512*y* corresponds to upstream service feature 1508*y* of service 1504*z*. Feature weight 15122 corresponds to upstream service feature 1508*z* of service 1504*z*. In one example, the dependency weight 1510*v* of service feature 1508*v* is additionally based on feature weight 1512*v* of service feature 1508*v*. In one example, dependency weight 1510*v* represents a sum, product, or composite of feature weight 1512*v*, feature weight 1512*y*, and feature weight 15122. Additionally, or alternatively, dependency weight 1510*v* may represent a product of one or more functions, operators, variables, or constants associated with service feature 1508*v*, upstream service feature 1508*y*, and/or upstream service feature 15082. As shown in FIG. 15A, dependency weight 1510*v* has a value of (2) representing a product of feature weight 1512*y*, feature weight 1512*z*, and feature weight 1512*v* (e.g., 2×1×1=2).

In one example, the system computes weighted health metric 1506*t* based on dependency weight 1510*t* of service feature 1508*t* and dependency weight 1510*v* of service feature 1508*v*. Additionally, weighted health metric 1506*t* is based on service health metric 1502*t* of service 1504*t*. In one example, weighted health metric 1506*t* represents a sum, product, or composite of dependency weight 1510*t*, dependency weight 1510*v*, and service health metric 1502*t*. As shown in FIG. 15A, weighted health metric 1506*t* has a value of (33) representing a product of service health metric 1502*t* and dependency weight 1510*t* combined with a product of service health metric 1502*t* and dependency weight 1510*v* (e.g., 3×9+3×2=33).

6. Example Service Health Interfaces

Figure 16A:
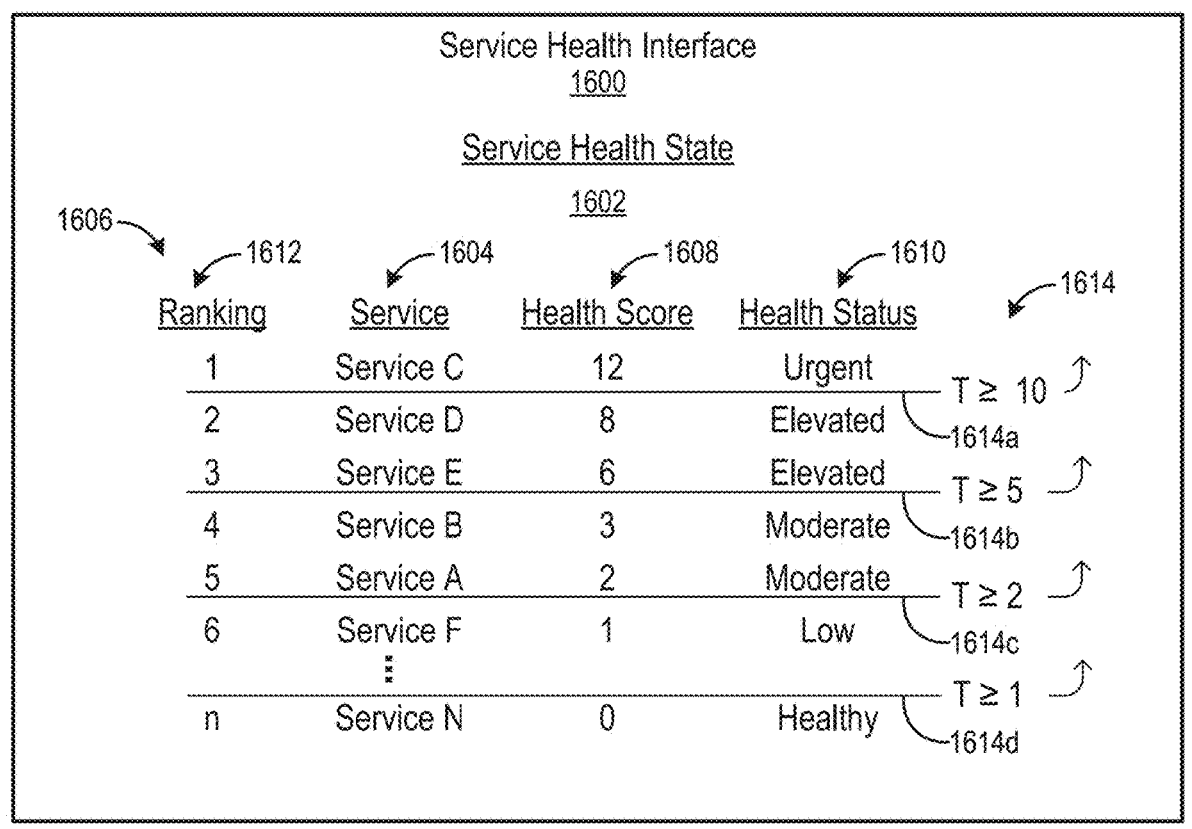
FIGS. 16A-16C illustrate example service health interfaces for monitoring the health of services of a system in accordance with one or more embodiments.
Figure 16B:
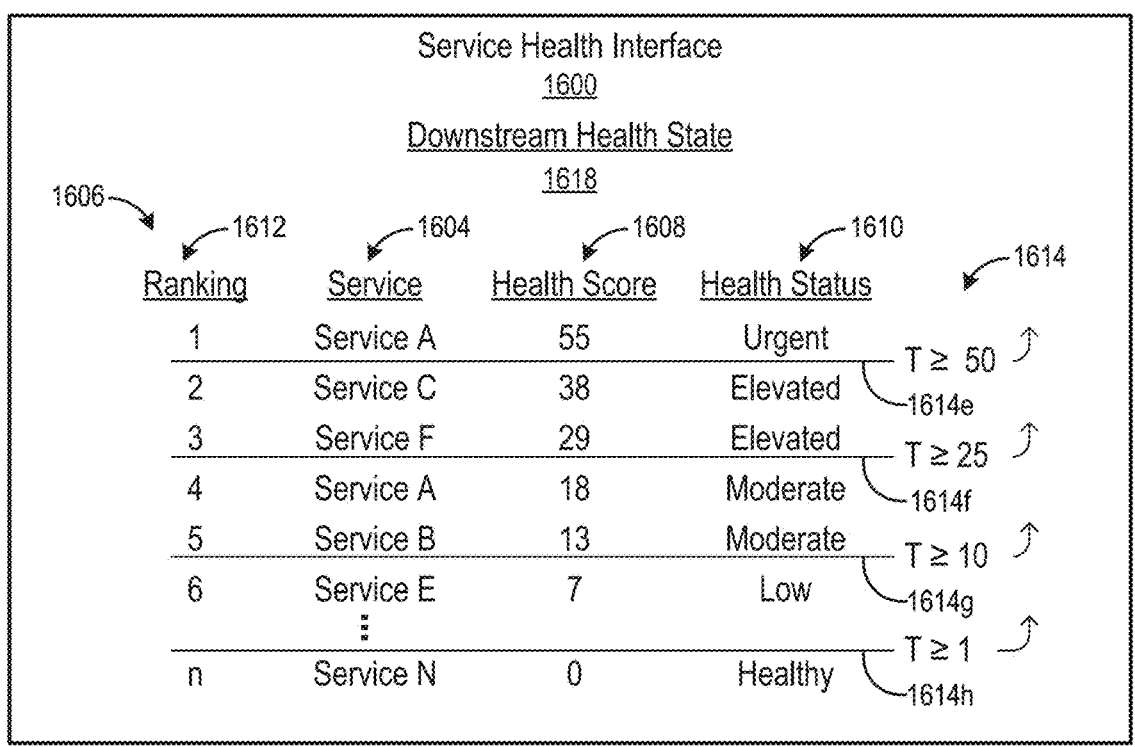
Figure 16C:
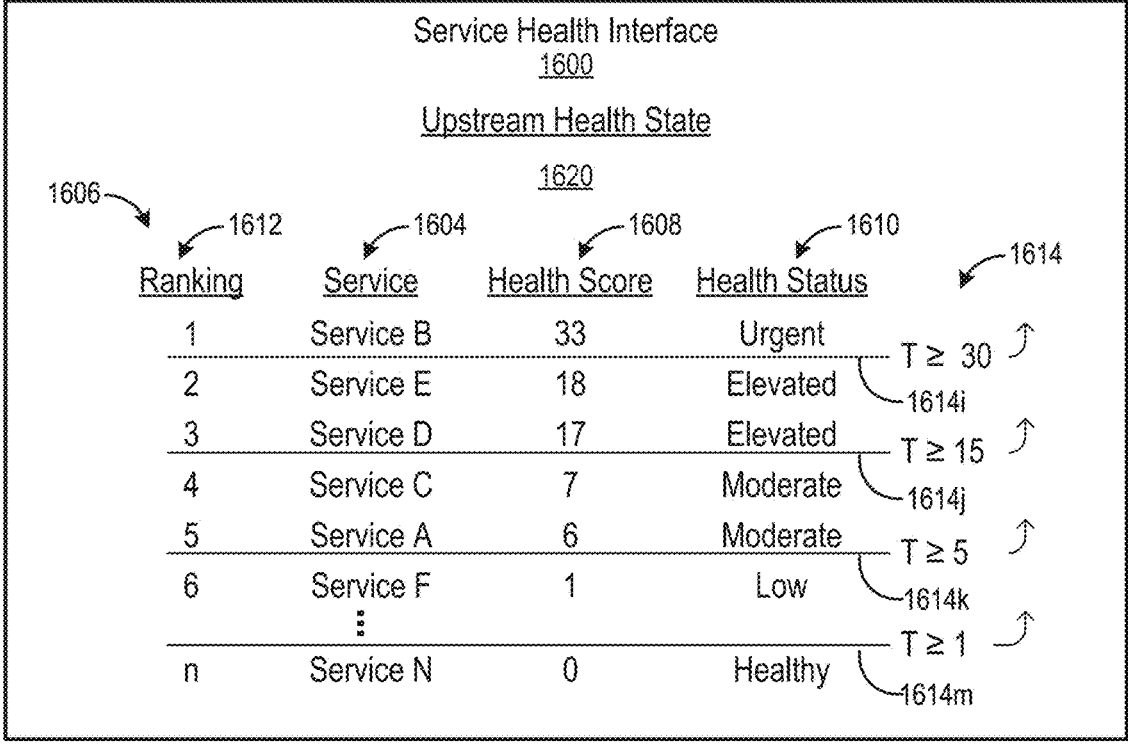

FIGS. 16A-16C illustrate example service health interfaces in accordance with one or more embodiments. The example service health interfaces may be utilized for monitoring the health of services of a system. The examples provided with reference to FIGS. 16A-16C are for purposes of clarity. Components and/or operations described with reference to FIGS. 16A-16C should be understood as examples that may not be applicable to certain embodiments. Accordingly, components and/or operations described with reference to FIGS. 16A-16C should not be construed as limiting the scope of any of the claims.

Referring to FIG. 16A, in one example, a service health interface 1600 indicates a service health state 1602 for one or more services 1604 based on the service features of the respective service 1604. The service health state 1602 includes one or more health metrics 1606 for the one or more services 1604. The one or more health metrics 1606 respectively indicate a health state of a particular service 1604 based on the service features of the particular service 1604.

The one or more health metrics 1606 may include a health score 1608 and/or a health status 1610 for a particular service 1604. Additionally, or alternatively, the one or more health metrics 1606 may include a ranking 1612. The system may rank services 1604 based on the health score 1608 and/or the health status 1610 of the respective services 1604. The service health interface 1600 may display the services 1604 according to the ranking 1612. The health score 1608 for a service 1604 may correspond to a service health metric for the service 1604 computed, for example, as described with reference to FIGS. 14A-14E. Additionally, or alternatively, the health score 1608 for a service 1604 may correspond to a weighted service health metric for the service 1604 computed, for example, as described with reference to FIGS. 15A and 15B. The health status 1610 for a service 1604 may represent a level of priority assigned to the service 1604 based on the health state of the service 1604. The system may determine the health status 1610 for a service 1604 based on the health score 1608 and/or the ranking 1612. Additionally, or alternatively, the system may determine the health status 1610 for a service 1604 based on one or more thresholds 1614. The system may compare a health score 1608 and/or a ranking 1612 for a service 1604 to a threshold 1614. In response to the health score 1608 and/or the ranking 1612 meeting the threshold 1614, the system assigns to the service 1604 a health status 1610 corresponding to the threshold 1614.

As shown in FIG. 16A, the services 1604 include Service A, Service B, Service C, Service D, Service E, and Service F, among other services 1604. Service A, Service B, Service C, Service D, Service E, and Service F may correspond, respectively, to service 1404a, service 1404b, service 1404c, service 1404d, service 1404f, and service 1404g described with reference to FIGS. 14A-14E. Additionally, or alternatively, the health score 1608 for Service A, Service B, Service C, Service D, Service E, and Service F may correspond, respectively, to service health metric 1402a, service health metric 1402b, service health metric 1402c, service health metric 1402d, service health metric 1402f, and service health metric 1402g described with reference to FIGS. 14A-14E. The services 1604 are assigned a ranking 1612 according to the health score 1608 and arranged according to the ranking 1612. The services 1604 are assigned a health status based on a set of thresholds 1614.

In one example, as shown in FIG. 16A, threshold 1614a corresponds to a health status 1610 labeled "Urgent." The system assigns the health status 1610 labeled "Urgent" to services 1604 that meet threshold 1614a. Threshold 1614a is a health score 1608 greater than or equal to (10). Service C has a health score 1608 of (12). Service C is assigned the health status 1610 labeled "Urgent." Threshold 1614b corresponds to a health status 1610 labeled "Elevated." The system assigns the health status 1610 labeled "Elevated" to services 1604 that meet threshold 1614b. Threshold 1614b is a health score 1608 greater than or equal to (5). Service D has a health score 1608 of (8). Service D is assigned the health status 1610 labeled "Elevated." Service E has a health score 1608 of (6). Service E is assigned the health status 1610 labeled "Elevated." Threshold 1614c corresponds to a health status 1610 labeled "Moderate." The system assigns the health status 1610 labeled "Moderate" to services 1604 that meet threshold 1614c. Threshold 1614c is a health score 1608 greater than or equal to (5). Service B has a health score 1608 of (3). Service B is assigned the health status 1610 labeled "Moderate." Service A has a health score 1608 of (2). Service A is assigned the health status 1610 labeled "Moderate." Threshold 1614d corresponds to a health status 1610 labeled "Low." The system assigns the health status 1610 labeled "Low" to services 1604 that meet threshold 1614d. Threshold 1614d is a health score 1608 greater than or equal to (1). Service F has a health score 1608 of (1). Service F is assigned the health status 1610 labeled "Low." The system assigns the health status 1610 labeled "Healthy" to services 1604 that do not meet the threshold 1614d. Service N has a health score 1608 of (0). Service N is assigned the health status 1610 labeled "Healthy."

Referring to FIG. 16B, in one example, a service health interface 1600 indicates a downstream health state 1618 for one or more services 1604 based on the impact that service features of the respective service 1604 have on one or more downstream services. As shown in FIG. 16B, the services 1604 include Service A among other services 1604. Service A may correspond to service 1504a described with reference to FIG. 15A. Additionally, or alternatively, the health score 1608 for Service A may correspond to weighted health metric 1506a described with reference to FIG. 15A. The services 1604 are assigned a ranking 1612 according to the health score 1608 and arranged according to the ranking 1612. The services 1604 are assigned a health status based on a set of thresholds 1614. The thresholds 1614 for the downstream health state may differ from the thresholds 1614 for the service health state described with reference to FIG. 16A. In one example, as shown in FIG. 16B, threshold 1614e corresponds to a health status 1610 labeled "Urgent," threshold 1614f corresponds to a health status 1610 labeled "Elevated," threshold 1614g corresponds to a health status 1610 labeled "Moderate," and threshold 1614h corresponds to a health status 1610 labeled "Low." The system assigns the health status 1610 labeled "Healthy" to services 1604 that do not meet the threshold 1614h.

Referring to FIG. 16C, in one example, a service health interface 1600 indicates an upstream health state 1620 for one or more services 1604 based on the impact on service features of the respective service 1604 attributable to on one or more upstream services. As shown in FIG. 16C, the services 1604 include Service B among other services 1604. Service B may correspond to service 1504t described with reference to FIG. 15B. Additionally, or alternatively, the health score 1608 for Service B may correspond to weighted health metric 1506t described with reference to FIG. 15B. The services 1604 are assigned a ranking 1612 according to the health score 1608 and arranged according to the ranking 1612. The services 1604 are assigned a health status based on a set of thresholds 1614. The thresholds 1614 for the upstream health state may differ from the thresholds 1614 for the service health state described with reference to FIG. 16A and/or the thresholds 1614 for the downstream health state described with reference to FIG. 16B. In one example, as shown in FIG. 16C, threshold 1614i corresponds to a health status 1610 labeled "Urgent," threshold 1614j corresponds to a health status 1610 labeled "Elevated," threshold 1614k corresponds to a health status 1610 labeled "Moderate," and threshold 1614m corresponds to a health status 1610 labeled "Low." The system assigns the health status 1610 labeled "Healthy" to services 1604 that do not meet the threshold 1614m.

Referring further to FIGS. 16A-16C, the system may determine responses, such as operations or courses of action, to be executed in response to various health metrics 1606 displayed on the service health interface 1600. Additionally, or alternatively, users may determine responses based on health metrics 1606 displayed on the service health interface 1600. In one example, a response may be initiated for a service based on an order of priority. In one example, the system and/or users determine the order of priority based on the health metrics 1606. The order of priority may be determined based on the service health state 1602 (FIG. 16A), the downstream health state 1618 (FIG. 16B), and/or the upstream health state 1620 (FIG. 16C). The order of priority of the services may differ as between the service health state 1602 (FIG. 16A), the downstream health state 1618 (FIG. 16B), and/or the upstream health state 1620 (FIG. 16C). In one example, Service C has a health status 1610 labeled "Urgent" with respect to the service health state 1602 (FIG. 16A), Service A has a health status 1610 labeled "Urgent" with respect to the downstream health state 1618 (FIG. 16B), and Service B has a health status 1610 labeled "Urgent" with respect to the upstream health state 1620 (FIG. 16C).

In one example, the system and/or a user may determine an order of priority between responding to the service health state 1602 (FIG. 16A), the downstream health state 1618 (FIG. 16B), and/or the upstream health state 1620 (FIG. 16C). To respond to the health state of services 1604 based on the service features of the respective service 1604, the system and/or a user may prioritize Service C. To respond to the health state of services 1604 based on the impact on downstream service features, the system and/or a user may prioritize Service A. To respond to the health state of services 1604 based on the impact from upstream service features, the system and/or a user may prioritize Service B.

Additionally, or alternatively, the system and/or a user may determine an order of priority for responding to a health state of a service 1604 based on an aggregate health status representing a combination of health metrics 1606 corresponding to the service health state 1602 (FIG. 16A), the downstream health state 1618 (FIG. 16B), and/or the upstream health state 1620 (FIG. 16C). In one example, Service A has a combined health score of 63 (e.g., 2+55+6=63), Service B has a combined health score of 49 (e.g., 3+13+33=49), and Service C has a combined health score of 57 (e.g., 12+38+7=57). The system and/or a user may prioritize responding to the health state of Service A based on a higher combined health score relative to Service B and/or Service C.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer-readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   executing a first service health monitoring technique for monitoring a first service of a cloud environment based at least in part on a first service health data source, wherein executing the first service health monitoring technique comprises:
      determining, by a health monitoring utility of the cloud environment, that a first detected alarm, from the first service health data source, is associated with the first service of the cloud environment;
      computing a first health metric for the first service based at least on the first detected alarm;
      generating a first visual representation comprising the first health metric for display on a service health interface;
   detecting, based on a computer-readable input from at least one component of the cloud environment, a failover condition associated with the first service health monitoring technique for the first service;
   responsive to detecting the failover condition associated with the first service health monitoring technique for the first service:
      transitioning from executing the first service health monitoring technique for monitoring the first service to executing a second service health monitoring technique for monitoring the first service, wherein executing the second service health monitoring technique comprises:
      computing a second health metric for the first service based on service health data from a second service health data source;
      generating, for display on a display device, a second visual representation comprising (a) the second health metric for display on the service health interface and (b) a notification accessible by a user, the notification comprising at least one of: transitioning to executing the second service health monitoring technique, or computing the second health metric for the first service based on service health data from the second service health data source;
   transmitting the second visual representation to cause display of the second visual representation on the display device;
   wherein the method is performed by at least one device including a hardware processor.

2. The method of claim 1, wherein determining that the first detected alarm is associated with the first service of the cloud environment comprises:

determining, by the health monitoring utility, that the first detected alarm, from the first service health data source, is associated with a first service feature;

determining, by the health monitoring utility, that the first service feature is associated with the first service.

3. The method of claim 1, further comprising:

determining that a second detected alarm is associated with a second service of the cloud environment;

computing a third health metric for the second service based at least on the second detected alarm;

determining a ranking of the second service relative to the first service based at least in part on a comparison of the third health metric to at least one of: the first health metric, or the second health metric;

generating, for display on the service health interface, a third visual representation comprising the third health metric and the ranking.

4. The method of claim 2, further comprising:

receiving a user input comprising a user-defined valuation for the first service feature, wherein the first health metric is computed further based on the user-defined valuation.

5. The method of claim 2, wherein computing the first health metric for the first service comprises:

computing a first health score representing an effect of the first detected alarm on at least one of:

the first service feature, the first service, or the cloud environment.

6. The method of claim 5, wherein computing the first health metric for the first service further comprises:

assigning the first health metric to the first service based at least in part on the first health score satisfying a first threshold corresponding to the first health metric.

7. The method of claim 2, wherein determining that the first detected alarm is associated with the first service feature comprises:

accessing a data corpus comprising mappings between alarms and service features;

identifying the first detected alarm in the data corpus;

identifying the first service feature based on a mapping between the first detected alarm and the first service feature.

8. The method of claim 1, further comprising:

deploying, by a first entity, a first partition to the cloud environment, wherein the first partition comprises the service health interface;

transferring operation of the first partition to a second entity;

accessing, by one or more users associated with the second entity, the service health interface.

9. The method of claim 1, further comprising:

augmenting a status of a provisioning process associated with the first service responsive at least in part to the first health metric.

10. The method of claim 1, wherein the first service health monitoring technique comprises utilizing alarm data from a telemetry service, and wherein the second service health monitoring technique comprises utilizing messages from a messaging service.

11. The method of claim 2, further comprising:

determining that a second detected alarm is associated with a second service feature;

determining that the second service feature is associated with the first service;

computing the first health metric for the first service further based on the second detected alarm associated with the second service feature.

12. The method of claim 2, further comprising:

determining that a second detected alarm is associated with a second service feature;

determining that the second service feature is associated with a second service of the cloud environment;

computing a third health metric for the second service based at least on the second detected alarm that is associated with the second service feature;

determining a ranking of the second service relative to the first service based at least in part on a comparison of the third health metric to at least one of: the first health metric, or the second health metric;

generating, for display on the service health interface, a third visual representation comprising the third health metric and the ranking.

13. The method of claim 1, wherein transitioning from executing the first service health monitoring technique to executing the second service health monitoring technique is imperceptible on the service health interface.

14. The method of claim 1, wherein the second visual representation further comprises an indication of at least one of: the second service health monitoring technique, or the second service health data source utilized to compute the second health metric.

15. The method of claim 1, wherein detecting the failover condition corresponds to a degraded state of at least a portion of the cloud environment, the degraded state comprising at least one of: a hardware failure, a software bug, a networking issue, a data corruption, an incomplete or missing alarm, a delayed alarm, a false alarm, an inconsistent alarm behavior, a reduced accuracy of alarm data, or a time duration since a last state change for an alarm parameter meeting a threshold.

16. One or more non-transitory computer-readable media storing instructions that, when executed by one or more hardware processors, cause performance of operations comprising:

executing a first service health monitoring technique for monitoring a first service of a cloud environment based at least in part on a first service health data source, wherein executing the first service health monitoring technique comprises:

determining, by a health monitoring utility of the cloud environment, that a first detected alarm, from the first service health data source, is associated with the first service of the cloud environment;

computing a first health metric for the first service based at least on the first detected alarm;

generating a first visual representation comprising the first health metric for display on a service health interface;

detecting, based on a computer-readable input from at least one component of the cloud environment, a failover condition associated with the first service health monitoring technique for the first service;

responsive to detecting the failover condition associated with the first service health monitoring technique for the first service:

transitioning from executing the first service health monitoring technique for monitoring the first service to executing a second service health monitoring technique for monitoring the first service, wherein executing the second service health monitoring technique comprises:

computing a second health metric for the first service based on service health data from a second service health data source;

generating, for display on a display device, a second visual representation comprising (a) the second health metric for display on the service health interface and (b) a notification accessible by a user, the notification comprising at least one of: transitioning to executing the second service health monitoring technique, or computing the second health metric for the first service based on service health data from the second service health data source;

transmitting the second visual representation to cause display of the second visual representation on the display device.

17. The one or more non-transitory computer-readable media of claim 16, determining that the first detected alarm is associated with the first service of the cloud environment comprises:

determining, by the health monitoring utility, that the first detected alarm, from the first service health data source, is associated with a first service feature;

determining, by the health monitoring utility, that the first service feature is associated with the first service.

18. The one or more non-transitory computer-readable media of claim 16, wherein the operations further comprise:

determining that a second detected alarm is associated with a second service of the cloud environment;

computing a third health metric for the second service based at least on the second detected alarm;

determining a ranking of the second service relative to the first service based at least in part on a comparison of the third health metric to at least one of: the first health metric, or the second health metric;

generating, for display on the service health interface, a third visual representation comprising the third health metric and the ranking.

19. The one or more non-transitory computer-readable media of claim 17, wherein the operations further comprise:

receiving a user input comprising a user-defined valuation for the first service feature, wherein the first health metric is computed further based on the user-defined valuation.

20. The one or more non-transitory computer-readable media of claim 17, wherein computing the first health metric for the first service comprises:

computing a first health score representing an effect of the first detected alarm on at least one of:

the first service feature, the first service, or the cloud environment.

21. The one or more non-transitory computer-readable media of claim 20, wherein computing the first health metric for the first service further comprises:

assigning the first health metric to the first service based at least in part on the first health score satisfying a first threshold corresponding to the first health metric.

22. The one or more non-transitory computer-readable media of claim 17, wherein determining that the first detected alarm is associated with the first service feature comprises:

accessing a data corpus comprising mappings between alarms and service features;

identifying the first detected alarm in the data corpus;

identifying the first service feature based on a mapping between the first detected alarm and the first service feature.

23. The one or more non-transitory computer-readable media of claim 16, wherein the operations further comprise:

deploying, by a first entity, a first partition to the cloud environment, wherein the first partition comprises the service health interface;

transferring operation of the first partition to a second entity;

accessing, by one or more users associated with the second entity, the service health interface.

24. A system comprising:

at least one device including a hardware processor;

the system being configured to perform operations comprising:

executing a first service health monitoring technique for monitoring a first service of a cloud environment based at least in part on a first service health data source, wherein executing the first service health monitoring technique comprises:

determining, by a health monitoring utility of the cloud environment, that a first detected alarm, from the first service health data source, is associated with a first service of a cloud environment;

computing a first health metric for the first service based at least on the first detected alarm;

generating a first visual representation comprising the first health metric for display on a service health interface;

detecting, based on a computer-readable input from at least one component of the cloud environment, a failover condition associated with the first service health monitoring technique for the first service;

responsive to detecting the failover condition associated with the first service health monitoring technique for the first service:

transitioning from executing the first service health monitoring technique for monitoring the first service to executing a second service health monitoring technique for monitoring the first service, wherein executing the second service health monitoring technique comprises:

computing a second health metric for the first service based on service health data from a second service health data source;

generating, for display on a display device, a second visual representation comprising (a) the second health metric for display on the service health interface and (b) a notification accessible by a user, the notification comprising at least one of: transitioning to executing the second service health monitoring technique, or computing the second health metric for the first service based on service health data from the second service health data source;

transmitting the second visual representation to cause display of the second visual representation on the display device.

* * * * *